(12) United States Patent
Kishi

(10) Patent No.: US 11,163,899 B2
(45) Date of Patent: Nov. 2, 2021

(54) INFORMATION PROCESSING SYSTEM AND INFORMATION PROCESSING METHOD

(71) Applicant: Ricoh Company, Ltd., Tokyo (JP)

(72) Inventor: Hidenobu Kishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 288 days.

(21) Appl. No.: 15/432,138

(22) Filed: Feb. 14, 2017

(65) Prior Publication Data

US 2017/0235968 A1 Aug. 17, 2017

(30) Foreign Application Priority Data

Feb. 15, 2016 (JP) .............................. JP2016-026444
Mar. 18, 2016 (JP) .............................. JP2016-056281

(51) Int. Cl.
*G06F 21/62* (2013.01)
*G06F 16/58* (2019.01)
(Continued)

(52) U.S. Cl.
CPC ........ *G06F 21/6218* (2013.01); *G06F 16/532* (2019.01); *G06F 16/58* (2019.01); *G06F 16/5838* (2019.01)

(58) Field of Classification Search
CPC .. G06F 21/6218; G06F 16/5838; G06F 16/58; G06F 16/532
See application file for complete search history.

(56) References Cited

U.S. PATENT DOCUMENTS

2004/0212698 A1* 10/2004 Kito .................... G11B 27/031
 348/231.99
2006/0002607 A1* 1/2006 Boncyk ................ G06Q 20/10
 382/165

(Continued)

FOREIGN PATENT DOCUMENTS

EP 2076039 A2 * 7/2009 ............. H04N 5/765
EP 2 811 418 A1 12/2014
(Continued)

OTHER PUBLICATIONS

Translation of WO-2015145905-A1, Morodomi et al, 15 pages (Year: 2015).*

(Continued)

*Primary Examiner* — Alford W Kindred
*Assistant Examiner* — Tiffany Thuy Bui
(74) *Attorney, Agent, or Firm* — Xsensus LLP

(57) ABSTRACT

An information processing system includes: a search system to search, for an image to be found, a database according to a search request and based on similarity thereof to a search key image, the database having the image and linkage information registered in association with each other, and transmit the linkage information to a transmitter of the request when the image is found; an acquisition unit to acquire an image captured by a terminal and the request with the captured image as the search key image; a search unit to perform the requested searching and transmit, to the terminal, the linkage information as a result of the searching; and a notification management unit to transfer permission information to a notification unit when the found image is a particular image, the permission information enabling identification of the terminal and indicating that providing a notification to the terminal is permitted.

8 Claims, 39 Drawing Sheets

(51) Int. Cl.
*G06F 16/583* (2019.01)
*G06F 16/532* (2019.01)

(56) References Cited

U.S. PATENT DOCUMENTS

| | | | | |
|---|---|---|---|---|
| 2006/0227992 | A1* | 10/2006 | Rathus | G06F 21/60 382/100 |
| 2007/0106721 | A1* | 5/2007 | Schloter | H04L 29/06027 709/200 |
| 2008/0279481 | A1* | 11/2008 | Ando | G06Q 30/0601 382/306 |
| 2011/0078553 | A1* | 3/2011 | Reimann | G06F 17/20 715/234 |
| 2012/0057032 | A1* | 3/2012 | Jang | G06K 9/228 348/207.1 |
| 2013/0057582 | A1* | 3/2013 | Aoki | H04N 1/00347 345/633 |
| 2013/0346521 | A1* | 12/2013 | Arabo | H04L 29/08693 709/206 |
| 2014/0006387 | A1 | 1/2014 | Kishi et al. | |
| 2014/0006435 | A1 | 1/2014 | Kishi et al. | |
| 2014/0226029 | A1* | 8/2014 | Matsuzawa | H04N 1/32128 348/207.1 |
| 2014/0362235 | A1 | 12/2014 | Kishi et al. | |
| 2015/0016675 | A1 | 1/2015 | Kishi | |
| 2015/0381630 | A1 | 12/2015 | Kishi et al. | |
| 2016/0062634 | A1* | 3/2016 | Kurita | G06K 9/00402 715/268 |
| 2016/0154827 | A1 | 6/2016 | Kishi | |
| 2016/0321303 | A1 | 11/2016 | Kishi et al. | |
| 2016/0364415 | A1 | 12/2016 | Itoh et al. | |
| 2017/0052980 | A1 | 2/2017 | Itoh et al. | |

FOREIGN PATENT DOCUMENTS

| | | |
|---|---|---|
| JP | 2009-225268 | 10/2009 |
| JP | 2012-230555 A | 11/2012 |
| JP | 2014-010722 | 1/2014 |
| JP | 2014-010723 | 1/2014 |
| JP | 2014-142835 A | 8/2014 |
| JP | 2014-174853 A | 9/2014 |
| JP | 2014-238742 | 12/2014 |
| JP | 2014-238815 | 12/2014 |
| JP | 2015-018405 | 1/2015 |
| JP | 2015-038717 | 2/2015 |
| JP | 2016-012207 | 1/2016 |
| JP | 2017-004380 | 1/2017 |
| JP | 2017-37437 A | 2/2017 |
| JP | 2017-41151 A | 2/2017 |
| WO | WO-2015145905 A1 * | 10/2015 ............. A63F 13/77 |

OTHER PUBLICATIONS

JP2012-230555 Translation, "Information Distribution System and Information distribution method", Yoshifusa et al., 9 pages, date Apr. 26, 2011 (Year: 2011).*
Extended Search Report dated Jun. 9, 2017 in European Patent Application No. 17156036.0.
Eva Hörster, et al., "Image Retrieval on Large-Scale Image Databases", 6th ACM international Conference on Image an Video Retrieval, (CIVR 2007), XP002613833, Jul. 2007, 8 pages.
U.S. Appl. No. 15/228,253, filed Aug. 4, 2016.
Japanese Office Action dated Dec. 24, 2019, in Patent Application No. 2016-026444, 3 pages.
Japanese Office Action dated Dec. 10, 2019, in Patent Application No. 2016-056281, 3 pages.

* cited by examiner

FIG.3

```
1: 
2:         <hotspot>
3:                 <area>x1,y1,x2,y2</area>
4:                 <link>
5:                         <title>****Shop Web Page</title>
6:                         <type>info</type>
7:                         <URI>http://1.example.org/index.html</URI>
8:                 </link>
9:                 <link>
10:                        :
11:                </link>
12:        </hotspot>
13:        <hotspot>
14:               :
15:        </hotspot>
16: 
```

FIG.17

CLIENT REGISTRATION/EDIT — 510

- CLIENT NAME: ▭ — 5101
- MAX. NO. OF PAGES USABLE: [25] PAGES ← 5102
- E-mail: ▭ — 5103
- CLIENT ID: ▭ — 5104
- PASSWORD: ▭ — 5105   [ISSUE INITIAL PASSWORD] — 5106
- NOTES: ▭ — 5107
- MODULE ID:
  - CAS736901
  - CAS005713
  - CAS118285
  - CAS000001
  - CAS794011

— 5108
- PUSH NOTIFICATION: ⦿ USE  ○ NOT USE  ← 5109

[OK] — 5110    [CANCEL] — 5111

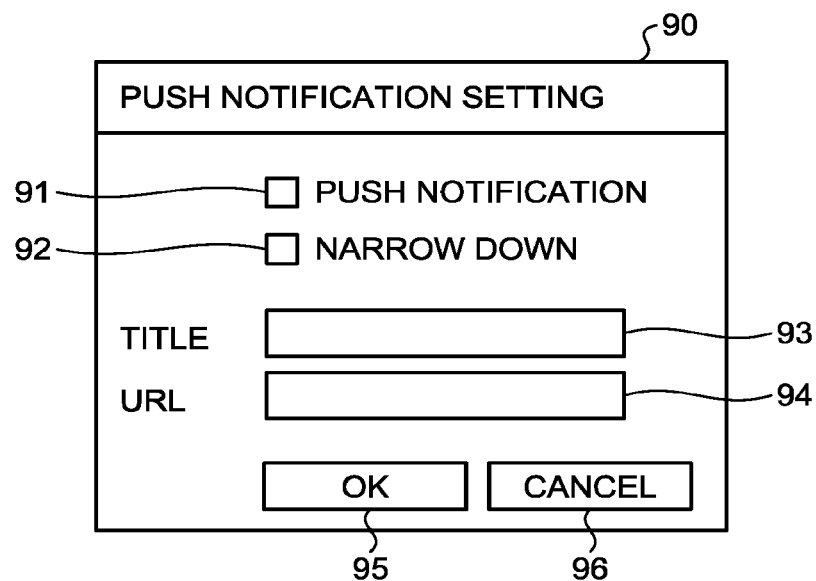

https://1.example.com/jigyosha.html?<uid>

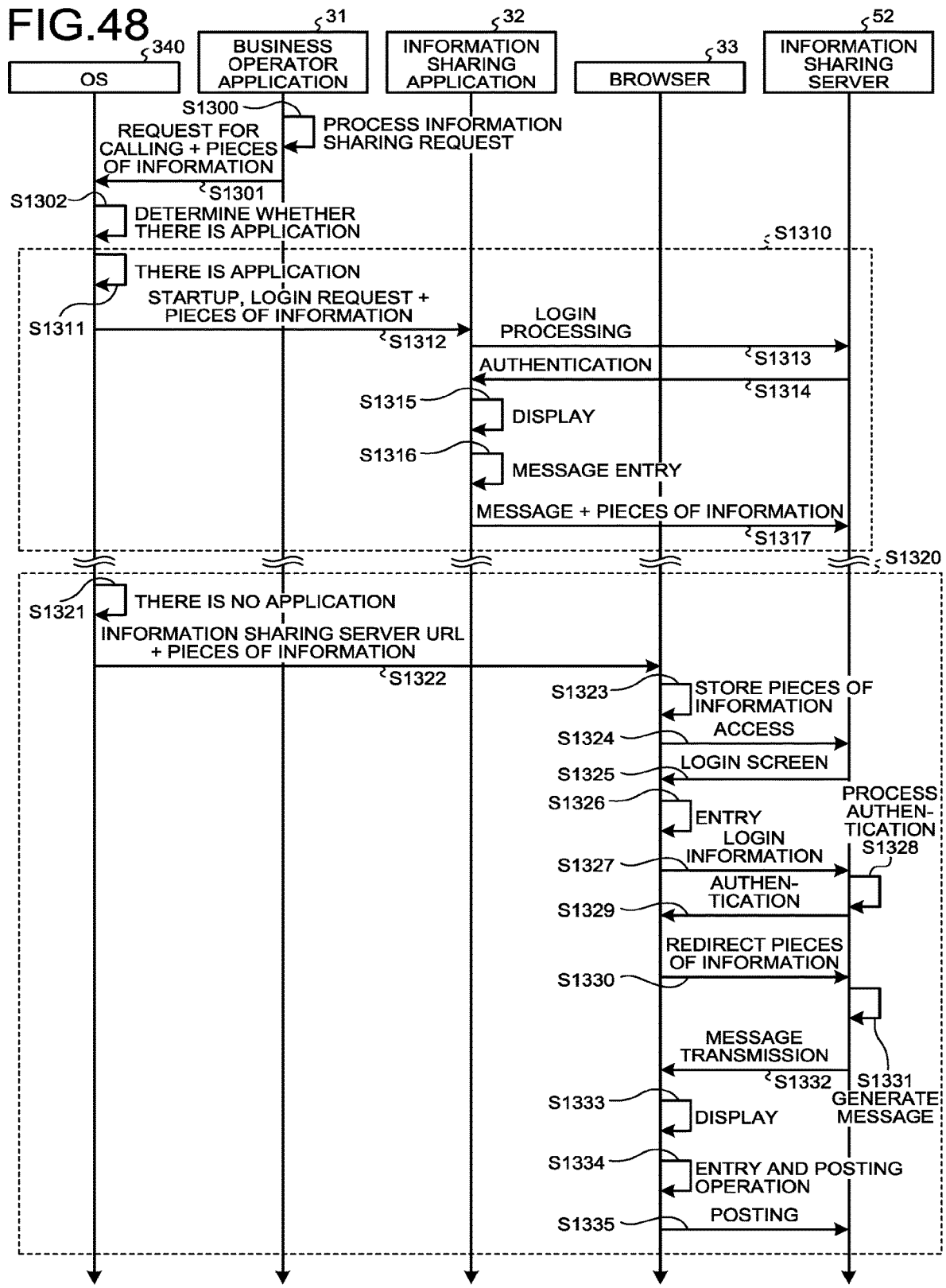

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2016-026444, filed Feb. 15, 2016 and Japanese Patent Application No. 2016-056281, filed Mar. 18, 2016. The contents of which are incorporated herein by reference in their entirety.

BACKGROUND OF THE INVENTION

1. Field of the Invention

The present invention relates to an information processing system and an information processing method.

2. Description of the Related Art

Image search techniques are known in which features are extracted from, for example, a captured image obtained by image capturing with a camera, and a pre-registered image group is searched for an image having many similar features. Image search systems are known that use such image search techniques to register images of certain photographs or printed materials in a database in association with various kinds of electronic data, to search this database for a similar image using a captured image of any one of these photographs or the printed materials, and to present linkage information associated with the similar image (for example, Japanese Unexamined Patent Application Publication No. 2014-010723).

In an information processing system utilizing the above-described image search system, a function is needed that enables, for example, a business operator who provides the linkage information to additionally provide, to a user who has used the linkage information based on a certain image, information depending on a result of use of the linkage information after the linkage information is used. However, the image search system described in Japanese Unexamined Patent Application Publication No. 2014-010723 has the disadvantage of having difficulty in implementing the function because the system has difficulty in identifying a terminal device that has used the linkage information.

In view of the above situation, there is a need to enable additional provision of information, after linkage information has been used, to a terminal device that has used the linkage information.

SUMMARY OF THE INVENTION

According to exemplary embodiments of the present invention, there is provided an information processing system including an image search system configured to search, for an image to be found, a database in accordance with a search request and based on similarity thereof to a search key image, the database having the image to be found and linkage information registered in association with each other; and transmit the linkage information associated with the image to be found to a transmitter of the search request when the image to be found is found, the information processing system comprising: an acquisition unit configured to acquire a captured image and the search request for requesting the searching in which the captured image is used as the search key image, the captured image having been obtained by causing a terminal device to capture an image of a medium; a search unit configured to perform the searching based on the search key image in accordance with the search request acquired by the acquisition unit and transmit, to the terminal device, the linkage information associated with the image to be found that is found as a result of the searching; and a notification management unit configured to transfer permission information to a notification unit when the image to be found that is found as a result of the searching based on the search key image is a particular image, the permission information enabling identification of the terminal device and indicating that providing a notification to the terminal device is permitted, the notification unit being configured to provide the notification to the terminal device.

Exemplary embodiments of the present invention also provide an information processing method in an information processing system including an image search system configured to search, for an image to be found, a database in accordance with a search request and based on similarity thereof to a search key image, the database having the image to be found and linkage information registered in association with each other; and transmit the linkage information associated with the image to be found to a transmitter of the search request when the image to be found is found, the information processing method comprising: acquiring a captured image and the search request for requesting the searching in which the captured image is used as the search key image, the captured image having been obtained by causing a terminal device to capture an image of a medium; performing the searching based on the search key image in accordance with the search request acquired at the acquiring, and transmitting, to the terminal device, the linkage information associated with the image to be found that is found as a result of the searching; and transferring permission information to a notification unit when the image to be found that is found as a result of the searching based on the search key image is a particular image, the permission information enabling identification of the terminal device and indicating that providing a notification to the terminal device is permitted, the notification unit being configured to provide the notification to the terminal device.

BRIEF DESCRIPTION OF THE DRAWINGS

FIG. 3 is a diagram illustrating an exemplary XML code, applicable to each embodiment, that describes information indicating target areas;

FIG. 17 is a diagram illustrating an example of a client registration/edit screen applicable to the first embodiment;

FIG. 32 is a diagram illustrating an example of a push notification setting screen for setting a push notification according to the first embodiment;

FIG. 33 is a diagram illustrating an exemplary consequence of adding a parameter to a uniform resource identifier (URI) applicable to the first embodiment;

FIG. 48 is an exemplary sequence diagram illustrating processing according to a modification of the second embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
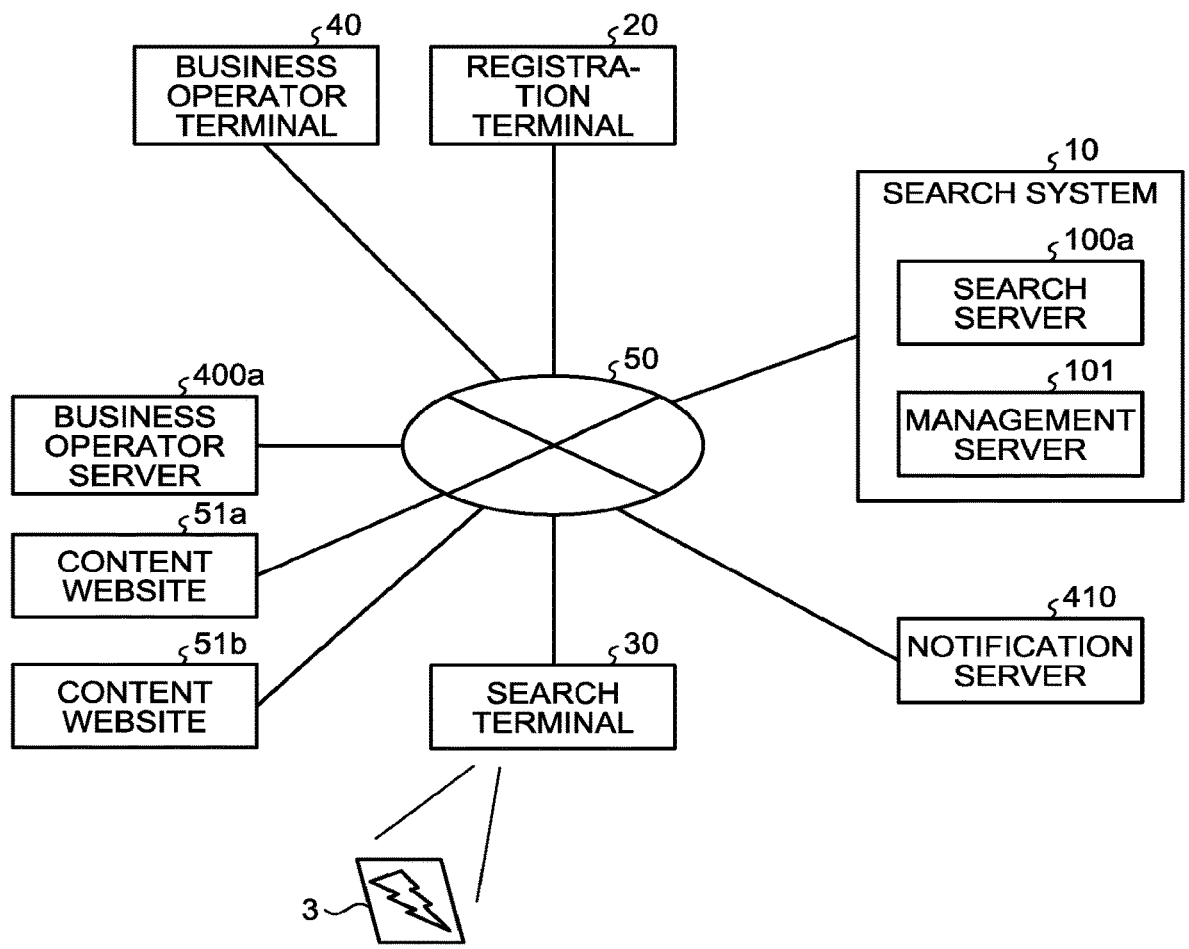
FIG. 1 is a diagram illustrating an exemplary configuration of an information processing system applicable to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes in detail embodiments of an information processing system and an information processing method with reference to the accompanying drawings.

First Embodiment

FIG. 1 illustrates an exemplary configuration of an information processing system applicable to a first embodiment. In FIG. 1, the information processing system includes a search system 10, a registration terminal 20, a search terminal 30, a business operator terminal 40, a business operator server 400a, and a notification server 410. The search system 10 includes a search server 100a and a management server 101. The search server 100a is capable of communicating with the registration terminal 20, the search terminal 30, the business operator terminal 40, the business operator server 400a, and the notification server 410 through a network 50 such as the Internet. The management server 101 is capable of communicating with the registration terminal 20 and the business operator terminal 40 through the network 50.

Each of the search server 100a and the management server 101 may be composed of one information processing apparatus, or may be composed of a plurality of interconnected information processing apparatuses with functions distributed thereamong. The search server 100a and the management server 101 can alternatively be configured on one information processing apparatus.

In the search system 10, the search server 100a includes image search DBs in which images are associated with linkage information. Based on an image acquired through the network 50, the search server 100a searches any of the image search DBs for an image that is similar to the acquired image, and outputs the linkage information that is associated with the image found in the searching as a search result. The search system 10 transmits the linkage information output from the search server 100a to an original transmitter of the image.

The search terminal 30 has an image capturing function. The search terminal 30 is not limited to this example, and may store an image desired to serve as a key in the image search, without having the image capturing function. Needless to say, the search terminal 30 may have the image capturing function and include a unit for storing an image serving as the key in the image search.

The search terminal 30 has an image search application installed thereon that serves as an application program for using the image search by the search system 10. To install the image search application on the search terminal 30, for example, the following method can be used: on a predetermined download site on the network 50 such as the Internet, the general user specifies and downloads therefrom the image search application as the application program desired to be installed, and installs it on the search terminal 30. The image search applications are identified by application IDs to be described later.

By having the image search application executed, the search terminal 30 is enabled to perform image capturing processing to capture an image of a photographic subject 3 using the image capturing function, and transmit the captured image of the photographic subject 3, together with a search request requesting a search for an image similar to the captured image, to the search system 10 through the network 50. The transmitted search request is received by the search server 100a in the search system 10.

A business operator can set various items, such as a leaflet, a poster, a signboard, a signage, a promotional photograph, a certain scenery, and a product, as the photographic subjects. In other words, to the extent that the search system 10 functions, all objects determined by the business operator can serve as the photographic subjects. This is because the business operator only needs to disclose the photographic subjects to a general user, and the general user only needs to capture any of the photographic subjects and use the search system 10.

In the search system 10, the search server 100a searches the image search DB for an image similar to the image in response to the search request transmitted from the search terminal 30, and acquires identification information (hereinafter, called image identification information) on the found image as a search result. The search server 100a transmits the linkage information associated with the found image to the search terminal 30.

For example, if the linkage information includes URLs, the search terminal 30 can access content websites 51a and 51b indicated by the URLs, through the network 50, according to the linkage information that has been found on the search server 100a based on the captured image of the photographic subject 3 and that has been transmitted. The content websites 51a and 51b are sites each presented by, for example, a web server external to the information processing system according to the first embodiment, and present contents by request. Hereinafter, a person who operates the search terminal 30 is called the general user.

In the above-described information processing system, the service provider of the search system 10 permits a person or an organization having a particular contract with the service provider to register an image and linkage information in the search server 100a. Hereinafter, a person or an organization having a particular contract with the service provider is called a business operator. Although a business enterprise, a governmental body, a corporate body, or the like is assumed as the business operator in general, the business operator may be an individual person. The term "particular contract" as used herein does not refer to an agreement or the like with which the general user agrees when installing an image search application, but refers to a contract by which the business operator permits the general user to use functions (such as registration of images and linkage information) of the search system 10 for providing a service. By request from the business operator, the service provider registers the image and the linkage information provided by the business operator in the search server 100a. Depending on the terms of the contract, the business operator can operate the registration terminal 20 by themselves to register the image and the linkage information in the search server 100a. That is, the registration terminal 20 is a terminal device used by the service provider or the business operator.

The business operator server 400a is a server operated and managed by the business operator and is composed of one information processing apparatus. The business operator server 400a may alternatively be composed of a plurality of interconnected information processing apparatuses with functions distributed thereamong. The business operator server 400a executes processing related to management of message provision processes to be described later according to the first embodiment, and processing related to linkage information. The business operator server 400a is capable of storing therein websites the locations of which on the network 50 are indicated by certain URLs.

The notification server 410 is composed of one or more information processing apparatuses and provides a service using a known method of push notifications. The following schematically describes a push notification. A push notification is delivered from the notification server 410 to equipment (a terminal device) on which an application program (hereinafter referred to as push-supporting application) supporting push notifications has been installed. When a push notification for the push-supporting application installed on the equipment is permitted (approved) in response to an operation performed by a user, the push-supporting application transmits identification information for identifying the push-supporting application itself to and thus requests a notification ID from the notification server 410 at a certain moment in time, such as when the equipment or the push-supporting application is started up.

In response to the request, the notification server 410 issues a notification ID unique to the equipment, and, while storing the issued notification ID, transmits the notification ID together with the identification information for the application to the equipment that has requested the notification ID. Notification ID is identification information that is used by the notification server 410 to identify the push-supporting application for which the push notification is permitted and the equipment having the push-supporting applications installed thereon. That is, the notification ID is permission information that permits notification to be made through the push notification. The notification ID is a device token when the operating system (OS) of the equipment is iOS (registered trademark).

The push-supporting application stores the acquired notification ID in a storage unit of the equipment. The push-supporting application transmits the notification ID to a party who has provided the push-supporting application or a provider who provides a message to be conveyed through the push notification to the push-supporting application (for example, the business operator server 400*a*). The provider stores the transmitted notification ID.

For example, when in need of delivering a push notification to particular equipment, the provider transmits the notification ID corresponding to the equipment and a message needing to be conveyed through the push notification to the notification server 410, thus requesting the notification server 410 to deliver the push notification. In response to the request, the notification server 410 transmits the notification ID and the message to the equipment identified by the notification ID. Upon receiving these notification ID and message, the equipment uses the OS of the equipment to detect a push-supporting application that corresponds to the notification ID and uses the detected push-supporting application to display the message in a certain manner.

A push notification is thus used in a manner such that: in response to an operation performed on equipment by a user to permit the push notification for a push-supporting application, a notification ID is issued by the notification server 410, and a message is transmitted as and conveyed through the push notification to particular equipment based on this notification ID. Therefore, incorporation of the function of delivering push notifications enables proactive message transmission to the equipment without using personal information, such as an e-mail address, of the user.

The notification server 410 is built as a system independent from the search system 10 and the business operator server 400*a*. This example is not limiting, and the functions of the notification server 410 may be included in the business operator server 400*a* or the search system 10.

The business operator terminal 40 is a terminal to be used by the business operator, and can be used, for example, to check the image and the linkage information registered in the search server 100*a*.

In the first embodiment, the business operator can customize the image search application to be installed on the search terminal 30. For example, the service provider provides, to the business operator having the particular contract, the image search module for performing the function of the image search application needed on terminals (the business operator terminal 40 and the search terminal 30) in order to use the search function performed by the search server 100*a*. This image search module is provided as, for example, a software development kit (SDK) from the service provider to the business operator. The image search modules are identified by module IDs to be described later.

The business operator can incorporate the provided image search module into, for example, another application program developed by the business operator themselves. This incorporation can make, for example, a customized application in which the image search application function is added to a business operator application for providing a service by the business operator. By distributing the customized application with the built-in image search module to the general user, the business operator can allow the general user to use the image search function in accordance with the intention of the business operator, and can allow the business operator to provide their service to the general user.

This customized application is installed on the business operator terminal 40. For example, the business operator uses the business operator terminal 40 having this customized application installed thereon to transmit a search request to the search system 10, and checks whether a search result intended by the business operator is obtained. The search request transmitted from the business operator terminal 40 includes an image for which an image search is to be made, a module ID for identifying the image search module, and type information indicating a search pattern.

In the search system 10, the search server 100*a* performs the image search according to the search request transmitted from the business operator terminal 40, and transmits the search result as a response to the search request to the business operator terminal 40. Based on this search result, the business operator checks, for example, the operation of the customized application, and also the image and the linkage information registered in the search server 100*a*. Upon having determined that there is no problem, the customer provides, for example, the customized application and the service using the image search function to the general user.

Figure 2:
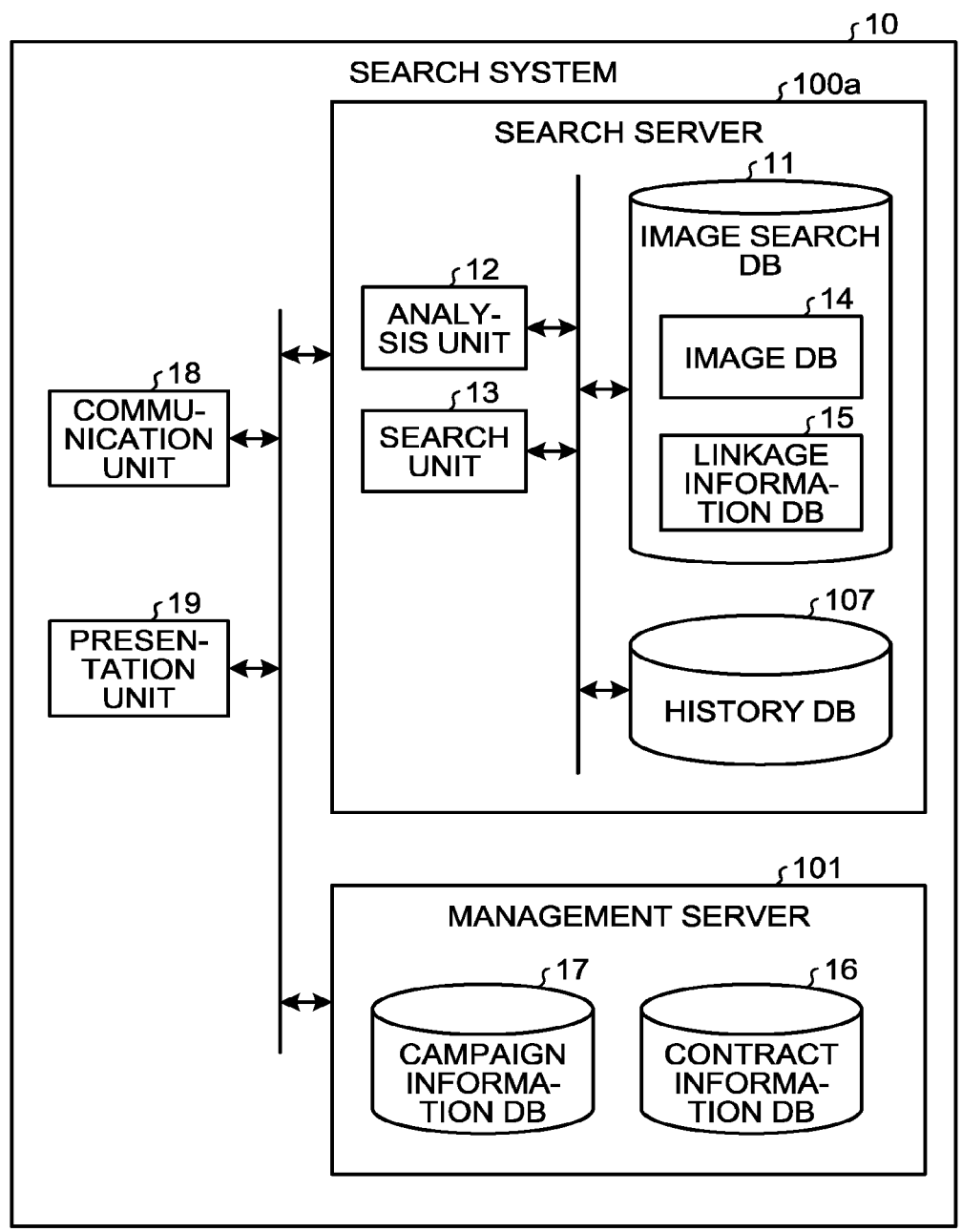
FIG. 2 is an exemplary functional block diagram for explaining functions of a search system applicable to the first embodiment.

FIG. 2 is an exemplary functional block diagram for explaining functions of the search system 10 applicable to the first embodiment. The search system 10 includes the search server 100*a*, the management server 101, a communication unit 18, and a presentation unit 19. The communication unit 18 controls communication performed through the network 50. The presentation unit 19 generates information to be presented by the presentation unit 19 to the registration terminal 20, the search terminal 30, and the business operator terminal 40. The information presented by the presentation unit 19 is transmitted by the communication unit 18 to the registration terminal 20, the search terminal 30, and the business operator terminal 40 through the network 50.

The search server 100*a* includes an image search DB 11, an analysis unit 12, a search unit 13, and a history DB 107 and performs search processing based on the captured image transmitted from the search terminal 30. The image search DB 11 includes an image DB 14 and a linkage information DB 15. In the image DB 14, images are registered in a manner such that the image DB 14 is searchable for each image. More specifically, in the image DB 14, each image and feature information extracted from the image by the analysis unit 12 is registered in association with each other. In the linkage information DB 15, the linkage information to be linked with the image registered in the image DB 14 is registered in association with the image.

The following describes a specific example of the association between the image and the linkage information. In the first embodiment, one or more areas can be specified in the image, and one or more pieces of the linkage information can be associated with each of the specified areas. This area specified in the image for being associated with the linkage information is hereinafter called the target area.

The following briefly describes an XML code describing the information indicating the target areas according to the first embodiment. FIG. 3 illustrates an exemplary XML code, according to the first embodiment, that describes information indicating target areas. In FIG. 3 and any drawings illustrating similar exemplary code below, the number at the head of each line represents a line number for explanation, and is distinguished from a code representing substantive data by a subsequent colon (:), unless otherwise stated. The code exemplified in FIG. 3 is a pseudo-code simulating the notation of XML code.

In FIG. 3, an XML code 140 defines a page by the section (from the first line to the 16th line) interposed between the outermost tags "" and "". That is, the section interposed between the tags "" and "" is associated with one image. In each of the ranges from the second line to the 12th line and from the 13th line to the 15th line (the 14th line being illustrated by omitting a plurality of lines), a section interposed between tags "<hotspot>" and "</hotspot>" defines one target area. In this manner, a plurality of target areas can be defined for one page (one image).

The third line has a section interposed between tags "<area>" and "</area>", which defines, in the page, the range of the target area described from the second line to the 12th line as, for example, a range specified by coordinates (x1,y1) of the upper left corner and coordinates (x2,y2) of the lower right corner.

In each of the ranges from the fourth line to the eighth line and from the ninth line to the 11th line (in which the 10th line is illustrated as corresponding to a plurality of omitted lines), a section interposed between tags "<link>" and "</link>" defines one piece of the linkage information. In this manner, a plurality of pieces of the linkage information can be defined for one target area. For example, as exemplified from the fourth line to the eighth line in FIG. 3, a section interposed between tags "<title>" and "</title>" defines the title of the linkage information. A section interposed between tags "<type>" and "</type>" defines the type of this linkage information.

In this example, a section interposed between tags "<URI>" and "</URI>" defines address information over the network 50, as the linkage information, using a uniform resource identifier (URI). The network 50 is implemented by, for example, the Internet. In this case, for example, behavior of a browser application that has loaded the URI can be specified by having an argument appended to the URI. The linkage information is not limited to the URI. Various types of linkage information can be described by having tags defined in advance. For example, information for starting up a particular application program can also be described as the linkage information.

In this example, in the linkage information defined in the section interposed between the tags "<link>" and "</link>", three items are defined using the tags "<title>" and "</title>", the tags "<type>" and "</type>", and the tags "<URI>" and "</URI>".

This example is not limiting, and more items can be further defined in the section interposed between the tags "<link>" and "</link>". Image data itself of a target area may be described by having the image data defined as an item in the section interposed between the tags "<link>" and "</link>".

In this manner, the XML code 140 defines the target areas in the page and the linkage information for each of the target areas, so that functions can be performed that depend on the linkage information associated with objects included in the target areas in the page.

Referring again to FIG. 2, the history DB 107 accumulatively stores therein, as search history information, information on the search processing performed in the search server 100*a*. The history DB 107 stores therein, for example, pieces of information (such as an application ID, a module ID, a user ID, and a notification ID) included in a search request received from the search terminal 30, image identification information indicating an image found in the searching as requested by the search request, and linkage information (including information indicating a selected target area) associated with the image identification information while associating the pieces of information, the image identification information, and the linkage information with one another.

The search server 100*a* performs registration processing of an image as schematically described below. The search server 100*a* uses the analysis unit 12 to analyze an image to be registered, and extracts feature information representing the feature of the image. The search server 100*a* stores the extracted feature information and the image used as an extraction source from which the feature information has been extracted, in the image DB 14 while associating the extracted feature information and the image with the image identification information for identifying the image used as the extraction source. The image used as the extraction source corresponds to the image to be registered, and for example, is the same image as the image to be registered.

The search server 100*a* also stores the linkage information to be provided to the user in the linkage information DB 15 while associating the linkage information with the image identification information. The image and the feature information, and the linkage information are stored in the image DB 14 and the linkage information DB 15, respectively, in association with the image identification information. The image to be registered is thus registered in the image search DB 11.

In general, an original image is irreproducible from the feature information extracted from the image. In other words, the feature information is image information from which an image as a source thereof cannot be reproduced in a form recognizable by human eyes. In contrast, image data is image information from which an image can be reproduced in a form recognizable by human eyes. Thus, the feature information on the image can be clearly distinguished from the image data.

The search system 10 performs the search processing for an image as schematically described below. For example, the search system 10 uses the communication unit 18 to receive an image and a search request that have been transmitted from the search terminal 30. That is, the communication unit 18 functions as an acquisition unit that acquires the image and the search request that have been transmitted from the search terminal 30. The search request transmitted from the search terminal 30 includes an image that serves as a key in an image search, an application ID, a module ID, a notification ID, and information indicating a language set in the search terminal 30. The communication unit 18 transfers the search request and the image thus received to the search unit 13. The search unit 13 executes search processing for the image in accordance with the search request. For example, the search unit 13 transfers the image transmitted from the search terminal 30, as an image serving as the extraction source, to the analysis unit 12.

The analysis unit 12 analyzes the transferred image to extract the feature information from the image, and transfers the extracted feature information to the search unit 13. Based on the feature information transferred from the analysis unit 12, the search unit 13 searches the image DB 14 for feature information having a high similarity to the transferred feature information.

The search unit 13 acquires the linkage information associated with the image identification information corresponding to the found feature information from the linkage information DB 15. The search server 100*a* uses the communication unit 18 to transmit the linkage information acquired from the linkage information DB 15, as a search result, to the search terminal 30. The search server 100*a* stores, in the history DB 107, the search request, information indicating the original transmitter of the search result, the image identification information corresponding to the found feature information, and the linkage information obtained as the search result while associating these pieces of information with one another.

In FIG. 2, the management server 101 includes a contract information DB 16 and a campaign information DB 17. The contract information DB 16 stores therein information on a contract concluded between the business operator who uses a service through the search system 10 and the service provider who provides the service is stored.

The campaign information DB 17 stores therein information on campaigns. The following schematically describes campaigns applicable to the first embodiment. In the image search DB 11, images are registered on a campaign-by-campaign basis in association with campaigns specified by people who register the images. The campaigns are identified by campaign IDs, and each include one or more images, metadata, and related campaign information. The name "campaign" is a term for business operators, and does not limit the scope of right. When the business operator provides some kind of service using the image search function for general users, units each called a "campaign" are prepared so that images, the linkage information, and various type of attribute information can be easily managed on a service-by-service basis.

Each image corresponding to one page in the campaign is called a "page", and includes one or more pieces of the linkage information. The metadata includes attribute information about the campaign. The attribute information about the campaign includes, for example, the campaign ID, the campaign name, the name of a client who has asked for the registration, the date and time of update, and information indicating whether the state is disclosed or undisclosed, about the campaign. The related campaign information is information indicating other campaigns related to this campaign. These pieces of information indicating the campaign are stored, for example, in the campaign information DB 17 by the management server 101.

Figure 4:
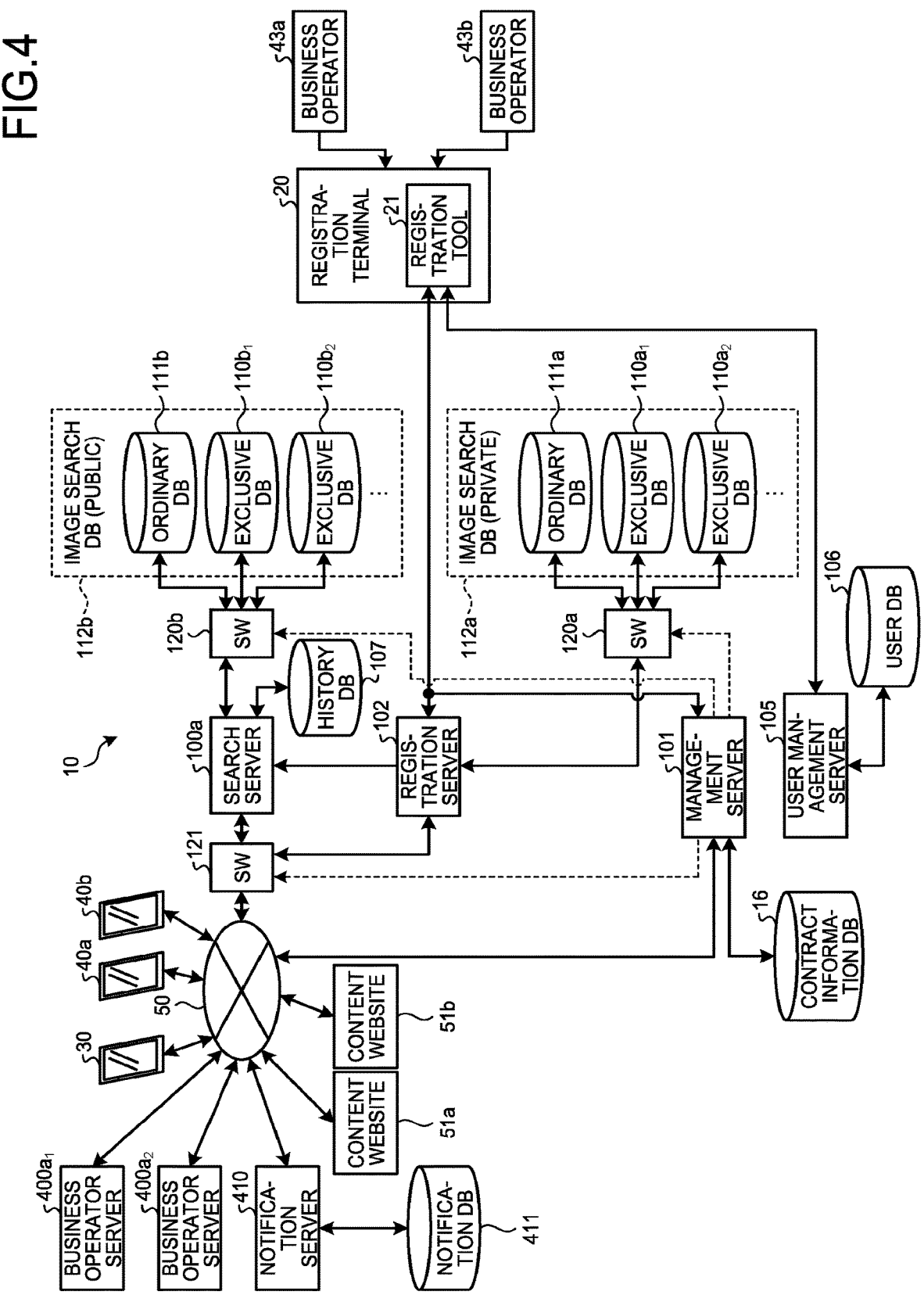
FIG. 4 is a block diagram schematically illustrating an exemplary configuration of the information processing system applicable to the first embodiment.

FIG. 4 schematically illustrates an exemplary configuration of the information processing system applicable to the first embodiment. In FIG. 4, the same reference numerals are assigned to the same components as those in FIG. 1 or FIG. 2 explained above, and detailed description thereof is omitted.

In FIG. 4, the information processing system includes the search system 10, the registration terminal 20, the search terminal 30, business operator systems 400*a*$_1$ and 400*a*$_2$, the notification server 410, business operator terminals 40*a* and 40*b*, and a user management server 105. A user DB 106 that stores therein user information is connected to the user management server 105. The search system 10 includes the search server 100*a*, the management server 101, and a registration server 102.

For descriptive purposes, FIG. 4 illustrates an image search DB 112*b* corresponding to the image search DB 11 of FIG. 2 in a manner such that the image search DB 112*b* is externally connected to the search server 100*a*. A notification DB 411 that stores therein notification IDs and the like is connected to the notification server 410.

The image search DB 112*b* includes a plurality of DBs including an ordinary DB 111*b* and exclusive DBs 110*b*$_1$, 110*b*$_2$, and so on each of which includes the image DB 14 and the linkage information DB 15. The search server 100*a* performs the image search using, as a search target DB, a DB that is selected from among the DBs included in the image search DB 112*b* by a switch unit (SW) 120*b* according to DB specifying information (to be described later) from the management server 101.

As described using FIG. 1 and FIG. 2, the search server 100*a* uses the analysis unit 12 to analyze the image (captured image) transmitted from the search terminal 30 through the network 50 so as to extract the feature information, and uses the search unit 13 to search the image DB 14 for feature information similar to the extracted feature information. The search server 100*a* acquires, from the linkage information DB 15, the linkage information corresponding to the image identification information associated with the feature information found from the image DB 14, and transmits the acquired linkage information to the search terminal 30.

The registration server 102 includes an image search DB 112*a* corresponding to the image search DB 112*b*, and has an image search function including the functions of the analysis unit 12 and the search unit 13 in the same manner as the search server 100*a*. In the same manner as the image search DB 112*b*, the image search DB 112*a* includes a plurality of DBs including an ordinary DB 111*a* and exclusive DBs 110*a*$_1$, 110*a*$_2$, and so on each including the image DB 14 and the linkage information DB 15. The ordinary DB 111*a*, and the exclusive DBs 110*a*$_1$, 110*a*$_2$, and so on correspond to the ordinary DB 111*b*, and the exclusive DBs 110*b*$_1$, 110*b*$_2$, and so on, respectively, included in the image search DB 112*b*.

Each of the exclusive DBs 110*a*$_1$, 110*a*$_2$, and so on and the exclusive DBs 110*b*$_1$, 110*b*$_2$, and so on is a DB in which a business operator designated in advance according to a contract can register an image. In contrast, the ordinary DBs 111*a* and 111*b* are DBs in which a plurality of business operators can register images in a shared manner.

Hereinafter, when not needing to be distinguished from one another, the exclusive DBs 110*a*$_1$, 110*a*$_2$, and so on and the exclusive DBs DB$110b_1$, $110b_2$, and so on will be each referred to as the exclusive DB, where appropriate. In the same manner, when not needing to be distinguished from each other, the ordinary DBs $111a$ and $111b$ will be each referred to as an ordinary DB, where appropriate.

The registration server 102 performs the image search using, as a search target DB, a DB that is selected from among the DBs included in the image search DB 112a by a switch unit (SW) 120a according to the DB specifying information (to be described later) from the management server 101.

The contract information DB 16 is connected to the management server 101. The contract information DB 16 stores therein contract information serving as information on a contract concluded between the service provider and the business operator. The contract information includes, with respect to the contract with the business operator, contract pattern information indicating a pattern of contract and the DB specifying information indicating which DB of the DBs included in the image search DBs 112a and 112b is the search target DB.

The management server 101 determines DBs selected by the switch units 120a and 120b based on the contract pattern information and the DB specifying information included in the contract information and on search pattern information included in the search request. The management server 101 switches a switch unit (SW) 121 based on the contract pattern information and the search pattern information so as to select which of the search server 100a and the registration server 102 is connected as an access destination through the network 50. That is, the management server 101 also functions as a control unit that controls the switch units 120a, 120b, and 121 to determine the search target DB.

The registration terminal 20 includes a registration tool 21. The registration tool 21 is implemented in the form of a computer program that runs on a central processing unit (CPU) of the registration terminal 20. The computer program for implementing the registration tool 21 is provided from the registration server 102, for example, as a result of connection of the registration terminal 20 to the registration server 102.

Images and linkage information to be associated with the images are provided from business operators 43a and 43b to the registration terminal 20. The registration terminal 20 uses the registration tool 21 to transmit the images provided from the business operators 43a and 43b and the linkage information associated with each of the images to the registration server 102. The registration terminal 20 can also use the registration tool 21 to transmit the contract information on the respective business operators 43a and 43b to the registration server 102.

The business operator servers $400a_1$ and $400a_2$ are assumed to be operated and managed by the respective business operators 43a and 43b. Likewise, the business operator terminals 40a and 40b are assumed to be used by the respective business operators 43a and 43b.

Figure 5:
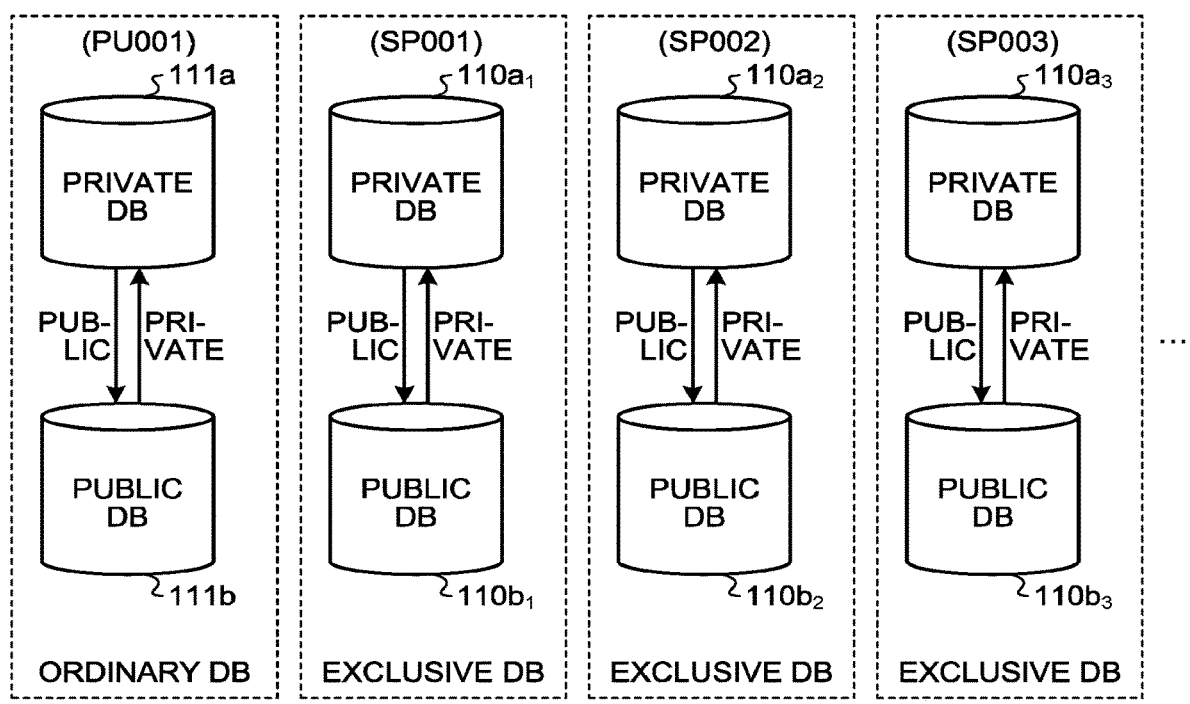
FIG. 5 is a diagram conceptually illustrating configurations of image search databases (DBs) applicable to the first embodiment.

FIG. 5 conceptually illustrates configurations of the image search DBs 112a and 112b applicable to the first embodiment. The ordinary DB 111a, the exclusive DB $110a_1$, the exclusive DB $110a_2$, and an exclusive DB $110a_3$ included in the image search DB 112a are private DBs that the general user is prohibited to search from the search terminal 30. By registering an image in any one of these private DBs, the business operator can use the business operator terminal 40a to search for and check the image before disclosure (before presentation) to the general user using this image. That is, the business operator can specify the private DB to be a search target when checking the image.

In contrast, the ordinary DB 111b, the exclusive DB $110b_1$, the exclusive DB $110b_2$, and an exclusive DB $110b_3$ included in the image search DB 112b are public DBs that allow search by the general user using the search terminal 30, and can be each specified as a search target by the search terminal 30 used by the general user and by the business operator terminal 40a used by the business operator. The business operator can move the image registered in the private DB to one of these public DBs. This example is not limiting, and the business operator may directly register the image in this public DB.

In each of the pairs of the ordinary DBs 111a and 111b, the exclusive DBs $110a_1$ and $110b_1$, the exclusive DBs $110a_2$ and $110b_2$, and the exclusive DBs $110a_3$ and $110b_3$, the DBs included in the pair are assigned the same DB number. In the example of FIG. 5, the exclusive DBs $110a_1$ and $110b_1$ forming one pair are each assigned with a DB number "SP001". In the same manner, the exclusive DBs $110a_2$ and $110b_2$ forming one pair and the exclusive DBs $110a_3$ and $110b_3$ forming one pair are assigned with DB numbers "SP002" and "SP003", respectively. The pair of the ordinary DBs 111a and 111b is assigned a DB number "PU001".

Through disclosure/non-disclosure processing, an image to be disclosed and an image to be undisclosed are moved between two DBs in each pair of the ordinary DBs 111a and 111b, the exclusive DBs $110a_1$ and $110b_1$, the exclusive DBs $110a_2$ and $110b_2$, and the exclusive DBs $110a_3$ and $110b_3$. In an example of the pair of the exclusive DBs 110a1, and 110b1, through the disclosure processing, an image specified as public among images set private (private images) stored in the exclusive DB $110a_1$ serving as a private DB is moved to the exclusive DB $110b_1$ serving as a public DB. Through the non-disclosure processing, an image specified to be private among images to be public (public images) stored in the exclusive DB $110b_1$ is moved to the exclusive DB 110a1.

In other words, the image to be disclosed that is stored in the exclusive DB $110a_1$ and has been set private is moved to the exclusive DB $110b_1$ through the disclosure processing, and thereby becomes available for searching from the business operator terminal 40a and the search terminal 30. In contrast, the image to be undisclosed that is stored in the exclusive DB $110b_1$ is moved to the exclusive DB $110a_1$ through the non-disclosure processing, and thereby becomes unavailable for searching (not specifiable as an image to be found) from the search terminal 30 while remaining available for searching (specifiable as an image to be found) from the business operator terminal 40a.

These movements of images to be disclosed and to be undisclosed between the DBs through the disclosure/non-disclosure processing apply in the same manner to the other pairs, that is, the ordinary DBs 111a and 111b, the exclusive DBs $110a_2$ and $110b_2$, and the exclusive DBs $110a_3$ and $110b_3$, in the example of FIG. 5.

Although the example of FIG. 5 illustrates that each of the image search DBs 112a and 112b includes three exclusive DBs, the image search DBs 112a and 112b are not limited to this example. For example, each of the image search DBs 112a and 112b is provided with a number of the exclusive DBs corresponding to the number of contracts with the respective business operators.

Figure 6:
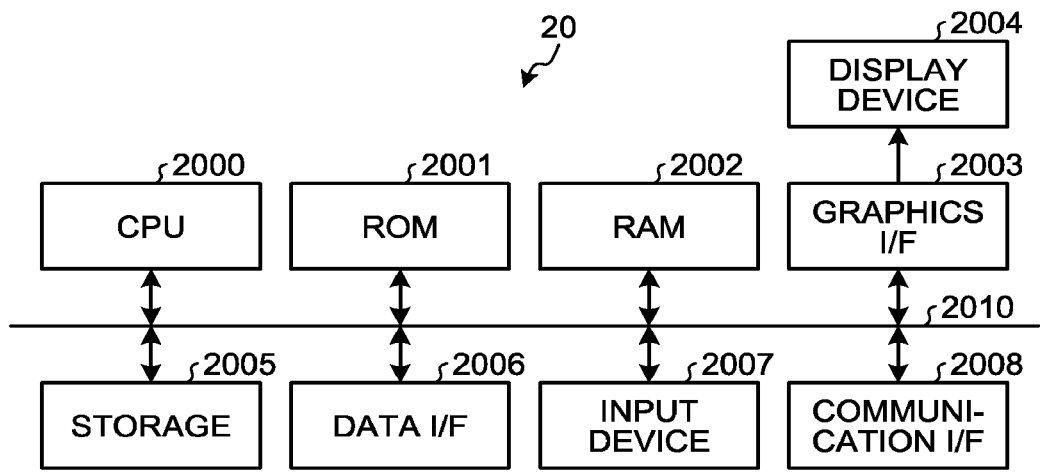
FIG. 6 is a block diagram illustrating an exemplary hardware configuration of a registration terminal applicable to the first embodiment.

FIG. 6 illustrates an exemplary configuration of hardware of the registration terminal 20 applicable to the first embodiment. In the registration terminal 20 illustrated in FIG. 6, a CPU 2000, a read-only memory (ROM) 2001, a random access memory (RAM) 2002, and a graphics interface (I/F)

2003 are connected to a bus 2010. A storage 2005, a data I/F 2006, an input device 2007, and a communication I/F 2008 are also connected to the bus 2010.

The storage 2005 is a storage medium capable of storing data in a non-volatile manner. For example, a hard disk drive is used as the storage 2005. The storage 2005 is not limited to this example. A non-volatile semiconductor memory, such as a flash memory, may be used as the storage 2005. The storage 2005 stores therein computer programs to be executed by the CPU 2000 and various kinds of data.

In accordance with computer programs stored in the ROM 2001 and the storage 2005, the CPU 2000 controls the entire operation of this registration terminal 20 using the RAM 2002 as a work memory.

The graphics I/F 2003 converts a display control signal generated by the CPU 2000 into a display signal that a display device 2004 is capable of operating with, and outputs the converted signal. The display device 2004 receives the signal output from the graphics I/F 2003 and provides display according to the display control signal.

The data I/F 2006 receives and outputs data from and to external equipment. An interface, such as a universal serial bus (USB) interface or a Bluetooth (registered trademark) interface, can be used as the data I/F 2006. The communication I/F 2008 performs communication through the network 50 using wireless communication under the control of the CPU 2000.

The input device 2007 includes, for example, a pointing device, such as a mouse, and a keyboard, and accepts user input. A user can issue an instruction to the registration terminal 20, for example, by operating the input device 2007 according to the display on the display device 2004.

Figure 7:
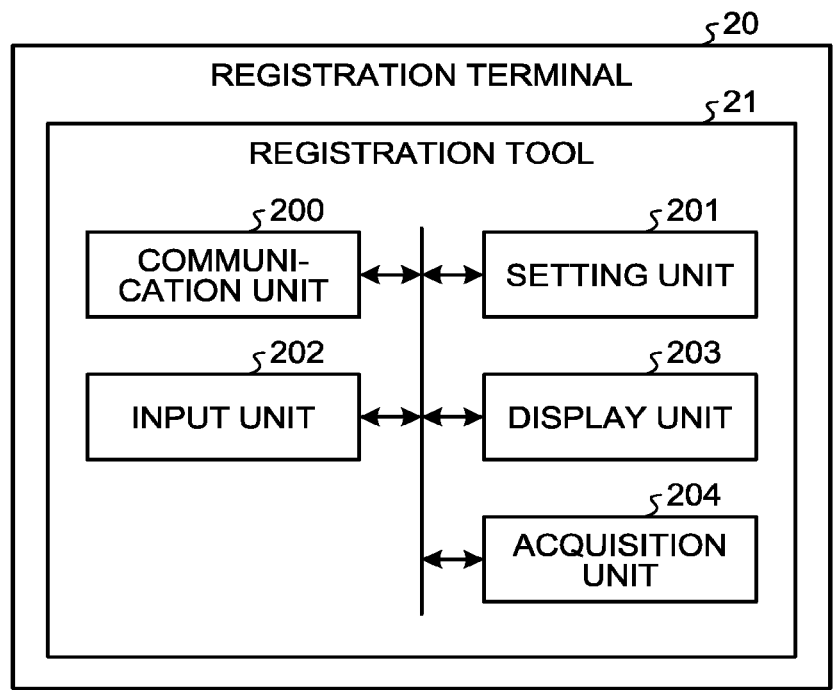
FIG. 7 is an exemplary functional block diagram for explaining functions of the registration terminal according to the first embodiment.

FIG. 7 illustrates an exemplary functional block diagram for explaining functions of the registration terminal 20 according to the first embodiment. The registration terminal 20 includes a registration tool 21, and the registration tool 21 includes a communication unit 200, a setting unit 201, an input unit 202, a display unit 203, and an acquisition unit 204.

The communication unit 200 performs communication through the network 50 by controlling the communication I/F 2008. The input unit 202 receives information input by an input operation performed on the input device 2007. The setting unit 201 sets linkage information for an image to be registered. The display unit 203 generates display information to be displayed by the display device 2004.

The acquisition unit 204 acquires an image from the outside of the registration terminal 20. The acquisition unit 204 may acquire an image transmitted from other equipment through the network 50 or may receive an image via a recording medium such as a compact disc (CD) or a digital versatile disc (DVD). The acquisition unit 204 may acquire an image from a print medium such as paper. The acquisition unit 204 also acquires, for example, in accordance with the information received by the input unit 202, information for the linkage information to be associated with images.

The units (the communication unit 200, the setting unit 201, the input unit 202, the display unit 203, and the acquisition unit 204) of the registration tool 21 included in the registration terminal 20 are implemented in the form of a computer program that runs on the CPU 2000.

More specifically, a browser application (hereinafter, browser) equivalent to those installed on general computers is installed on the registration terminal 20. The browser runs on the CPU 2000 and loads a file thereon to perform certain operations. The file is written in, for example, the HyperText Markup Language (HTML) format. When the registration server 102 is accessed on the registration terminal 20 by use of the browser, a certain information processing program on the registration server 102 is loaded on the browser, so that the information processing program loaded on the browser sets up the registration tool 21 on the registration terminal 20.

Figure 8:
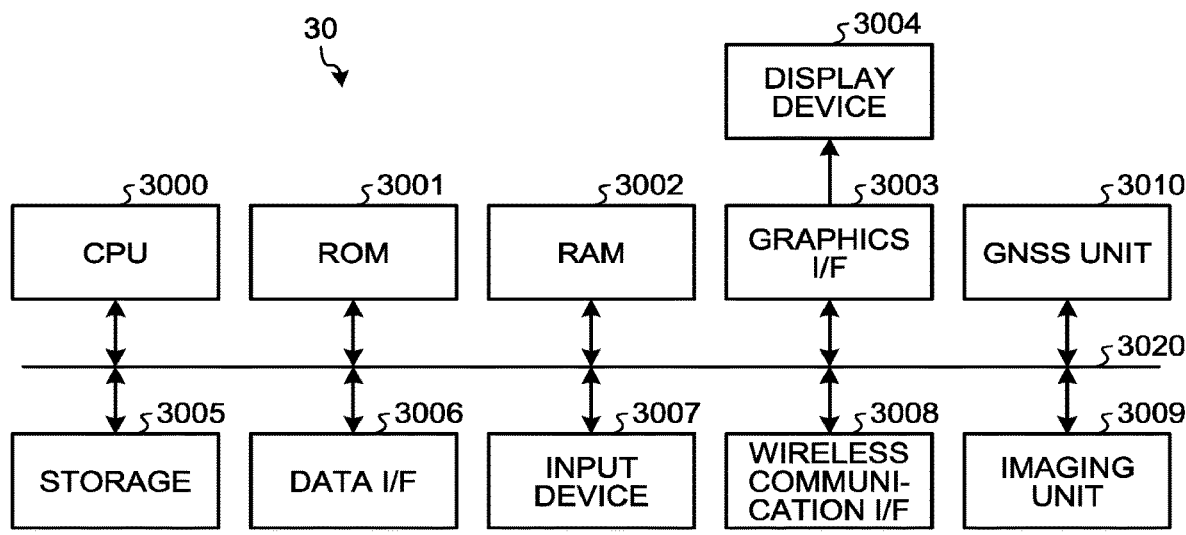
FIG. 8 is a block diagram illustrating an exemplary hardware configuration of a search terminal applicable to the first embodiment.

FIG. 8 illustrates an exemplary configuration of hardware of the search terminal 30 applicable to the first embodiment. In the search terminal 30 illustrated in FIG. 8, a CPU 3000, a ROM 3001, a RAM 3002, and a graphics I/F 3003 are connected to a bus 3020. A storage 3005, a data I/F 3006, an input device 3007, a wireless communication I/F 3008, an imaging unit 3009, and a global navigation satellite system (GNSS) unit 3010 are also connected to the bus 3020. The search terminal 30 is thus an information processing apparatus equipped with a computer including the CPU 3000, the ROM 3001, and the RAM 3002.

The storage 3005 is a storage medium capable of storing data in a non-volatile manner, and is, for example, a non-volatile semiconductor memory such as a flash memory. The storage 3005 is not limited to this example. A hard disk drive may be used as the storage 3005. The storage 3005 stores therein computer programs to be executed by the CPU 3000 and various kinds of data. The storage 3005 and the ROM 3001 may share, for example, one rewritable non-volatile semiconductor memory or the like.

In accordance with computer programs stored in the ROM 3001 and the storage 3005, the CPU 3000 controls the entire operation of this search terminal 30 using the RAM 3002 as a work memory. The graphics I/F 3003 converts a display control signal generated by the CPU 3000 into a signal that can be displayed by a display device 3004, and outputs the converted signal. The display device 3004 includes, for example, a liquid crystal display (LCD), and is driven by the signal output from the graphics I/F 3003 to perform display according to the display control signal.

The data I/F 3006 receives and outputs data from and to external equipment. An interface, such as a USB interface or a Bluetooth (registered trademark) interface, can be used as the data I/F 3006.

The input device 3007 accepts user input. A user can issue an instruction to the search terminal 30, for example, by operating the input device 3007 according to the display on the display device 3004. The input device 3007 and the display device 3004 are preferably integrated into a touch-screen panel that outputs a control signal corresponding to a pressed position and transmits images on the display device 3004.

The wireless communication I/F 3008 performs communication through the network 50 using wireless communication under the control of the CPU 3000.

The imaging unit 3009 includes an optical system, an imaging device, and a control and drive circuit for the optical system and the imaging device, and applies predetermined processing to an imaging signal output from the imaging device to output the result as a captured image formed by a digital signal. The captured image that has been output from the imaging unit 3009 and subjected to image processing can be stored in, for example, the storage 3005. The CPU 3000 can read the captured image from the storage 3005 and transmit it to the network via the wireless communication I/F 3008.

The GNSS unit 3010 measures the current position using a GNSS that measures a current location on the earth using an artificial satellite wherever on the earth the current location is. The GNSS unit 3010 is capable of outputting, as measurement results, locational information, that is, coordinates including at least the latitude and the longitude of the current location, and temporal information indicating a clock time when the current location is measured.

Figure 9:
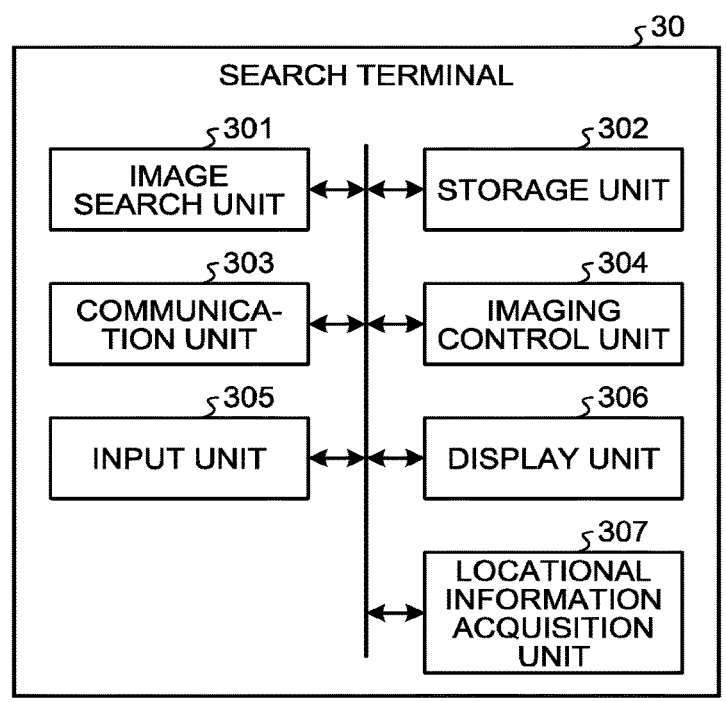
FIG. 9 is an exemplary functional block diagram for explaining functions of the search terminal applicable to the first embodiment.

FIG. 9 is an exemplary functional block diagram for explaining functions of the search terminal 30 applicable to the first embodiment. The search terminal 30 includes an image search unit 301, a storage unit 302, a communication unit 303, an imaging control unit 304, an input unit 305, a display unit 306, and a locational information acquisition unit 307. The image search unit 301, the storage unit 302, the communication unit 303, the imaging control unit 304, the input unit 305, the display unit 306, and the locational information acquisition unit 307 are implemented in the form of a computer program that runs on the CPU 3000. This example is not limiting, and some or all of the image search unit 301, the storage unit 302, the communication unit 303, the imaging control unit 304, the input unit 305, the display unit 306, and the locational information acquisition unit 307 except the image search unit 301 may be built using hardware circuits that operate in cooperation with one another.

The image search unit 301 performs image search processing on the search terminal 30 according to the first embodiment. The image search unit 301 is set up on the search terminal 30 as a result of installing, on the search terminal 30, an image search application distributed by the service provider to the business operator having a particular contract, or a customized application that the image search application has been customized into by the business operator. The particular contract permits using the search system 10 for processing such as registration and disclosure of images.

The storage unit 302 controls storage of data in and readout of data from the storage 3005 and the RAM 3002. The communication unit 303 controls the wireless communication performed by the wireless communication I/F 3008. The input unit 305 outputs input information according to an input operation on the input device 3007. The display unit 306 generates a display control signal to be supplied to the graphics I/F 3003. The imaging control unit 304 controls the imaging operation of the imaging unit 3009. The locational information acquisition unit 307 controls acquisition of the locational information and the temporal information that is performed by the GNSS unit 3010.

Figure 10:
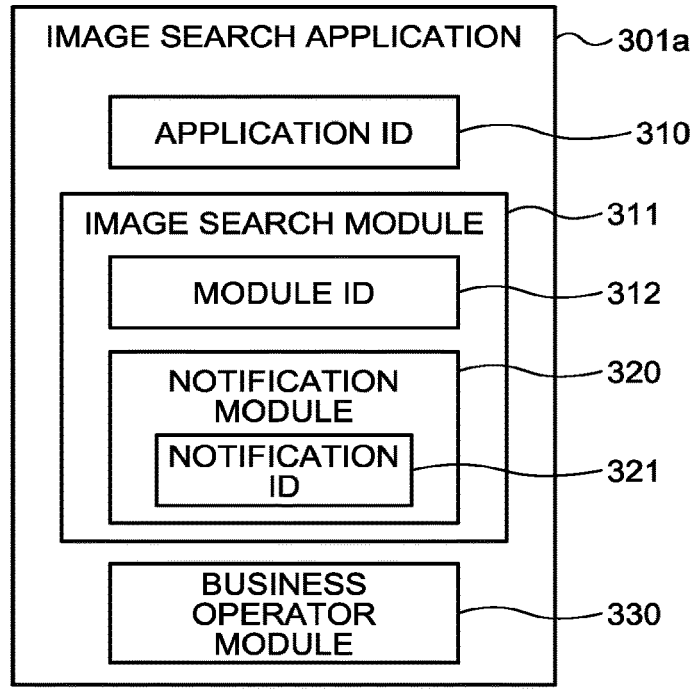
FIG. 10 is a diagram illustrating an exemplary configuration of an image search application for setting up an image search unit applicable to the first embodiment.

FIG. 10 is a block diagram illustrating an exemplary configuration of an image search application for setting up the image search unit 301 applicable to the first embodiment. In FIG. 10, an image search application 301a includes an application ID 310, an image search module 311, and a business operator module 330. The image search module 311 includes a module ID 312 serving as identification information for identifying the image search module 311 and a notification module 320 for executing a push notification.

The image search application 301a corresponds to the above-described customized application, and is configured, for example, in a manner such that the image search module 311 provided by the service provider is incorporated with the business operator module 330 provided by the business operator.

The application ID 310 is, for example, identification information unique to each image search module 311 that is incorporated in the image search application 301a and is provided to the business operator, and identifies one customized application created by the business operator. Consequently, if one business operator creates a plurality of customized applications, the customized applications have different application IDs from one another. Alternatively, one application ID may be given to a plurality of customized applications of one business operator. The application ID 310 may be set and incorporated in the image search application 301a by the business operator, or may be set in association with an image search module 311 that the service provider provides to the business operator and be provided together with the image search module 311 to the business operator by the service provider.

The notification module 320 stores a notification ID 321 and executes processing related to a push notification. For example, the notification module 320 requests the notification ID 321 from the notification server 410 as described above and stores the notification ID 321 transmitted from the notification server 410, for example, in a management area for the notification module 320 in the storage 3005. The above-described push-supporting application can be set up by use of the notification module 320.

Figure 11:
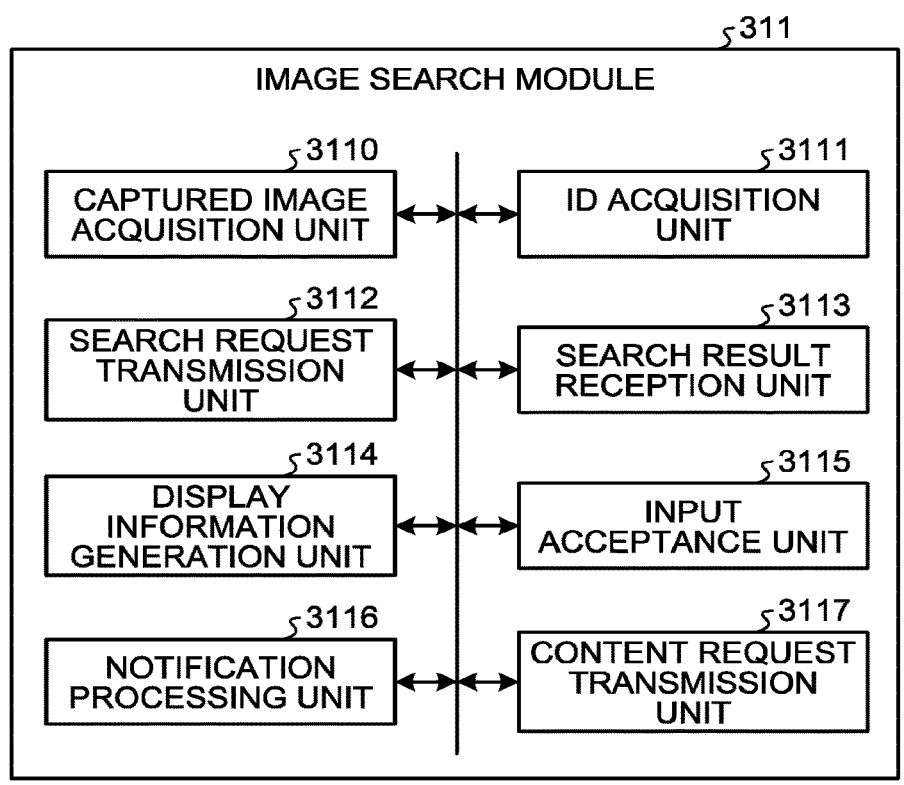
FIG. 11 is an exemplary functional block diagram for explaining functions of an image search module applicable to the first embodiment.

FIG. 11 is an exemplary functional block diagram for explaining functions of the image search module 311 applicable to the first embodiment. In FIG. 11, the image search module 311 includes a captured image acquisition unit 3110, an ID acquisition unit 3111, a search request transmission unit 3112, a search result reception unit 3113, a display information generation unit 3114, an input acceptance unit 3115, a notification processing unit 3116, and a content request transmission unit 3117.

The captured image acquisition unit 3110 acquires the captured image captured by the imaging unit 3009 from the imaging control unit 304. The ID acquisition unit 3111 performs processing for acquiring various IDs. The search request transmission unit 3112 generates a search request for requesting the search system 10 to search for an image based on the captured image acquired by the captured image acquisition unit 3110. The search request transmission unit 3112 transmits the generated search request to the search system 10 via the wireless communication I/F 3008.

The search result reception unit 3113 receives the search result transmitted from the search system 10 in response to the search request transmitted by the search request transmission unit 3112. The display information generation unit 3114 generates display information to be displayed by the display device 3004. For example, the display information generation unit 3114 generates the display information to be displayed in accordance with the search result received by the search result reception unit 3113. The input acceptance unit 3115 accepts the input operation performed on the input device 3007. The display information generation unit 3114 and the input acceptance unit 3115 constitute the fundamental part of a user interface (UI) provided by the image search application 301a.

The notification processing unit 3116 is provided for implementing the function of the notification module 320 and executes processing related to a push notification. The content request transmission unit 3117 transmits, onto the network 50, information about a content request.

Figure 12:
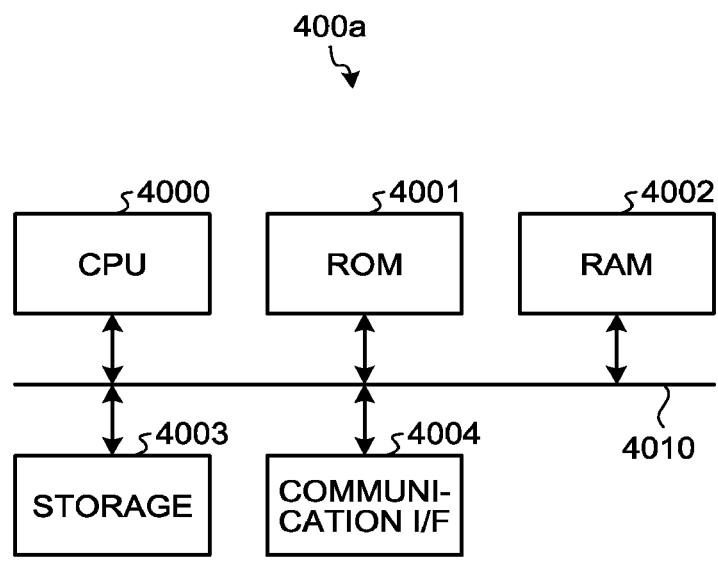
FIG. 12 is a block diagram illustrating an exemplary hardware configuration of a business operator server applicable to the first embodiment.

FIG. 12 illustrates an exemplary hardware configuration of the business operator server 400a applicable to the first embodiment. In FIG. 12, in the business operator server 400a, a CPU 4000, a ROM 4001, a RAM 4002, a storage 4003, and a communication I/F 4004 are connected to a bus 4010. The storage 4003 is a storage medium capable of storing data in a non-volatile manner, and is, for example, a hard disk drive. The storage 4003 is not limited to this example. A non-volatile semiconductor memory, such as a flash memory, may be used as the storage 4003.

In accordance with computer programs stored in the ROM 4001 and the storage 4003, the CPU 4000 controls the entire operation of this business operator server 400a using the RAM 4002 as a work memory. The storage 4003 stores therein computer programs to be executed by the CPU 4000 and various kinds of data. The communication I/F 4004 performs communication through the network 50 under the control of the CPU 4000.

Although FIG. 12 illustrates the business operator server 400a as being built of one piece of hardware, the business operator server 400a is not limited to this example. For example, the business operator server 400a may be built in a manner such that a plurality of server devices having the same hardware configuration are integrally controlled. The business operator server 400a can be provided with a function of a content server that provides a content through a website. In this case, information constituting the website and the content provided through the website can be stored in a certain area on the storage 4003 in the business operator server 400a.

Although FIG. 12 illustrates that the storage 4003 is built of one piece of hardware, the storage 4003 is not limited to this example. For example, a plurality of storage devices may be integrally managed as the single storage 4003.

Figure 13:
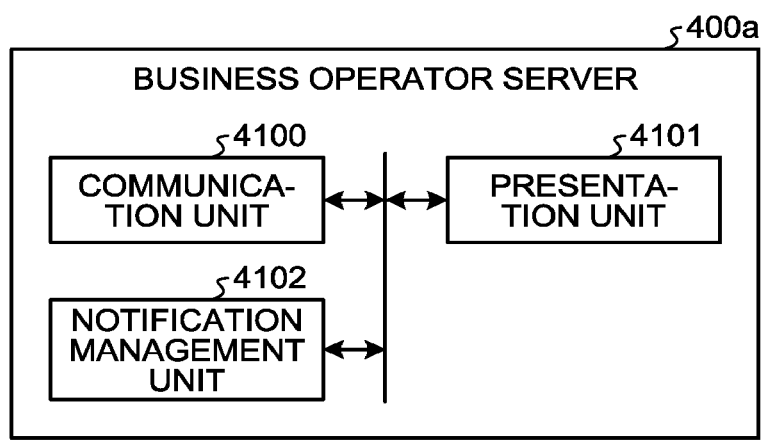
FIG. 13 is an exemplary functional block diagram for explaining functions of a business operator server according to the first embodiment.

FIG. 13 is an exemplary functional block diagram for explaining functions of the business operator server 400a according to the first embodiment. The business operator server 400a includes a communication unit 4100, a presentation unit 4101, and a notification management unit 4102. The communication unit 4100, the presentation unit 4101, and the notification management unit 4102 are implemented in the form of a computer program that runs on the CPU 4000. This example is not limiting, and some or all of the communication unit 4100, the presentation unit 4101, and the notification management unit 4102 may be built using hardware circuits that operate in cooperation with one another.

The communication unit 4100 controls communication performed through the network 50 via the communication I/F 4004. The presentation unit 4101 generates and stores presentation information to be presented to the search terminal 30 through the network 50. The notification management unit 4102 manages notifications configured as push notifications.

Registration Processing Applicable to First Embodiment

Figure 14:
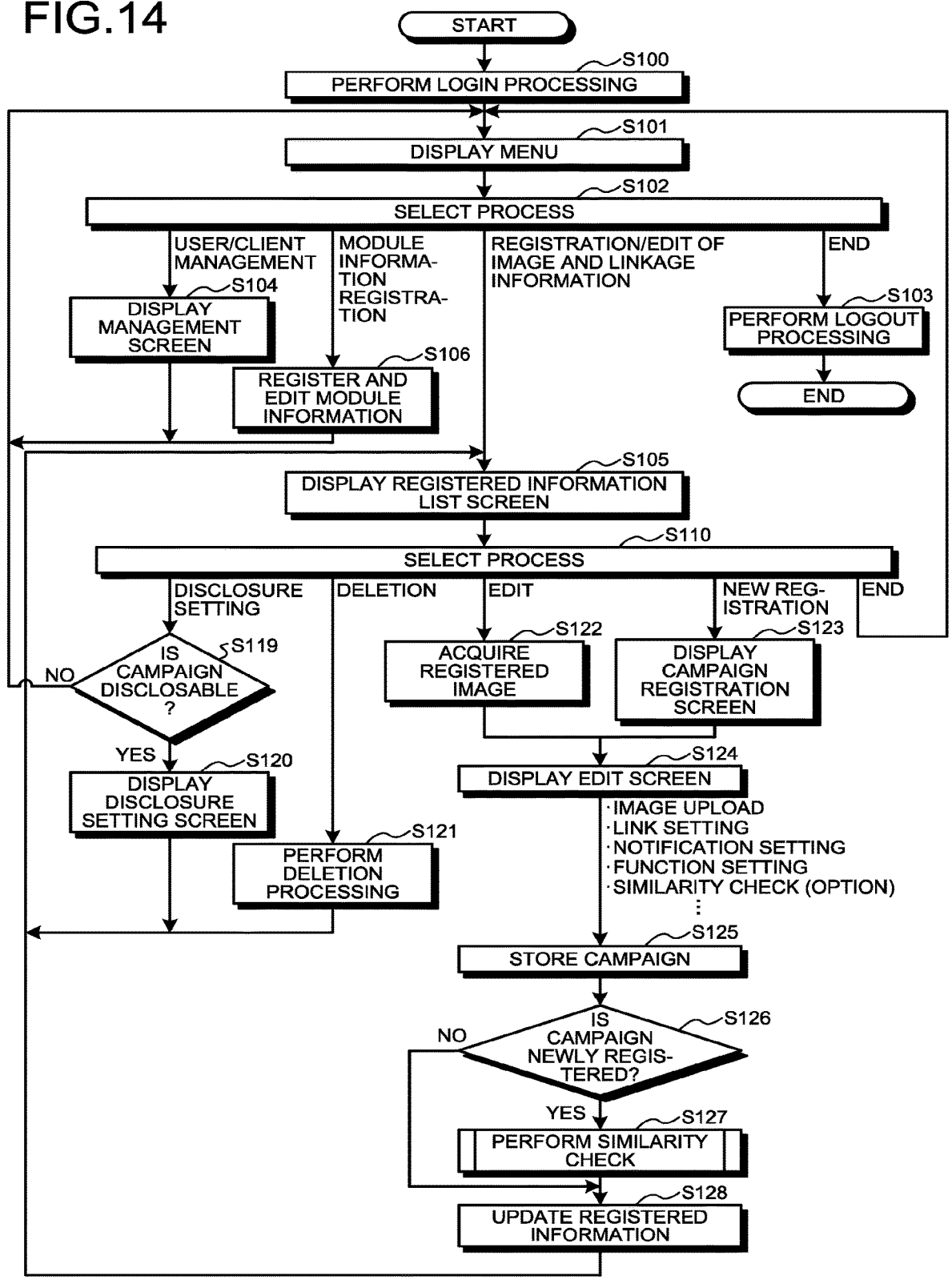
FIG. 14 is an exemplary flowchart illustrating registration processing applicable to the first embodiment.

The following describes registration processing applicable to the first embodiment. FIG. 14 is an exemplary flowchart illustrating the registration processing, applicable to the first embodiment, to be performed by the registration tool 21 in the registration terminal 20. Information on a user (a login ID and a password) who uses the registration tool 21 is assumed to have been registered in the user DB 106 by the user management server 105 prior to the processing of the flowchart of FIG. 14. Hereinafter, images are assumed to be registered on a campaign-by-campaign basis in association with campaigns specified by people who register the images.

Figure 15:
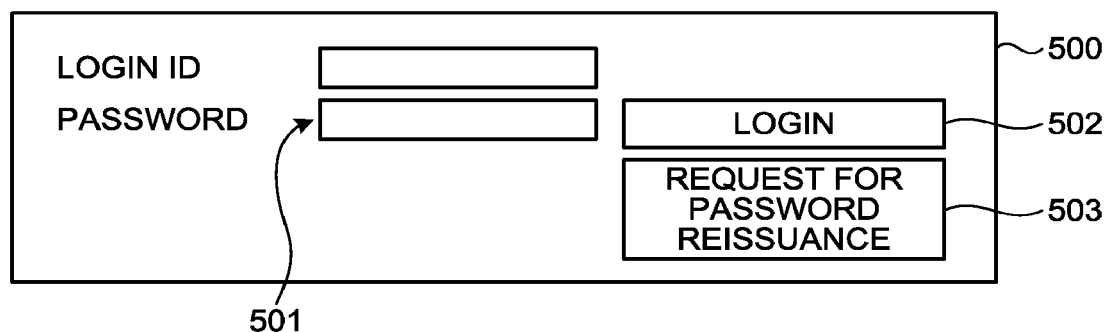
FIG. 15 is a diagram illustrating an example of a login screen applicable to the first embodiment.

After the registration tool 21 is started up on the registration terminal 20, the registration tool 21 performs login processing for the user at Step S100. For example, the registration tool 21 displays a login screen 500 illustrated in FIG. 15 on the display device of the registration terminal 20. In the example of FIG. 15, an input section 501 for entering the user information (the login ID and the password), a button 502 for requesting login, and a button 503 for asking for reissue of a password are arranged on the login screen 500.

Hereinafter, expressions such as "display a screen on the registration terminal 20" are used to mean "display a screen on the display device 2004 of the registration terminal 20" where appropriate. Likewise, expressions such as "display a screen on the search terminal 30" are used to mean "display a screen on the display device 3004 of the search terminal 30" where appropriate.

For example, in response to entry of a login ID and a password into the input section 501, the registration tool 21 transmits the login ID and the password thus entered to the user management server 105, and requests authentication of the login ID. Upon reception of information indicating successful authentication of the login ID from the user management server 105, the registration tool 21 shifts the processing to Step S101.

Figure 16:
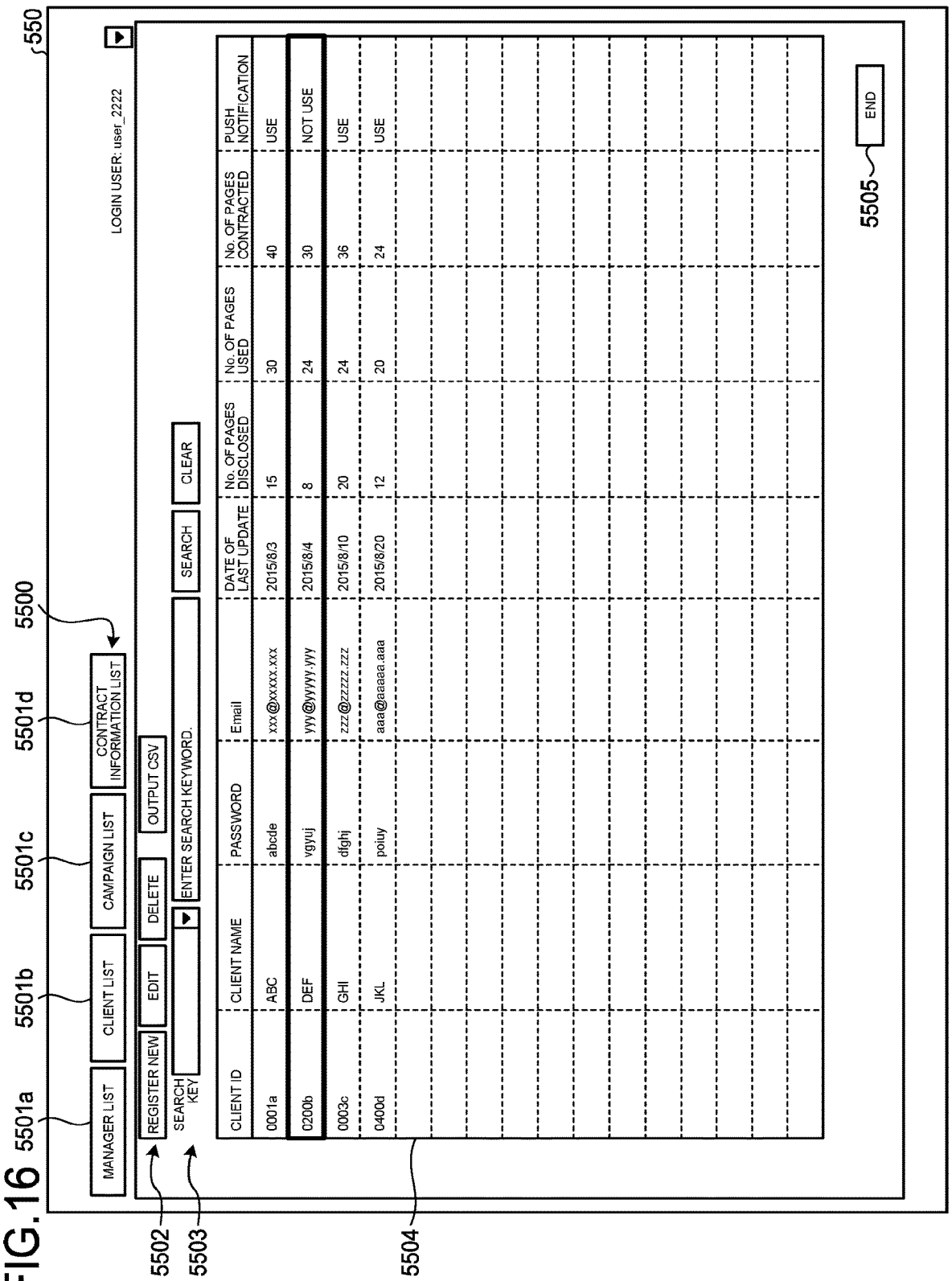
FIG. 16 is a diagram illustrating an example of a client list screen including a menu region, the client list screen being applicable to the first embodiment.

At Step S101, the registration tool 21 displays a screen including a menu region on the registration terminal 20. FIG. 16 illustrates an example of a client list screen 550, applicable to the first embodiment, that includes a menu region 5500. In the example of FIG. 16, the menu region 5500 including tabs 5501a, 5501b, 5501c, and 5501d, a button group 5502, a search input section 5503, a list display region 5504, and an end button 5505 are arranged on the client list screen 550.

The tabs 5501a, 5501b, 5501c, and 5501d included in the menu region 5500 are tabs for selecting a menu item to determine the operational mode of the registration tool 21. The tabs 5501a and 5501b are tabs for switching to a user management mode, and are operated to display a manager list and a client list, respectively. The tab 5501c is a tab for switching to an image registration mode, and is operated to display a campaign list. The tab 5501d is a tab for switching to a module information registration mode, and enables displaying a list of contract information indicating contracts made between the service provider and the business operator.

The list display region 5504 is used for displaying a list corresponding to a menu item selected with one of the tabs 5501a, 5501b, 5501c, and 5501d. The example of FIG. 16 illustrates a state in which the tab 5501b is operated to select the client list. Hereinafter, each row of the list is called a record, and each column thereof is called an item.

A process to be applied to the list displayed in the list display region 5504 is selected with the button group 5502. In the example of FIG. 16, the button group 5502 includes four buttons, and the respective buttons are assigned with functions of "New registration", "Edit", "Delete", and "CSV output" in the order from the left. The "New registration" button enables newly adding a record to the list displayed in the list display region 5504. The "Edit" button enables editing information in a record selected in the list displayed in the list display region 5504. The "Delete" button enables deleting the information in the record selected in the list displayed in the list display region 5504. The "CSV output" enables outputting information in the list displayed in the list display region 5504 as a text file in the comma separated value (CSV) format.

The search input section 5503 enables selecting a record from a list displayed in the list display region 5504, based on a search key selected or input. The end button 5505 enables ending the processing performed by the registration tool 21.

In the example of FIG. 16, client information has records each including items of "Client ID", "Client name", "Password", "E-mail address (Email)", "Date of last update", "Number of pages disclosed", "Number of pages used", "Number of pages contracted", and "Push notification". The client information may include more items.

The description refers back to FIG. 14. After the menu is displayed at Step S101, the processing is shifted to the next step S102, and the registration tool 21 waits until any one of the tabs 5501a, 5501b, 5501c, and 5501d and the end button 5505 is operated to select a process. If the end button 5505 is operated, the registration tool 21 shifts the processing to Step S103 to perform logout processing for the user, and ends the operation of the registration tool 21.

If the tab 5501a or the tab 5501b is operated at Step S102 to select the user management mode, the registration tool 21 shifts the processing to Step S104. At Step S104, the registration tool 21 displays either a manager list screen or a client list screen (refer to FIG. 16) according to which tab, the tab 5501a or the tab 5501b, has been operated at Step S102. Here, the tab 5501b is assumed to have been operated to display the client list screen 550 illustrated in FIG. 16.

If the "New registration" button or the "Edit" button included in the button group 5502 is operated on the client list screen 550, a client registration/edit screen 510 applicable to the first embodiment that is exemplified in FIG. 17 is displayed. In FIG. 17, input regions 5101 to 5108, a push notification setting section 5109, an "OK" button 5110, and a "Cancel" button 5111 are arranged on the client registration/edit screen 510.

The name of a client to be registered is entered in the input region 5101. The upper limit value of the number of pages usable by the client is entered in the input region 5102. The contact information (e-mail address in this example) of the client is entered in the input region 5103. A client ID for identifying the client is entered in the input region 5104. The password used for authentication is entered in the input region 5105 when the client attempts to use the search system 10. The input region 5106 is a button for automatically generating an initial value of the password to be entered into the input region 5105. A note is entered into the input region 5107.

The client ID and the password entered into the input regions 5104 and 5105, respectively, are assumed to be registered in the user DB 106 by the user management server 105, for example, in association with the login ID transmitted from the registration terminal 20 to the user management server 105 and entered when the user logged into the registration tool 21.

The module ID 312 associated with the client ID of the client is entered into the input region 5108. The module ID 312 can be manually entered into the input region 5108. This example is not limiting. If the module IDs 312 are already associated with the client ID, the module ID 312 may be selected from among these module IDs 312 associated with the client ID to be entered.

The push notification setting section 5109 enables setting whether the client uses push notifications. In the example of FIG. 17, the push notification setting section 5109 includes two radio buttons for exclusively setting whether or not to use push notifications. The result of this setting through this push notification setting section 5109 is reflected in the value of the item "Push notification" in the above-described client information.

The "OK" button 5110 enables finalizing entries entered into the input regions 5101 to 5108 and a setting entered in the push notification setting section 5109. For example, if the "OK" button 5110 is operated, the registration tool 21 transmits the pieces of information including the entries entered in the input regions 5101 to 5108 and a value set in the push notification setting section 5109 to the management server 101. The management server 101 receives the pieces of information transmitted from the registration tool 21, and stores the received pieces of information in the contract information DB 16. The "Cancel" button 5111 enables discarding the information entered into the input regions 5101 to 5108 and the push notification setting section 5109 and displaying the client list screen 550.

If an operation is performed indicating the end of the processing on the manager list screen or the client list screen 550, the registration tool 21 returns the processing to Step S101 to display the screen including the menu region 5500.

Figure 18:
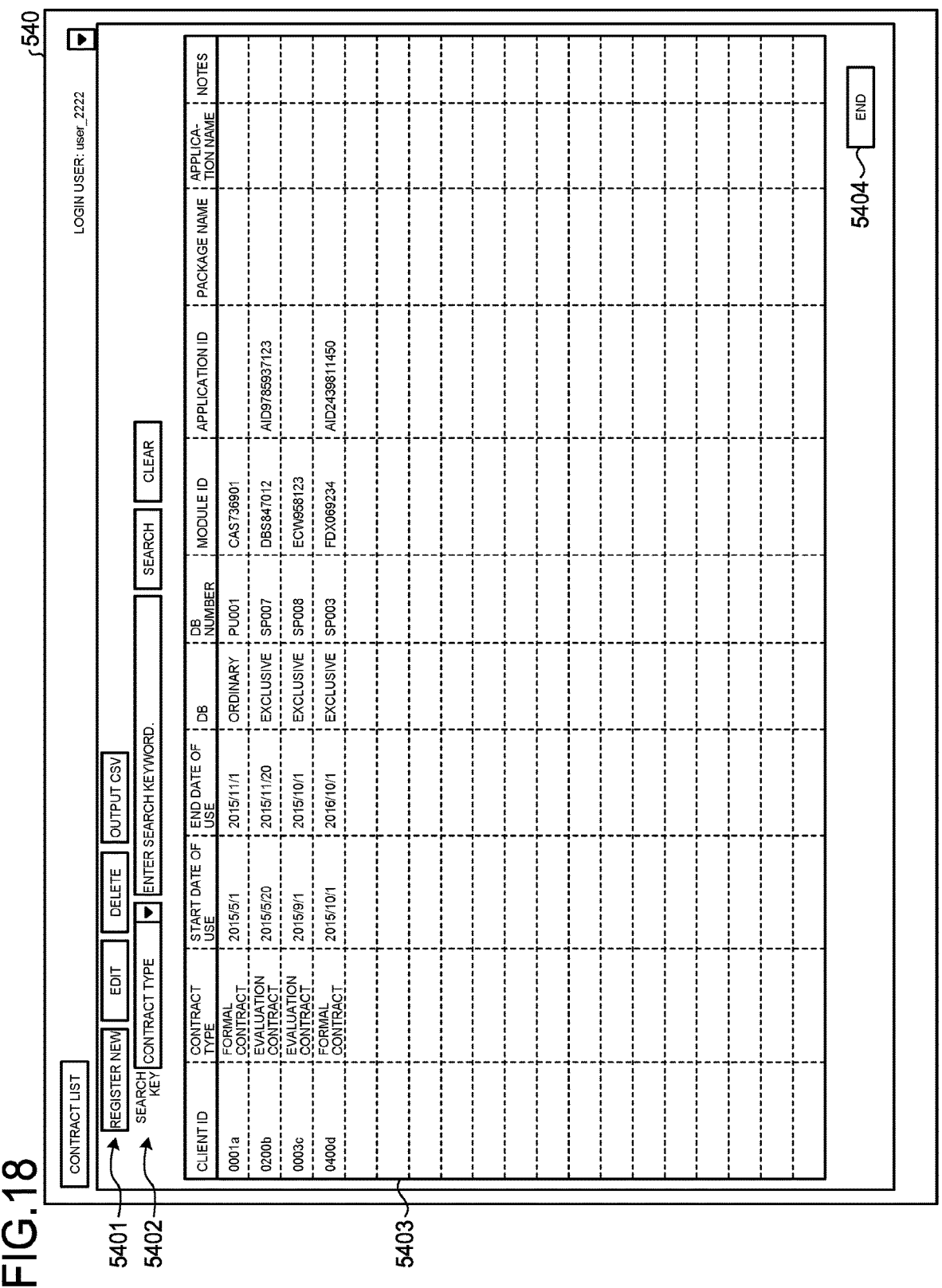
FIG. 18 is a diagram illustrating an example of a contract list screen applicable to the first embodiment.

If the tab 5501d is operated at Step S102 to select the module information registration mode, the registration tool 21 shifts the processing to Step S106. At Step S106, the registration tool 21 displays a contract list screen 540 applicable to the first embodiment as exemplified in FIG. 18. In FIG. 18, a button group 5401, a search input section 5402, a list display region 5403, and an end button 5404 are arranged on the contract list screen 540. If the end button 5404 is operated, the registration tool 21 returns the processing to Step S101 to display the screen including the menu region 5500.

The list display region 5403 is used for displaying the list of the contract information registered in the management server 101 (contract information DB 16). In the example of FIG. 18, each record in the list displayed in the list display region 5403 is created, for example, on a campaign-by-campaign basis, and includes items of "Client ID", "Contract type", "Start date of use", "End date of use", "Database (DB)", "DB number", "Module ID", "Application ID", "Package name", "Application name", and "Notes". The management server 101 stores the information included in the record in the contract information DB 16. The registration tool 21 communicates with the management server 101 to acquire the contract information stored in the contract information DB 16 and displays the acquired contract information in the list display region 5403.

The button group 5401 includes four buttons, and the respective buttons are assigned functions of "New registration", "Edit", "Delete", and "CSV output" in order from the left. The "New registration" button enables newly adding a record to the list displayed in the list display region 5403. The "Edit" button enables editing information in a record selected in the list displayed in the list display region 5403. The "Delete" button enables deleting the information in the record selected in the list displayed in the list display region 5403. The "CSV output" enables outputting information in the list displayed in the list display region 5403 as a text file in the CSV format.

Figure 19:
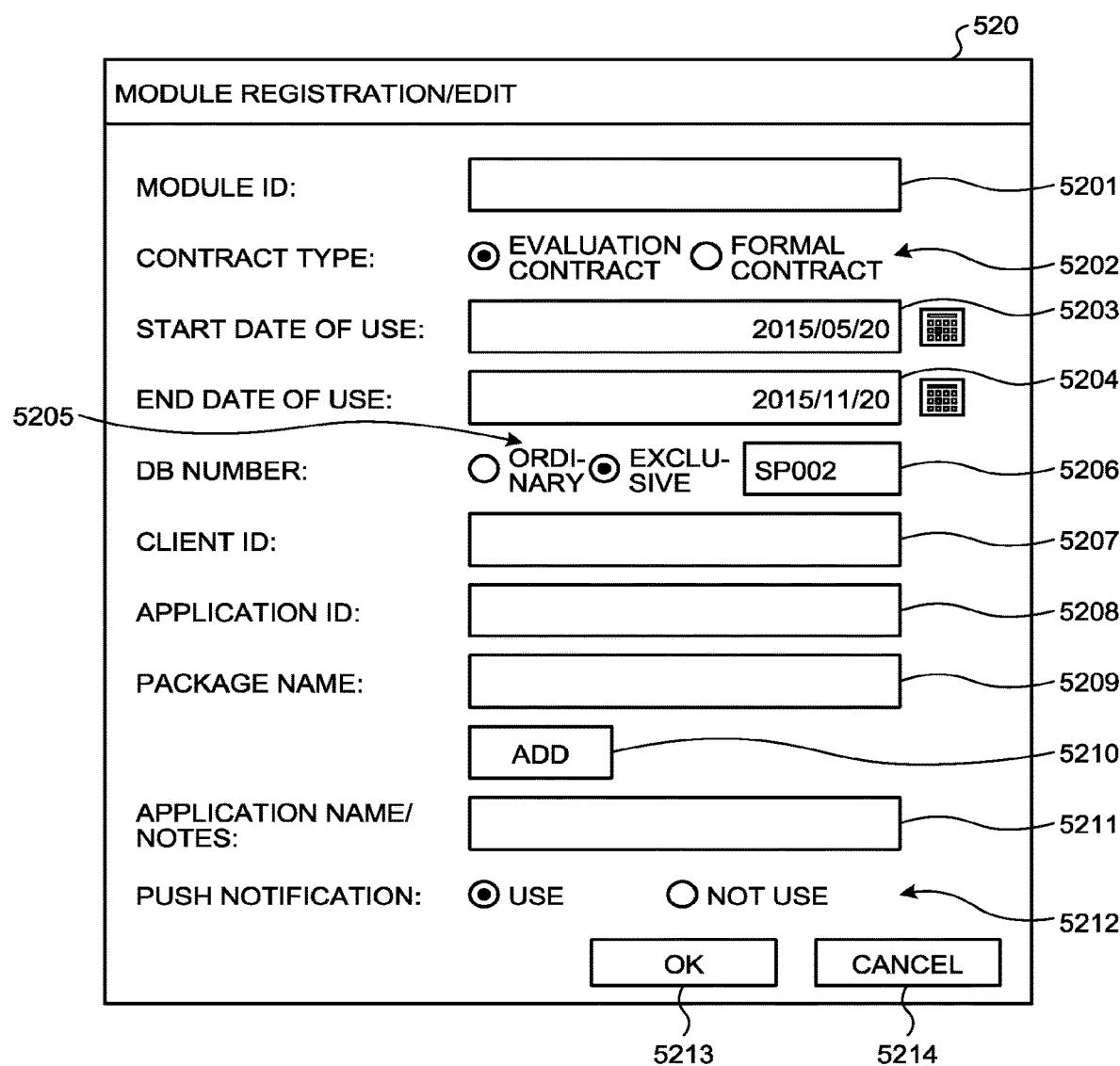
FIG. 19 is a diagram illustrating an example of a module registration/edit screen applicable to the first embodiment.

If the "New registration" button or the "Edit" button included in the button group 5401 is operated, a module registration/edit screen 520 applicable to the first embodiment that is, for example, exemplified in FIG. 19 is displayed as a screen for newly registering or editing the contract information. In FIG. 19, input regions 5201 to 5211, a push notification setting section 5212, an "OK" button 5213, and a "Cancel" button 5214 are arranged on the module registration/edit screen 520.

The module ID 312 of the image search module 311 provided to the business operator by the service provider is entered into the input region 5201. Values unique to the respective image search modules 311 provided by the search system 10 is used as the module IDs 312. For example, the management server 101 uniquely generates the module IDs 312. The management server 101 transmits the generated module ID 312 to the registration tool 21. Upon receiving the module ID 312 transmitted from the management server 101, the registration tool 21 enters the received module ID 312 into the input region 5201. This example is not limiting, and the module ID 312 may be manually entered. For example, a contract is made with the business operator for each module ID 312.

The contract pattern (contract type) is entered into the input region 5202. In this example, two patterns of contract, that is, an evaluation contract and a formal contract are prepared as the contract patterns. The evaluation contract is of a contract pattern that the business operator uses to evaluate the search system 10, and enables the business operator to register images in the image search DB 112a serving as a private DB while not enabling the business operator to perform the disclosure processing. The formal contract is a contract that defines a wider scope of authority than the evaluation contract, and enables the customer to register images in the image search DB 112a serving as a private DB and in the image search DB 112b serving as a public DB. The formal contract enables the customer to perform both the disclosure processing and the non-disclosure processing. The evaluation contract or the formal contract is exclusively entered into the input region 5202. Information indicating the contract pattern is set as type information and reflected in the business operator terminal 40.

The start date of use and the end date of use, respectively, of the module ID 312 entered into the input region 5201, that is, those of the image search module 311 corresponding to the module ID 312 are entered into the input regions 5203 and 5204. The image search module 311 is made usable within a period from the date entered into the input region 5203 to the date entered into the input region 5204 and is made unusable outside the period. The start date of use and the end date of use correspond to the start date and the end date of the contract for the image search module 311.

The input regions 5205 and 5206 are used for specifying a DB to be used for the image search by the image search module 311 corresponding to the module ID 312 entered into the input region 5201. The input region 5205 is used for specifying which pair, the pair of the ordinary DBs 111a and 111b or any one of the pairs of the exclusive DBs $110a_1$ and $110b_1$, $110a_2$ and $110b_2$, and so on, is used. Entering "Ordinary" specifies the pair of the ordinary DBs 111a and 111b. In contrast, entering "Exclusive" specifies any one of the pairs of the exclusive DBs B$110a_1$ and $110b_1$, $110a_2$ and $110b_2$, and so on.

The input region 5206 is used for entering the DB number of the specified pair of DBs. For example, with reference to FIG. 4, if the "Exclusive" is entered into the input region 5205 and the "SP002" is entered into the input region 5206, the pair of the exclusive DBs $110a_2$ and $110b_2$ is specified as databases to be used. If the "Ordinary" is entered into the input region 5205, for example, the DB number assigned to the pair of the ordinary DBs 111a and 111b is automatically entered. A different number is provided as the DB number from the service provider to each business operator according to the contract.

A client ID for identifying a business operator associated with this contract information is entered into the input region 5207.

The application ID 310 is entered into the input region 5208. The input region 5208 may be left blank. Entering the application ID 310 of the image search application 301a into the input region 5208 enables filtering to find the image search application 301a corresponding to the entered application ID 310.

The input regions 5209 to 5211 are used for entering optional information, and can be left with no entry. The input region 5209 is used for entering, for example, a package name of the image search application 301a incorporating the image search module 311 including the module ID 312 entered into the input region 5201. The name of the image search application 301a or any note is entered into the input region 5211. The input region 5210 is an "Add" button, which adds the input region 5211.

The push notification setting section 5212 enables setting whether a push notification is used in this module. In the example of FIG. 19, the push notification setting section 5212 includes two radio buttons for exclusively setting whether or not to use a push notification. The push notification setting section 5212 is configured, for example, not to accept the setting operation or not to be displayed unless using push notification is selected through the push notification setting section 5109 on the above-described client registration/edit screen 510.

The "OK" button 5213 finalizes entries entered into the input regions 5201 to 5211 and a setting entered in the push notification setting section 5212. For example, if the "OK" button 5213 is operated, the registration tool 21 sets, as contract information, the pieces of information including the entries entered in the input regions 5201 to 5211 and a value set in the push notification setting section 5212, and transmits the contract information to the management server 101. The management server 101 receives the contract information transmitted from the registration tool 21, and stores the received contract information in the contract information DB 16. The "Cancel" button 5214 discards the pieces of information entered into the input regions 5201 to 5211 and the value set in the push notification setting section 5212, and, for example, returns the processing to Step S101 to display the screen including the menu region 5500.

Referring back to FIG. 14, if the tab 5501c is operated at Step S102 to select the image registration mode, the registration tool 21 shifts the processing to Step S105. At Step S105, the registration tool 21 displays, on the registration terminal 20, a registered information list screen indicating information on registered campaigns.

Figure 20:
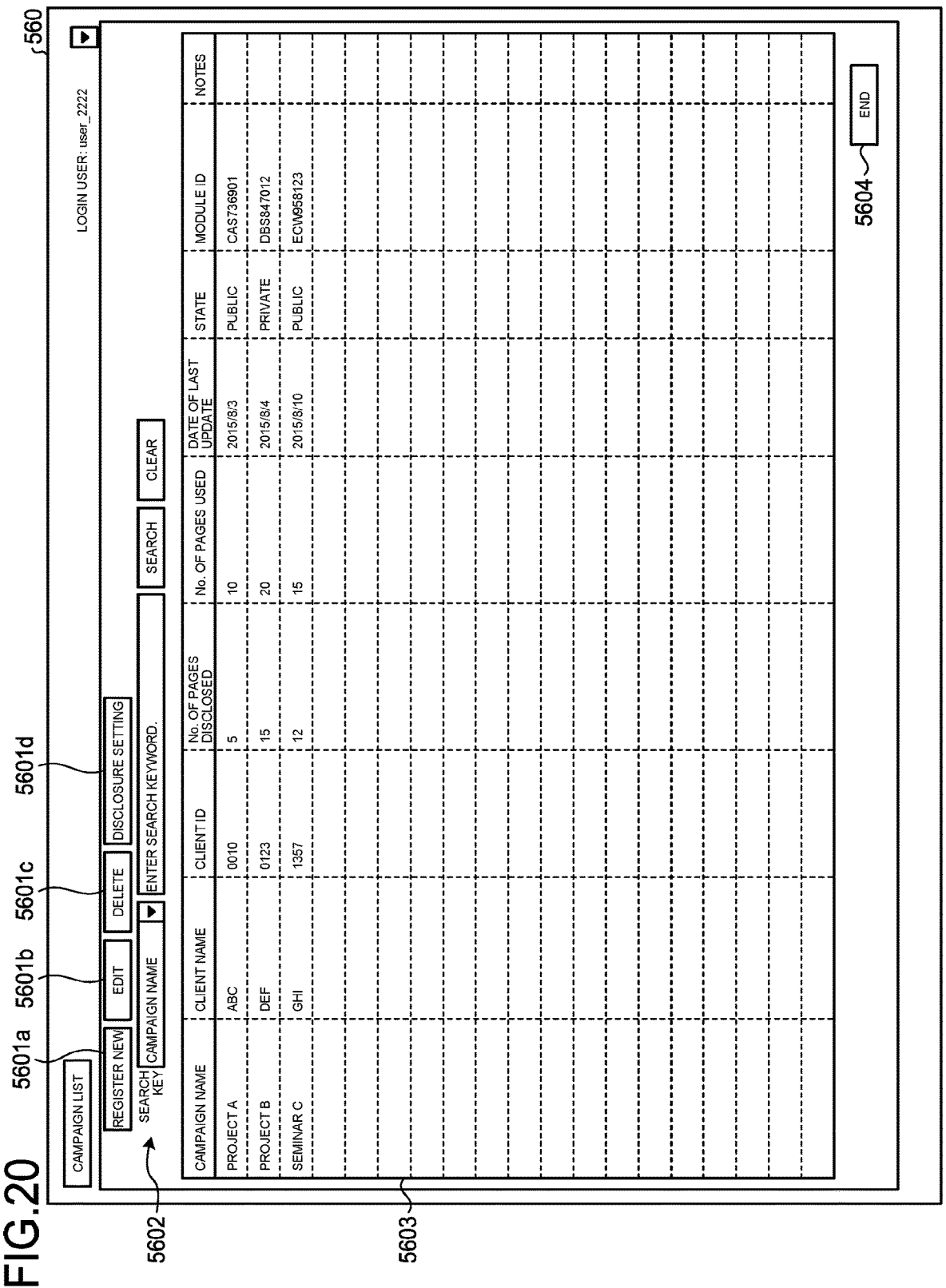
FIG. 20 is a diagram illustrating an example of a registered information list screen applicable to the first embodiment.

FIG. 20 illustrates an example of a registered information list screen 560 applicable to the first embodiment that is displayed at Step S105. In FIG. 20, a new registration button 5601a, an edit button 5601b, a delete button 5601c, a disclosure setting button 5601d, a search input section 5602, a list display region 5603, and an end button 5604 are arranged on the registered information list screen 560.

The list display region 5603 is used for displaying a list of campaign information registered in the management server 101 (contract information DB 16). In the example of FIG. 20, each record in the list displayed in the list display region 5603 includes items of "Campaign name", "Client name", "Client ID", "Number of pages disclosed", "Number of pages used", "Date of last update", "State", "Module ID", and "Notes". The management server 101 stores the information included in the record in the contract information DB 16. The registration tool 21 communicates with the management server 101 to acquire the campaign information stored in the contract information DB 16 and displays the acquired campaign information in the list display region 5603.

The new registration button 5601a newly adds a record to the list displayed in the list display region 5603. The edit button 5601b edits information in a record selected in the list displayed in the list display region 5603. The delete button 5601c deletes the information in the record selected in the list displayed in the list display region 5603. The disclosure setting button 5601d sets the state of a record selected in the list displayed in the list display region 5603 to either of the disclosed and undisclosed states.

After the registered information list screen 560 is displayed at Step S105, the registration tool 21 shifts the processing to Step S110 to wait for an operation on any one of the buttons 5601a to 5601d and the end button 5604. The following describes processing corresponding to the operations on the respective buttons in connection with points (1) to (5) given below.

(1) If the end button 5604 is operated at Step S110, the registration tool 21, for example, returns the processing to Step S101 to display the screen including the menu region 5500.

(2) If, at Step S110, the disclosure setting button 5601d is operated while a record is selected in the list display region 5603, the registration tool 21 shifts the processing to Step S119. At Step S119, the registration tool 21 determines, based on the module ID included in the record, whether the campaign in the selected record can be disclosed.

For example, the registration tool 21 requests, from the management server 101, contract information including a module ID that is the same as the module ID included in the selected record among the contract information registered in the contract information DB 16. The registration tool 21 determines that the campaign is disclosable if the contract pattern is the formal contract and the current date is within the contract period according to the contract information transmitted from the management server 101 in response to the request. The registration tool 21 determines that the campaign is undisclosable if the contract pattern is the evaluation contract or the current date is outside the contract period.

If the campaign is determined to be undisclosable at Step S119 ("No" at Step S119), the registration tool 21 returns the processing to Step S101 to display the screen including the menu region 5500. If, instead, the campaign is determined to be disclosable at Step S119 ("Yes" at Step S119), the registration tool 21 shifts the processing to Step S120.

At Step S120, the registration tool 21 displays a disclosure setting screen for setting the campaign indicated by the selected record to be disclosed or undisclosed.

Figure 21:
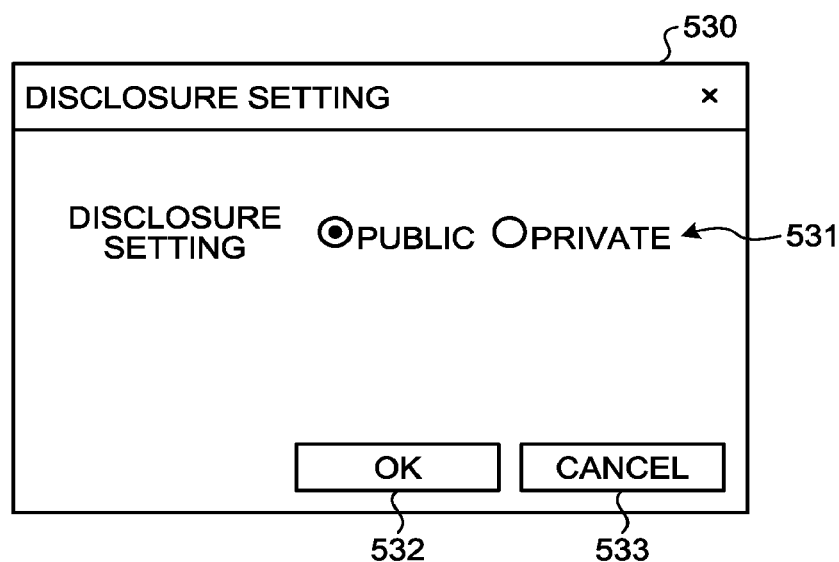
FIG. 21 is a diagram illustrating an example of a disclosure setting screen applicable to the first embodiment.

FIG. 21 illustrates an example of the disclosure setting screen applicable to the first embodiment. In FIG. 21, an input region 531, an "OK" button 532, and a "Cancel" button 533 are arranged on a disclosure setting screen 530. Whether it is to be disclosed or undisclosed is exclusively entered into the input region 531. Here, the value of the item "State" in the selected record is set as the initial value of the input region 531. The "OK" button 532 finalizes the value entered into the input region 531.

For example, if the "OK" button 532 is operated, the registration tool 21 sets the record to a disclosure state that has been set to be disclosed or undisclosed according to the entry to the input region 531. Images included in a campaign indicated by a record with the disclosure state set to be disclosed serve as images to be disclosed, and images included in a campaign indicated by a record with the disclosure state set to be undisclosed serve as images to be undisclosed. After the disclosure state is set, the registration tool 21 updates the display of the list display region 5603, and returns the processing to Step S105. If the "Cancel" button 533 is operated, the registration tool 21 returns the disclosure state of the record to the state before the disclosure setting screen 530 was displayed, and returns the processing to Step S105.

(3) If, at Step S110, the delete button 5601c is operated while a record is selected in the list display region 5603, the registration tool 21 shifts the processing to Step S121. At Step S121, the registration tool 21 deletes the information in the selected record. At this time, the registration tool 21 preferably displays a confirmation screen asking, for example, whether the record really should be deleted, and/or whether information on images associated with the record should also be deleted with the record. After the record is deleted, the registration tool 21 updates the display of the list display region 5603, and returns the processing to Step S105.

(4) If the edit button 5601b is operated at Step S110, the registration tool 21 shifts the processing to Step S122. At Step S122, the registration tool 21 acquires images included in the campaign indicated by the record selected in the list displayed in the list display region 5603 of the registered information list screen 560 from the registration server 102. If linkage information is associated with the acquired images, the registration tool 21 also acquires this linkage information. After acquiring the images and the linkage information, the registration tool 21 shifts the processing to Step S124.

(5) If the new registration button 5601a is operated at Step S110, the registration tool 21 shifts the processing to Step S123 to execute registration processing for a new campaign. At Step S123, the registration tool 21 displays a campaign registration screen for newly registering a campaign.

Figure 22:
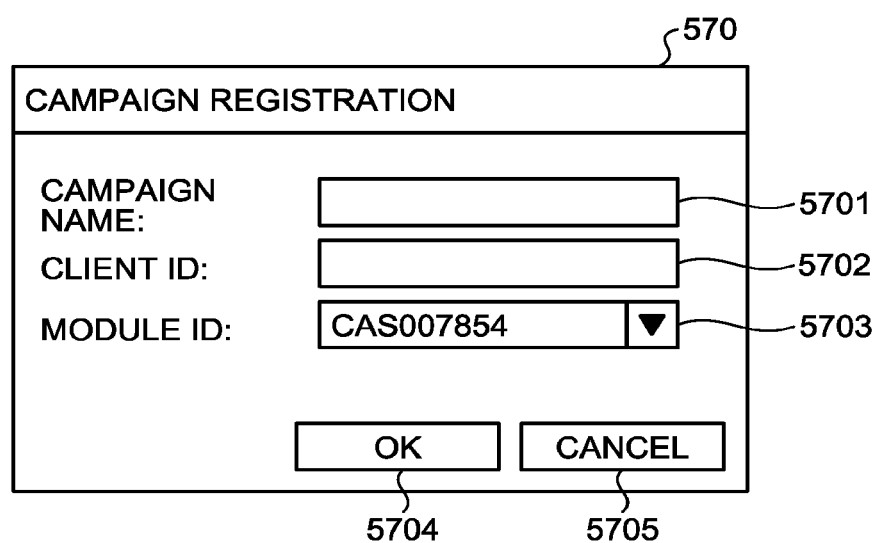
FIG. 22 is a diagram illustrating an example of a campaign registration screen applicable to the first embodiment.

FIG. 22 illustrates an example of the campaign registration screen applicable to the first embodiment. In FIG. 22, input regions 5701 to 5703, an "OK" button 5704, and a "Cancel" button 5705 are arranged on a campaign registration screen 570. A campaign name is entered into the input region 5701. A client ID for identifying a person/organization (business operator) who runs a newly registered campaign is entered into the input region 5702. Values entered into the input regions 5701 and 5702 serve as values of the item "Campaign name" and the item "Client ID", respectively, in the record.

The module ID 312 is entered into the input region 5703. In this case, the module ID 312 associated with the client ID entered into the input region 5702 is entered into the input region 5703. For example, the input region 5703 may be configured such that, if the module IDs 312 are already associated with the client ID, the module ID 312 can be selected from among these module IDs 312 associated with the client ID to be entered.

For example, assume that the client ID entered into the input region 5702 is associated with a first module ID 312 and a second module ID 312, the first module ID 312 corresponding to "Ordinary" specified in the input region 5205 in FIG. 19, the second module ID 312 corresponding to "Exclusive" and "SP002", which indicates the exclusive DBs $110a_2$ and $110b_2$, specified in the input region 5205 and the input region 5206, respectively, in FIG. 19. In this case, either of the first module ID 312 and the second module ID 312 is selected and entered into the input region 5703, so that where to register the campaign can be specified to be either of the pair of the ordinary DBs 111a and 111b and the pair of the exclusive DBs $110a_2$ and $110b_2$ in accordance with the entered module ID 312.

If the "OK" button 5704 is operated, the registration tool 21 finalizes the values entered into the input regions 5701 to 5703 on the campaign registration screen 570, and uses the finalized values to add a record to the list display region 5603 on the registered information list screen 560. The registration tool 21 then shifts the processing to Step S124. If, instead, the "Cancel" button 5705 is operated, the registration tool 21 discards the values entered into the input regions 5701 to 5703 and, for example, returns the processing to Step S105.

Figure 23:
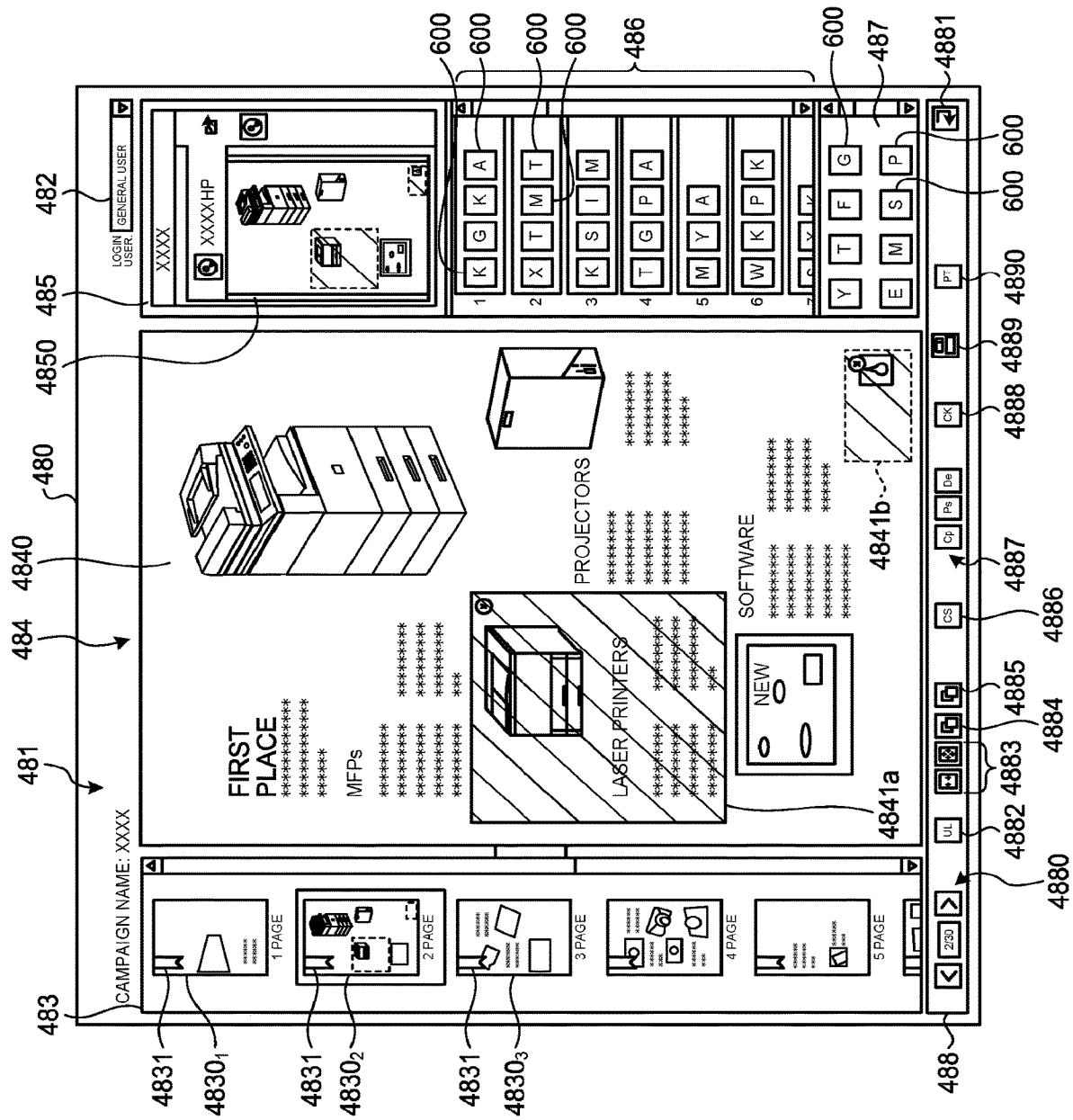
FIG. 23 is a diagram illustrating an example of an edit screen applicable to the first embodiment.

At Step S124, the registration tool 21 uses the display unit 203 to display an edit screen for editing information about the campaign. FIG. 23 illustrates an example of the edit screen applicable to the first embodiment. In FIG. 23, an edit screen 480 includes a header region 481, a thumbnail display region 483, a page edit region 484, a preview region 485, a target area list region 486, a link icon list region 487, and a toolbar 488.

In the header region 481, the name of the campaign subject to the edit on this edit screen 480 is displayed at the left end, and a user menu display section 482 that displays a menu usable on the authority of a user having logged in to the registration tool 21 is placed at the right end.

The thumbnail display region 483 is a region in which thumbnail images obtained by reducing the sizes of images included in the campaign are displayed. For example, if the processing has been shifted from the above-described step S122 for indicating the edit of the campaign information to this step S124, the registration tool 21 acquires images from the image DB 14 of the registration server 102, the images having been acquired from the registration server 102 at Step S122 and being included in the campaign indicated by the record selected from the list display region 5603. The registration tool 21 reduces the sizes of the acquired images to generate the thumbnail images, and displays them in the thumbnail display region 483. In the example of FIG. 23, thumbnail images $4830_1$, $4830_2$, $4830_2$, and so on are displayed in the thumbnail display region 483.

When the processing has been shifted to this step S124 from the above-described step S123 for indicating new registration of the campaign information, the thumbnail display region 483 is left blank. A scroll bar provided at the right end of the thumbnail display region 483 can be operated to sequentially display, in the thumbnail display region 483, other thumbnail images that have been virtually displayed outside the thumbnail display region 483.

The page edit region 484 displays an image 4840 subject to the edit among the images included in the campaign. For example, the registration tool 21 displays the original image of a thumbnail image selected from among the thumbnail images $4830_1$, $4830_2$, $4830_3$, and so on displayed in the thumbnail display region 483, as the image 4840 in the page edit region 484. In the example of FIG. 23, the thumbnail image $4830_2$ is selected in the thumbnail display region 483, and the original image of this selected thumbnail image $4830_2$ is displayed as the image 4840 in the page edit region 484.

If a range is specified for the image 4840 displayed in the page edit region 484, the registration tool 21 can set the specified range as a target area. The range of a range is specified, for example, upon acceptance by the input unit 202 of an operation performed by a user on the input device 2007. For example, specifying any two points in the image 4840 displayed in the page edit region 484 specifies a rectangular range having the specified two points as diagonal vertices. In the example of FIG. 23, target areas 4841a and 4841b are each set as a rectangular range on the image 4840 in the page edit region 484.

The registration tool 21 generates identification information (such as serial numbers) identifying the respective target areas 4841a and 4841b thus set, and associates the identification information with the respective target areas 4841a and 4841b. The identification information is generated so as to be capable of identifying the target areas throughout the respective images included in the campaign subjected to the edit. The registration tool 21 is capable of associating one or more pieces of the linkage information with each of the target areas 4841a and 4841b set in the page edit region 484.

Furthermore, the registration tool 21 appends a marker image 4831 to a thumbnail image from among the thumbnail images $4830_1$, $4830_2$, $4830_2$, and so on displayed in the thumbnail display region 483, the thumbnail image corresponding to an image that has been subjected to some kind of edit, such as specification of a target area, in the page edit region 484 and has not yet been stored.

The preview region 485 displays a preview screen 4850 that emulates a screen of the search terminal 30 on which an image being edited in the page edit region 484 is to be displayed by an application program compatible with this information processing system. The registration tool 21 explicitly displays the target areas 4841a and 4841b set in the page edit region 484 in the preview region 485, for example, in a highlighted manner. The registration tool 21 also displays pieces of information indicating the linkage information set for the respective target areas 4841a and 4841b in a manner such that they correspond to the respective target areas 4841a and 4841b, in the preview region 485.

The target area list region 486 displays a list of the linkage information appended to the target areas set on the images included in the campaign subject to the edit, in the form of icon images 600, 600, and so on. In the example of FIG. 23, the registration tool 21 displays the linkage information in the target area list region 486 collectively on a basis of per identification information (per serial number) appended to the corresponding target area. A scroll bar provided at the right end of the target area list region 486, can be operated so as to sequentially display, in the target area list region 486, the linkage information for other target areas virtually displayed outside the target area list region 486.

The link icon list region 487 displays a list of linkage information settable for the target areas using the icon images 600, 600, and so on corresponding to the respective pieces of the linkage information. The registration tool 21 is capable of associating the respective pieces of the linkage information corresponding to the icon images 600, 600, and so on with the target area 4841a in response to: movement of each of the icon images 600 displayed in the link icon list region 487 using what is called a drag-and-drop operation; and superimposition of the icon image 600 on, for example, the target area 4841a set inside the page edit region 484. A plurality of pieces of the linkage information can be associated with one target area.

Furthermore, the icon images 600 that correspond to previously determined pieces of the linkage information are specified in the link icon list region 487, so that pieces of the linkage information, including one for registering the user ID and another one related to a content such that whether to permit access thereto is controllable, can be set according to the first embodiment. The setting of these pieces of the linkage information according to the first embodiment is to be described later.

A scroll bar provided at the right end of the link icon list region 487 can be operated so as to sequentially bring other icon images 600 that have been virtually arranged outside the link icon list region 487 into the link icon list region 487 and display the icon images therein.

When the linkage information is associated with the target area, the icon image 600 indicating the associated linkage information can be displayed at a certain location in the target area. This makes it easy to find out which linkage information is associated with the target area 4841a, which is preferable. The association of the linkage information with the target area is reflected in display of the preview region 485.

A page specifying section 4880 for specifying a page (image) displayed in the page edit region 484 and buttons or button groups 4881 to 4890 for performing various functions included in the registration tool 21 are arranged on the toolbar 488. The button 4881 is a button for returning the screen from the edit screen 480 to the registered information list screen 560.

The button 4882 is a button for uploading an image from the registration terminal 20 to the registration server 102. If the button 4882 is operated, the registration tool 21 uses the display unit 203 to display a file selection screen. For example, a standard file selection screen provided by an OS that runs on a CPU 2000 of the registration terminal 20 is adopted as the file selection screen.

The button group 4883 includes two buttons for adjusting the display size of the image 4840 displayed in the page edit region 484.

The button 4884 is a button for switching the area setting mode of setting an area in the page edit region 484 to a target area setting mode of setting the target area. If an area is set in the image 4840 displayed in the page edit region 484 after an edit mode is switched to the target area setting mode in response to an operation on this button 4884, the registration tool 21 sets the area as the target area.

The button 4885 is a button for switching the area setting mode of specifying an area in the page edit region 484 to a mask setting mode of specifying a mask area from which the feature information is not to be extracted by the analysis unit 12. If an area is set in the image 4840 displayed in the page edit region 484 after the edit mode is switched to the mask setting mode in response to an operation on this button 4885, the registration tool 21 sets the area as the mask area.

The button 4886 is a button for displaying a campaign setting screen for setting details of a campaign. On the campaign setting screen, how to disclose a campaign is set. The term "disclosure" or "to disclose" means operation that the search terminal 30 performs when a certain operation is performed on the search terminal 30. For example, the following can be set as the operation: saving information about the campaign into the search terminal 30; posting information about the campaign on a social networking service (SNS); and displaying information about the campaign using an external application program.

The button group 4887 includes three buttons for executing copy, paste, and deletion of information, respectively.

The button 4888 is a button for requesting execution of similar image check to check whether the search server 100a has already registered therein an image including a portion similar to a part or the whole of the image (page) 4840 that is currently displayed in the page edit region 484 of the edit screen 480. In the first embodiment, the similar image check is executed in such a manner as to check whether images registered in the search server 100a include the similar image. The registration tool 21 causes the display unit 203 to display a search result transmitted from the search server 100a. The user can re-edit the image based on this search result.

At this time, for example, the registration tool 21 can request searches for similar images by transmitting, to the search server 100a, only images in the target area set as images to be used for the check in accordance with the operation on the button 4884. The registration tool 21 can also exclude, from the images to be used for the check, an image in the mask area set in accordance with the operation on the button 4885. Moreover, the registration tool 21 can also divide the image 4840 currently displayed in the page edit region 484, and request searches for similar images by transmitting the respective divided images to the registration server 102 so as to execute the similar image check for the respective images.

An operation on the button 4889 requests storing the campaign currently being edited on the edit screen 480.

The button 4890 enables setting a push notification in a target area set in the image 4840 displayed in the page edit region 484. For example, the button 4890 is operated with the target area 4841a being specified, so that a push notification setting screen to be described later appears. Through the push notification setting screen, whether to apply a push notification to this target area 4841a can be set. Through the push notification setting screen, the kind of push notification can also be set when the push notification is applied.

Here, referring back to FIG. 14, an operation on the button 4889 causes the registration tool 21 to shift the processing to Step S125 to start storage processing of the campaign. After starting the storage processing, the registration tool 21 shifts the processing to Step S126 to determine whether the campaign to be stored is a newly registered campaign. If the processing has been shifted from Step S122 described above to this step S126, the registration tool 21 determines that the campaign to be stored is not a newly registered campaign ("No" at Step S126), and shifts the processing to Step S128.

If, instead, the processing has been shifted from Step S123 described above to this step S126, the registration tool 21 determines that the campaign to be stored is a newly registered campaign ("Yes" at Step S126), and shifts the processing to Step S127. At Step S127, the registration tool 21 executes, with respect to images that have target areas set therein among images included in the campaign to be stored, the similar image check by which to determine whether any image that includes a portion similar to a part or the whole of any of the above-described images has already been registered in the search server 100a. Upon completion of the similar image check, the registration tool 21 shifts the processing to Step S128.

At Step S128, the registration tool 21 transmits the information about the campaign to the registration server 102, and requests the registration server 102 to update the registered information. For example, the registration tool 21 transmits the images included in the campaign, the pieces of the linkage information associated with the respective images, and metadata of the campaign, to the registration server 102. In response to the request from the registration tool 21, the registration server 102 updates the image DB 14, the linkage information DB 15 that are included in the registration server 102, and a metadata DB, based on the pieces of information transmitted from the registration terminal 20.

After transmitting the request for information update to the registration server 102 at Step S128, the registration tool 21 returns the processing to Step S105.

DB Specifying Method Applicable to First Embodiment

Figure 24:
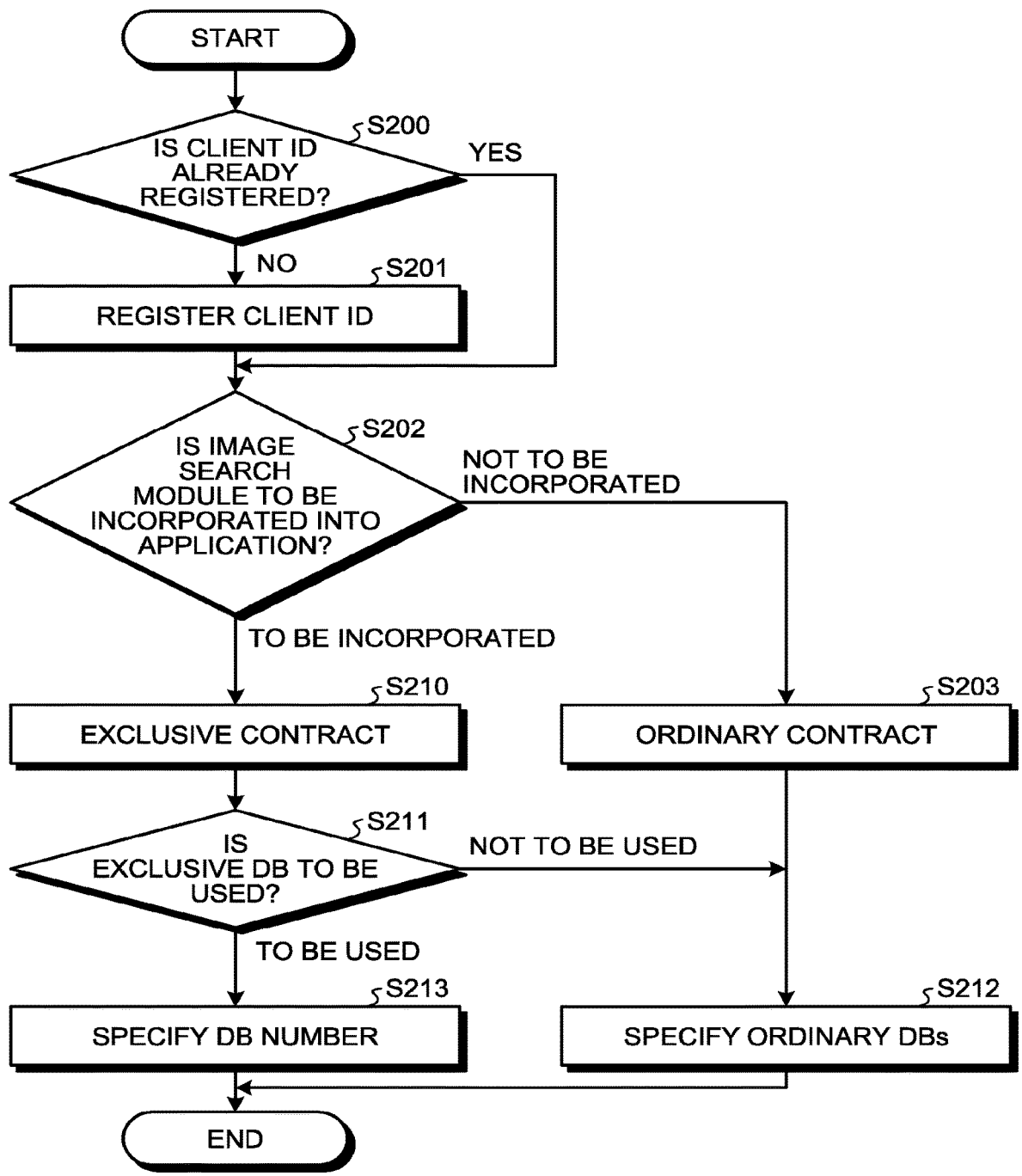
FIG. 24 is an exemplary flowchart for schematically explaining a method for specifying a DB in which an image is to be registered, the method being applicable to the first embodiment.

The following schematically describes a method, applicable to the first embodiment, for specifying a DB in which an image is to be registered, using a flowchart of FIG. 24. For example, the service provider performs processing according to this flowchart of FIG. 24. The processing according to this flowchart of FIG. 24 is executed with respect to each campaign. A contract for using the search system 10 is assumed to have been concluded in advance in writing or the like between a business operator as a client and the service provider.

At Step S200, the service provider determines whether the client ID of the business operator under the contract has been registered. For example, the service provider can make an inquiry from the registration terminal 20 to the management server 101 about whether contract information including the client name of the business operator having the contract has been registered in the contract information DB 16, and can make this determination based on the result of the inquiry. If the client ID of the business operator under the contract is determined to have already been registered ("Yes" at Step S200), the processing is shifted to Step S202.

If, instead, the client ID of the business operator under contract is determined to have not been registered ("No" at Step S200), the processing is shifted to Step S201. At Step S201, the service provider registers the client ID for identifying this business operator, based on the contract information. For example, the service provider displays the client registration/edit screen 510 illustrated in FIG. 17 on the registration terminal 20, enters pieces of information including the client ID of the business operator into the input region 5104.

Based on the contract information, the service provider uses, for example, the module registration/edit screen 520 in FIG. 19 to set the module ID 312 that is to be associated with this client ID when the business operator assigned this client ID uses the image search module 311, and further enters the module ID 312 thus set into the input region 5108 on the client registration/edit screen 510. The "OK" button 5110 is then operated on the client registration/edit screen 510, so that the pieces of information including the client ID of the business operator are registered in the contract information DB 16.

After the client ID is registered at Step S201, the processing is shifted to Step S202. At Step S202, the service provider determines, based on the contract information, whether the business operator under the contract is to incorporate the image search module 311 into another application program (application). The other application is, for example, an application provided by the business operator.

At Step S202, if the image search module 311 is determined not to be incorporated into the other application ("Not to be incorporated" at Step S202), the processing is shifted to Step S203, and the contract with the business operator under the contract is determined to be an ordinary contract. The process shifts to Step S212.

At Step S202 described above, if the image search module 311 is determined to be incorporated into the other application ("Incorporated" at Step S202), the process shifts to Step S210, and the contract with the business operator under the contract is determined to be an exclusive contract. At the next step S211, a determination is made as to whether to use an exclusive DB. If no exclusive DB is determined to be used ("Unused" at Step S211), the service provider specifies the ordinary DBs 111a and 111b as DBs in which an image is to be registered by the business operator under the contract (Step S212).

If, instead, an exclusive DB is determined to used ("To be used" at Step S211), the service provider specifies, for the business operator under the contract, the DB number of a DB that is set as a registration target DB from among the pairs of the exclusive DBs DB110$a_1$ and 110$b_1$, the exclusive DBs 110$a_2$ and 110$b_2$, and so on (Step S213).

The service provider can set a used DB flag for the campaign according to the results of Step S212 and Step S213 described above. As a value of the used DB flag, "Ordinary" is used if Step S212 is executed, or "Exclusive" is used if Step S213 is executed. This example is not limiting, and the DB number of a specified DB may be used as the used DB flag.

Search Processing Applicable to First Embodiment

Figure 25:
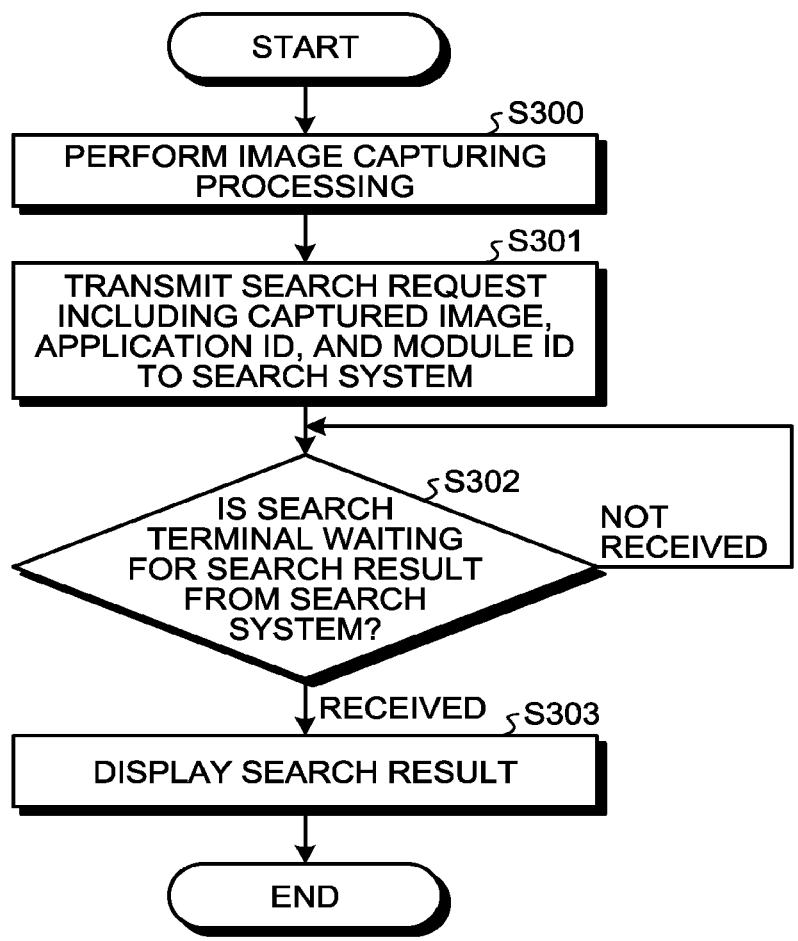
FIG. 25 is an exemplary flowchart illustrating search processing to be executed from the search terminal, the processing being applicable to the first embodiment.

The following describes search processing applicable to the first embodiment. First, the search processing to be executed from the search terminal 30 applicable to the first embodiment is described using a flowchart of FIG. 25. At Step S300, the search terminal 30 performs the image capturing processing in response to a user operation. At the next step S301, the search terminal 30 transmits, to the search system 10, a search request including a captured image and including the application ID 310 and the module ID 312 that are included in the image search application 301a. This search request is received by the management server 101 in the search system 10.

At the next step S302, the search terminal 30 waits for reception of a search result from the search system 10. If no search result has been received ("Not received" at Step S302), the processing of Step S302 is repeated. If any search result is received from the search system 10 ("Received" at Step S302), the search terminal 30 shifts the processing to Step S303 to display the received search result. Upon completion of the processing at Step S303, the sequence of search processing steps to be performed by the search terminal 30 ends.

Figure 26:
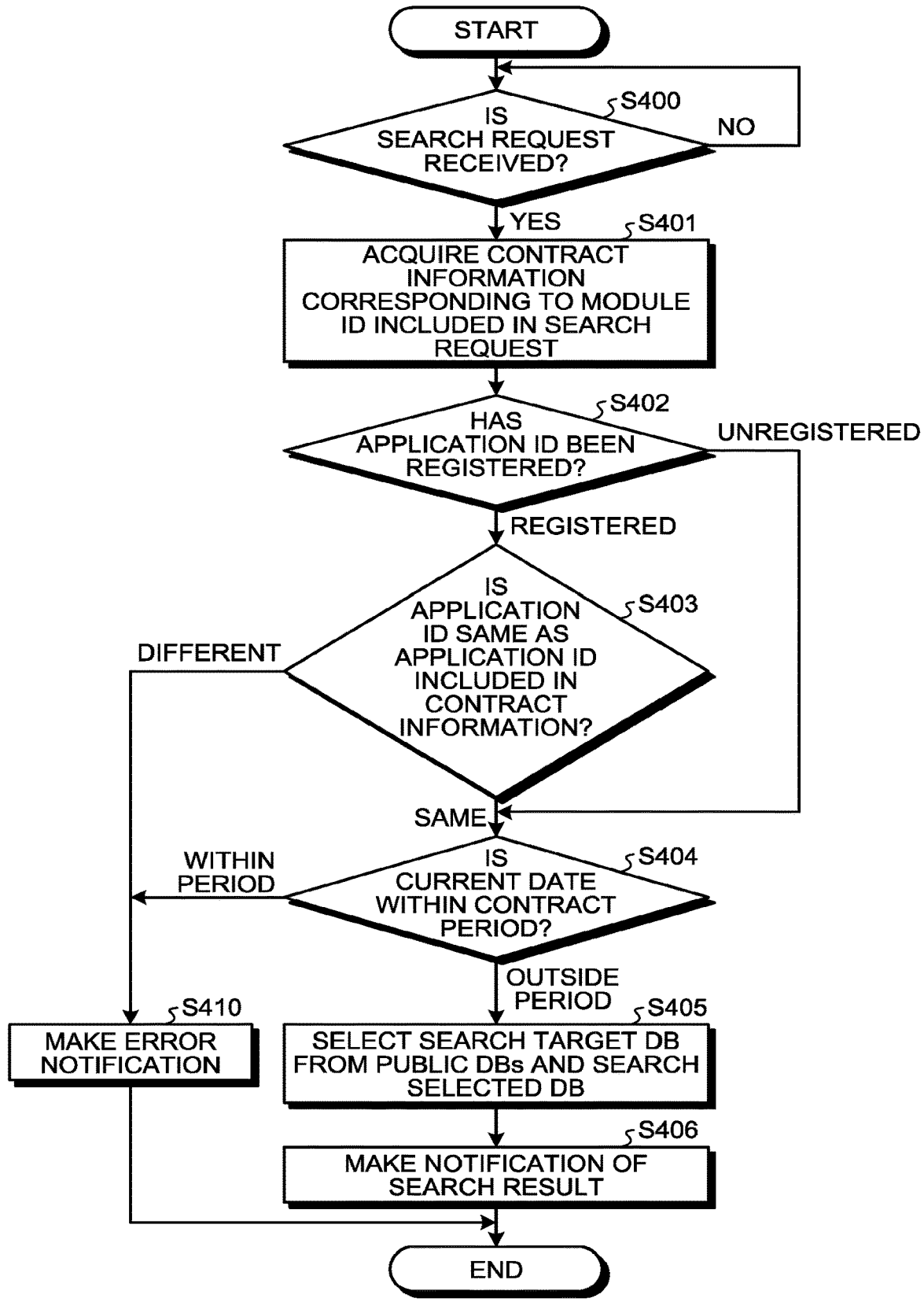
FIG. 26 is an exemplary flowchart for explaining processing related to a search to be made by a management server, the processing being applicable to the first embodiment.

Using a flowchart of FIG. 26, the following describes processing, applicable to the first embodiment, related to a search to be made by the management server 101. At Step S400, the management server 101 determines whether the search request has been received from the search terminal 30. If the search request is determined not to have been received ("No" at Step S400), the management server 101 repeats the processing of Step S400. If, instead, the search request is determined to have been received from the search terminal 30 ("Yes" at Step S400), the management server 101 shifts the processing to Step S401.

At Step S401, the management server 101 acquires, from the contract information DB 16, the contract information corresponding to the module ID 312 included in the received search request. At the next step S402, the management server 101 determines whether the application ID 310 has been registered in the contract information. If the application ID 310 is determined not to have been registered in the contract information ("Unregistered" at Step S402), the management server 101 shifts the processing to Step S404. If, instead, the application ID 310 is determined to have been registered in the contract information ("Registered" at Step S402), the management server 101 shifts the processing to Step S403.

At Step S403, the management server 101 determines whether the application ID 310 included in the contract information is the same as the application ID 310 included in the image search application 301a installed on the search terminal 30. If the application IDs 310 are determined not to be the same ("Different" at Step S403), the management server 101 shifts the processing to Step S410 to transmit an error notification indicating that the application IDs are not the same, to the search terminal 30, and ends the sequence of processing steps according to the flowchart of FIG. 26.

If, instead, the application IDs 310 are determined to be the same at Step S403 ("Same" at Step S403), the management server 101 shifts the processing to Step S404.

At Step S404, the management server 101 determines whether the current date is within the contract period based on the start date of use and the end date of use included in the contract information acquired at Step S401. If the current date is determined to be outside the contract period ("Outside period" at Step S404), the management server 101 shifts the processing to Step S410 to transmit an error notification indicating that the current date is outside the contract period, to the search terminal 30, and ends the sequence of processing steps according to the flowchart of FIG. 26.

If, instead, the current date is determined to be within the contract period at Step S404 ("Within period" at Step S404), the management server 101 shifts the process to Step S405. At Step S405, the management server 101 sets a public DB as a search target of the search terminal 30 that has transmitted the search request, and switches the switch units 121 and 120b so as to select the search target DB from among the ordinary DB 111b and the exclusive DBs $110b_1$, $110b_2$, and so on based on the contract information corresponding to the module ID 312 included in the search request. The search server 100 performs the image search on the selected search target DB. The search request may be transferred from the management server 101 to the search server 100, or may have been held in, for example, the switch unit 121.

At the next step S406, the search server 100 notifies, of the search result, the search terminal 30 that has transmitted the search request, and then ends the sequence of processing steps according to the flowchart of FIG. 26.

Example of Displaying Image Search Result on Search Terminal

Using FIG. 27, FIG. 28, FIG. 29A, and FIG. 29B, the following describes an example of displaying, on the search terminal 30, the search result transmitted to the search terminal 30 at Step S406 in the above-described flowchart of FIG. 26.

As described in connection with FIG. 3, in the search system 10, the linkage information has been associated with each target area specified within an image, and information on the association between this target area and the linkage information has been described with the XML code 140. As a result of the image search, the search system 10 transmits the search result including this XML code 140 to the search terminal 30. The search terminal 30 uses the search result reception unit 3113 inside the image search module 311 included in the image search application 301a to receive, via the communication unit 303, the XML code 140 included in the search result transmitted from the search system 10. The search result reception unit 3113 transfers the received search result to the display information generation unit 3114. The display information generation unit 3114 generates display information to be used for displaying a browse screen based on the XML code 140 included in the transferred search result and transfers the display information to the display unit 306. The display unit 306 displays the browse screen on the display device 3004 in accordance with the transferred display information.

Figure 27:
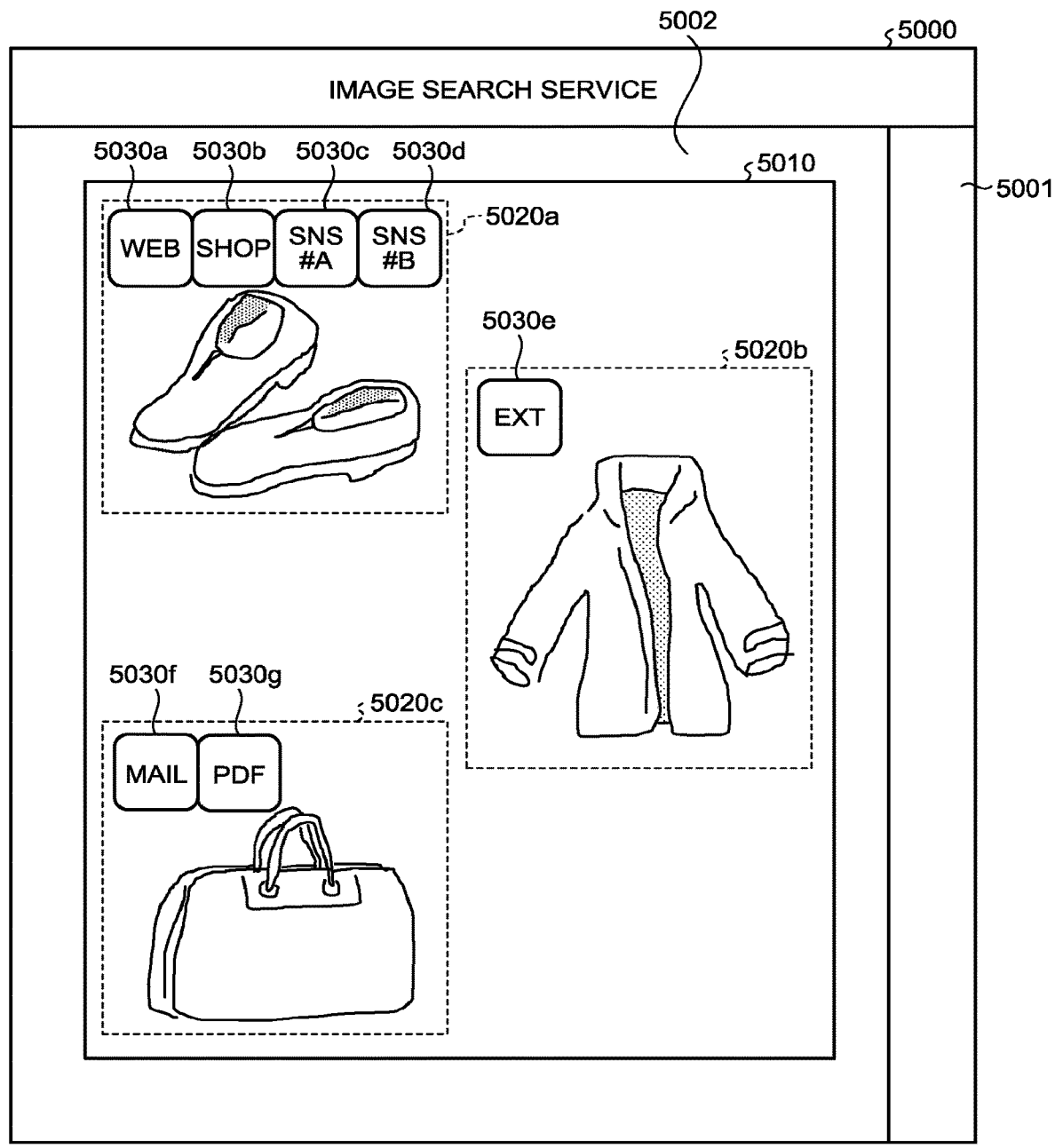
FIG. 27 is a diagram illustrating an example of a browse screen applicable to the first embodiment.

FIG. 27 is a diagram illustrating an example of the browse screen applicable to the first embodiment, which is displayed according to the display information generated by the display information generation unit 3114. In FIG. 27, the browse screen 5000 includes a link display region 5001 and a page image display region 5002. The page image display region 5002 is a region in which a page 5010 according to the XML code 140 is displayed. The size of the page may be fixed, or may be included in the XML code 140. The display information generation unit 3114 displays target areas 5020a, 5020b, and 5020c in accordance with the description of the XML code 140.

The display information generation unit 3114 displays images in the respective target areas 5020a, 5020b, and 5020c, the images having been acquired in accordance with pieces of the link information described in the XML code 140. This example is not limiting, and, when the XML code 140 includes image data, the display information generation unit 3114 can display images according to the image data in the target areas 5020a, 5020b, and 5020c.

The display information generation unit 3114 further displays icon images 5030a to 5030g in the target areas 5020a, 5020b, and 5020c, the respective icon images 5030a to 5030g indicating pieces of the linkage information associated with the target areas 5020a, 5020b, and 5020c. In the example of FIG. 27, the four icon images 5030a to 5030d are displayed in the target area 5020a, which indicates that four pieces of the linkage information are associated with the target area 5020a. Similarly, the icon image 5030f and 5030g are displayed in the target area 5020c, which indicates that two pieces of the linkage information are associated with the target area 5020c. Furthermore, the icon image 5030e is displayed in the target area 5020b, which indicates that one piece of the linkage information is associated with the target area 5020b.

Figure 28:
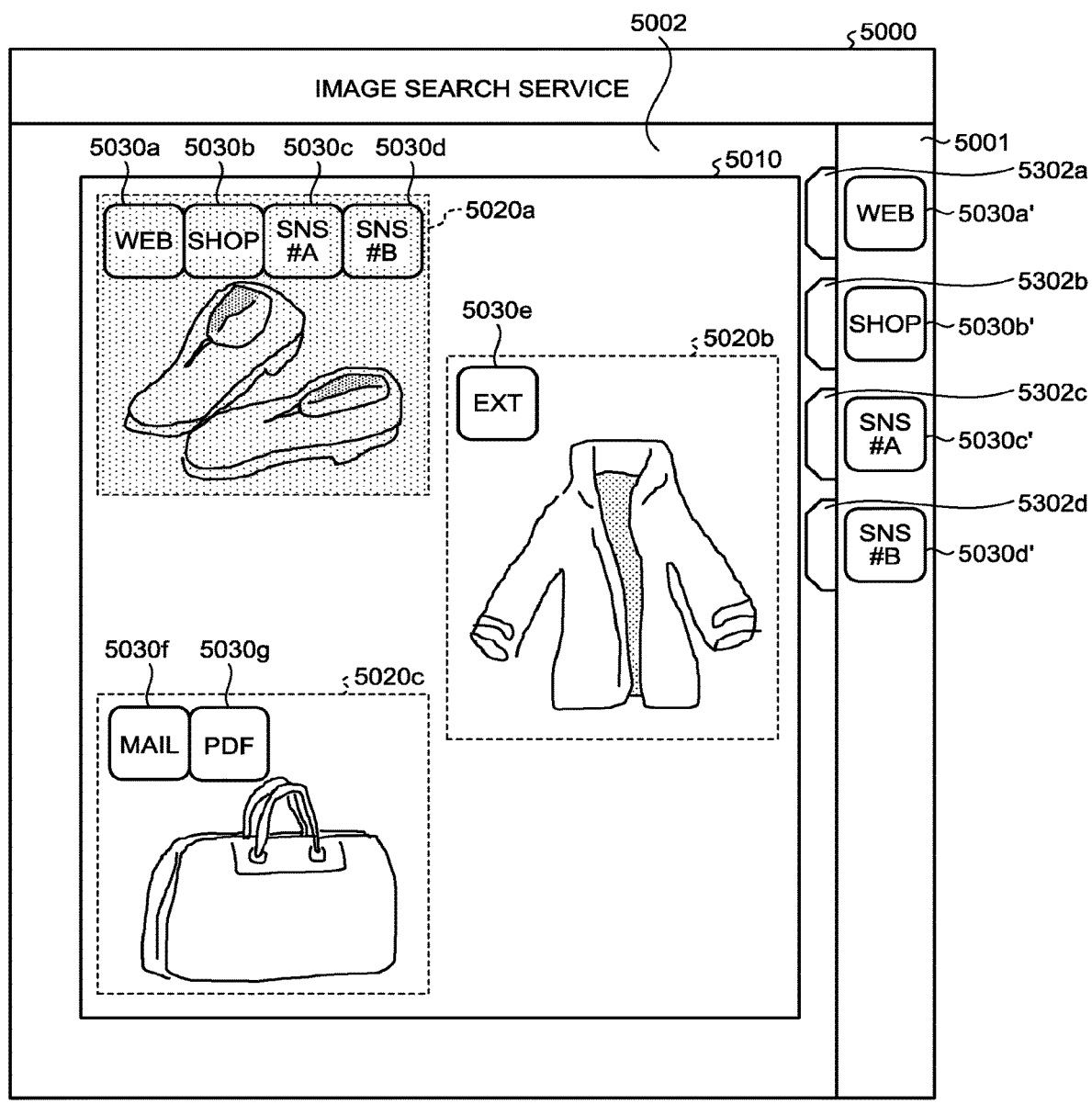
FIG. 28 is a diagram illustrating an exemplary consequence of specifying a target area on the browse screen applicable to the first embodiment.

While the browse screen 5000 is being thus displayed, operating the input device 3007 to specify one of the target areas enables the user to use any piece of the linkage information associated with the specified target area. FIG. 28 illustrates an exemplary consequence of specifying the target area 5020a on the browse screen 5000 in FIG. 27. In the example of FIG. 28, the target area 5020a specified is highlighted. When the input acceptance unit 3115 receives an operation on the input device 3007 that specifies the target area 5020a, the display information generation unit 3114 displays icon images 5030a', 5030b', 5030c', and 5030d' indicating the respective pieces of the linkage information associated with the target area 5020a, in the link display region 5001. These icon images 5030a' to 5030d' correspond to the respective icon image 5030a to 5030d.

The display information generation unit 3114 further displays tabs 5302a, 5302b, 5302c, and 5302d at positions in the page image display region 5002 that correspond to the respective icon images 5030a', 5030b', 5030c', and 5030d'. When each of the tabs 5302a, 5302b, 5302c, and 5302d is operated, a piece of the linkage information indicated by the icon image corresponding to the operated tab is turned usable.

Figure 29A:
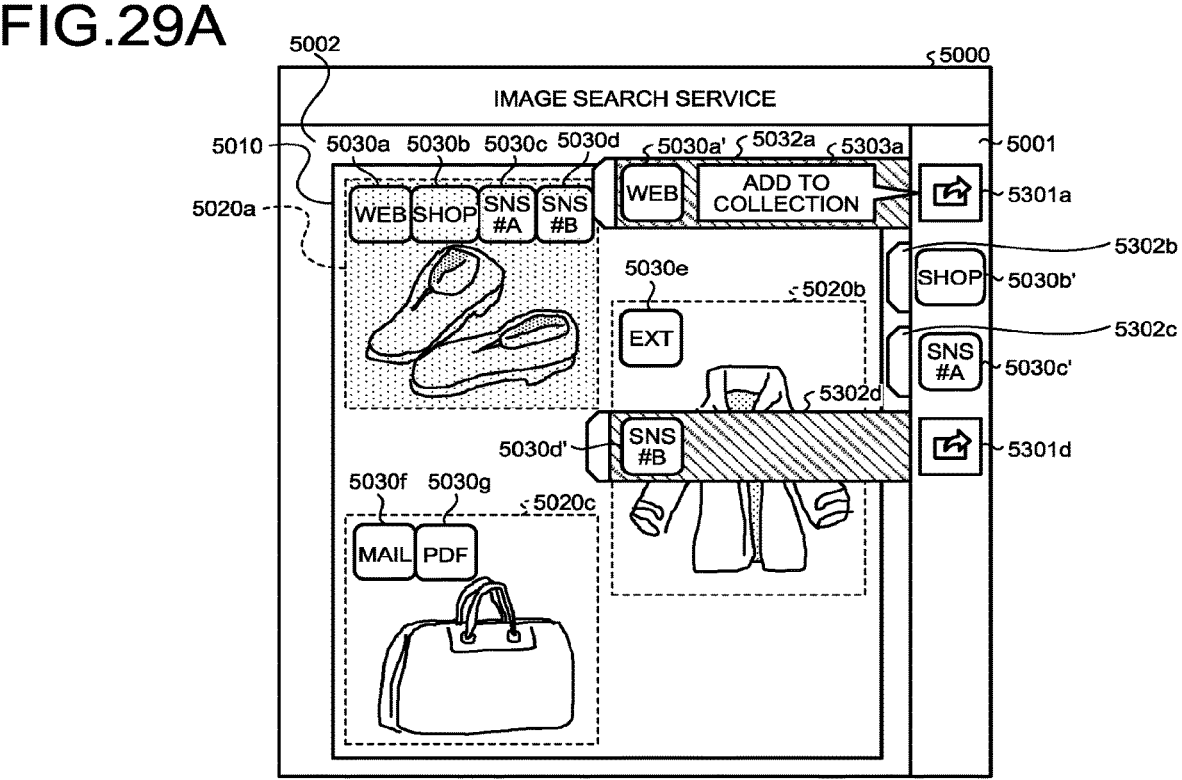
FIG. 29A is a diagram illustrating exemplary consequences of operating a tab on the browse screen applicable to the first embodiment.
Figure 29B:
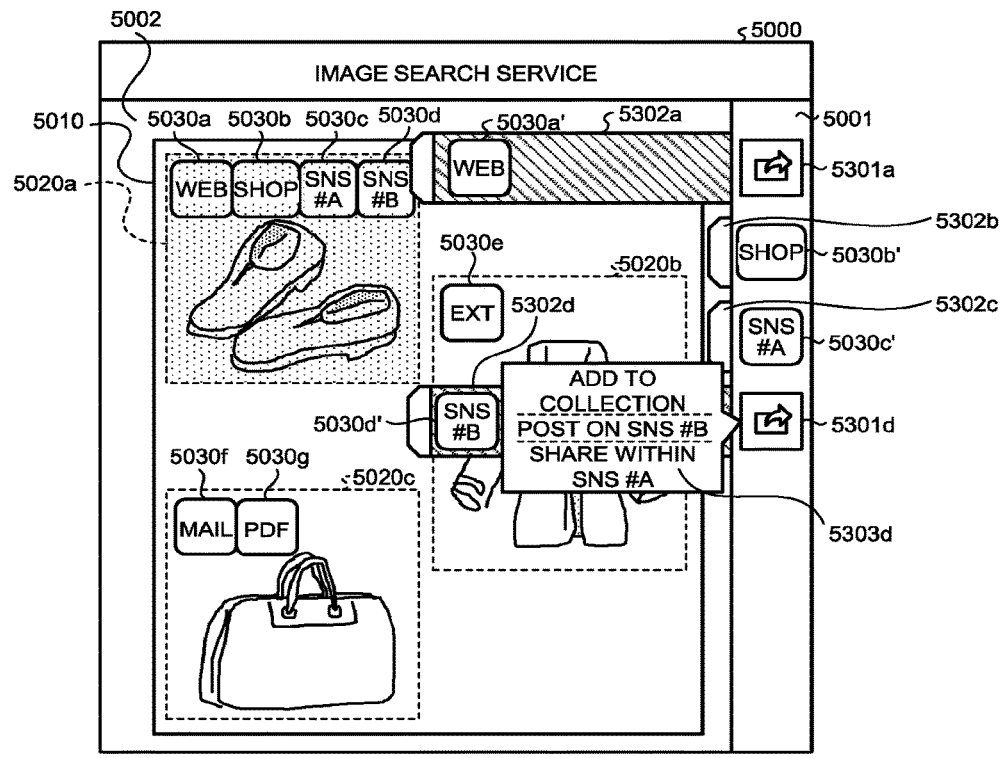
FIG. 29B is a diagram illustrating exemplary consequences of operating a tab on the browse screen applicable to the first embodiment.

FIG. 29A and FIG. 29B illustrate exemplary consequences of operating the tabs 5302a and 5302d on the display of FIG. 28. In these examples, when the tab 5302a is operated, for example, the image of the tab 5302a is changed into an image such that the tab 5302a appears as if having been elongated toward the page image display region 5002. The icon image 5030a' corresponding to this tab 5302a is displayed in a front-end portion of the elongated image of the tab 5302a. The same applies to the tab 5302d. In the link display region 5001, icon images 5301a and 5301d for specifying intentions to use functions indicated by the respective icon images 5030a' and 5030d' are displayed at positions in which the icon images 5030a' and 5030d' have been displayed. The linkage information indicated by the icon image 5030a' corresponding to the tab 5302a is found available if the image of the operated tab 5302a is thus changed.

A consideration is given to an exemplary case in which, while the image search application 301a is specified as an application program to be started up for the icon image 5030a', a piece of the linkage information indicated by the icon image 5030a' specifies the piece of the linkage information in a manner such that the piece of the linkage information can be stored in the search terminal 30. In this case, as illustrated in FIG. 29A, the display information generation unit 3114 displays a message 5303a "Add to collection" on the tab 5302a, thereby prompting the user to store the linkage information indicated by the icon image 5030a' in the search terminal 30. When the input acceptance unit 3115 accepts an operation on the icon image 5301a, the display information generation unit 3114 stores the linkage information indicated by the icon image 5030a', for example, in the storage 3005 in the search terminal 30.

A consideration is given to another exemplary case in which, while the image search application 301a is specified as an application program to be started up for the icon image 5030d', pieces of the linkage information indicated by the icon image 5030d' specify: storing these pieces of the linkage information in the search terminal 30; sharing them in an SNS #A; and posting them on an SNS #B. In this case, the display information generation unit 3114 displays a message 5303d that enables selection from "Add to collection", "Post on SNS #B", and "Share within SNS #A" on the tab 5302d, thereby prompting the user to select any of the processes, as exemplified in FIG. 29B. The display information generation unit 3114 executes the process selected in response to the message 5303d. For example, when the input acceptance unit 3115 accepts an operation for selecting "Post on SNS #B", the display information generation unit 3114 performs a process for posting on the SNS #B, based on the linkage information indicated by the icon image 5030d'.

In still another exemplary case in which a browser application installed on the search terminal has been specified as an application program to be started up for the icon image 5030a', the image search application 301a calls and starts up the browser application when the input acceptance unit 3115 accepts an operation on the icon image 5301a corresponding to this icon image 5030a'.

Figure 30A:
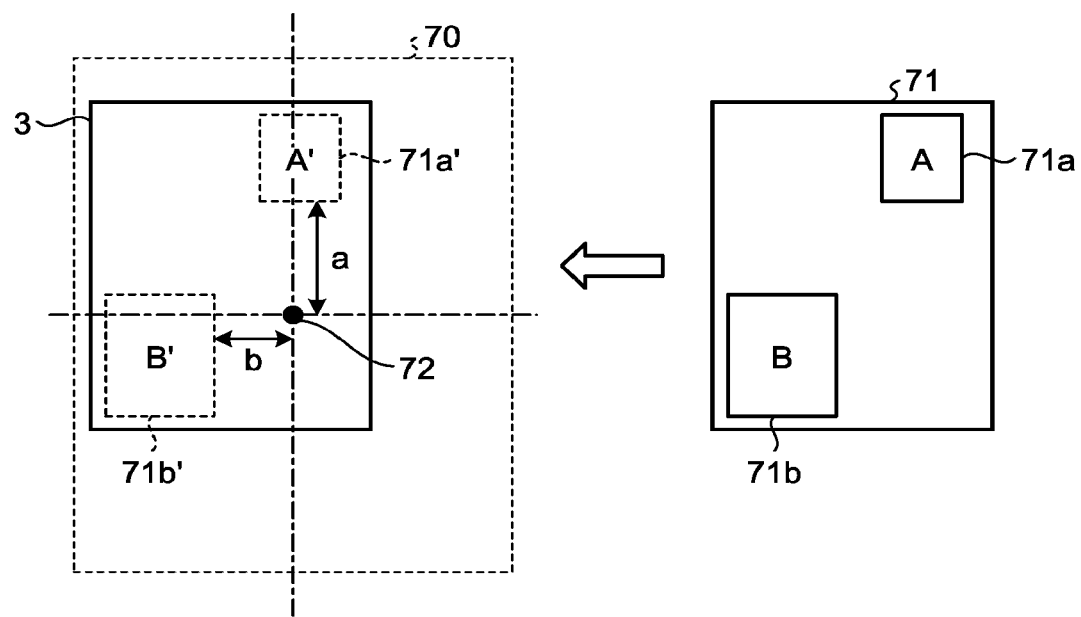
FIG. 30A is a diagram for explaining a method for specifying a target area, the method being applicable to the first embodiment.
Figure 30B:
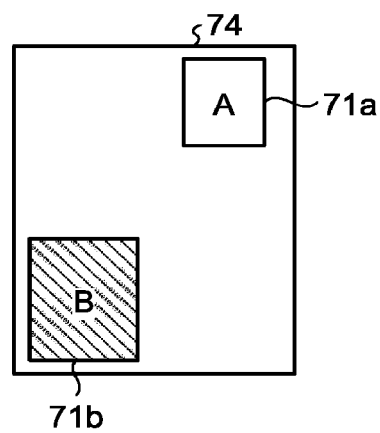
FIG. 30B is a diagram for explaining the method for specifying a target area applicable to the first embodiment.

The following describes, using FIG. 30A and FIG. 30B, a method for specifying target areas applicable to the first embodiment. The left side of FIG. 30 A illustrates an example of the photographic subject 3, an image of which is captured by the search terminal 30. The right side thereof illustrates an example of an image 71 to be registered in the image DB 14 that corresponds to the photographic subject 3. Here, the image 71 is assumed to have a target area 71a and a target area 71b (indicated as "A" and "B", respectively, in FIG. 30A) in accordance with the linkage information. These target areas 71a and 71b correspond areas 71a' and 71b' in the photographic subject (indicated by the dotted lines in FIG. 30A).

Here, as illustrated in the left side of FIG. 30A, the search terminal 30 is assumed to have captured the image by setting an imaging range 70 in a manner such that the photographic subject 3 is included in the imaging range 70 while being shifted leftward and upward from the center 72 thereof. In one example, when desiring to acquire information corresponding to an image contained in the area 71b', the user would likely determine the imaging range 70 so that the area 71b' can be close to the center of the captured image. An image within the imaging range 70 forms a captured image that is transmitted from the search terminal 30 to the search system 10.

In the search system 10, the search server 100a searches the image DB 14 for an image similar to the captured image corresponding to the imaging range 70. The search server 100a is assumed to have determined as a result of the search that, among images registered in the image DB 14, the image 71 has high similarity to a part of the photographic subject 3 contained in the captured image. The search server 100a calculates the distances a and b between the respective areas 71a' and 71b' and the center 72 of the imaging range 70 when the target areas 71a and 71b are applied to the imaging range 70.

As a result of the distance calculation, the search server 100a determines that one of the areas 71a' and 71b' that is closer to the center 72 is a target area to be selected by default. In the example of FIG. 30A, the distance b between the center 72 and the area 71b' is smaller than the distance a between the center 72 and the area 71a'. The area 71b' therefore can be determined to be closer to the center 72 than the area 71a' is. The target area 71b corresponding to the area 71b' is thus adopted as the target area to be selected by default.

The search server 100a transmits, as a search result, a thumbnail image of the image 71 determined to have high similarity and the linkage information associated with the image 71 to the search terminal 30. At this time, the search server 100a transmits them to the search terminal 30 while appending information to the linkage information, the information indicating that the target area 71b is an area set as being in a selected state by default.

FIG. 30B illustrates an example in which a thumbnail image 74 of the image 71 transmitted from the search server 100a is displayed on the search terminal 30. As illustrated therein, for example, the search terminal 30 highlights (by shading with diagonal lines in FIG. 30B) the target area 71b in the thumbnail image 74 in accordance with the linkage information, thereby indicating that the target area 71b is the target area set as being in a selected state. Even in this state, the target area 71a can be selected.

Content Provision Method According to First Embodiment

Figure 31:
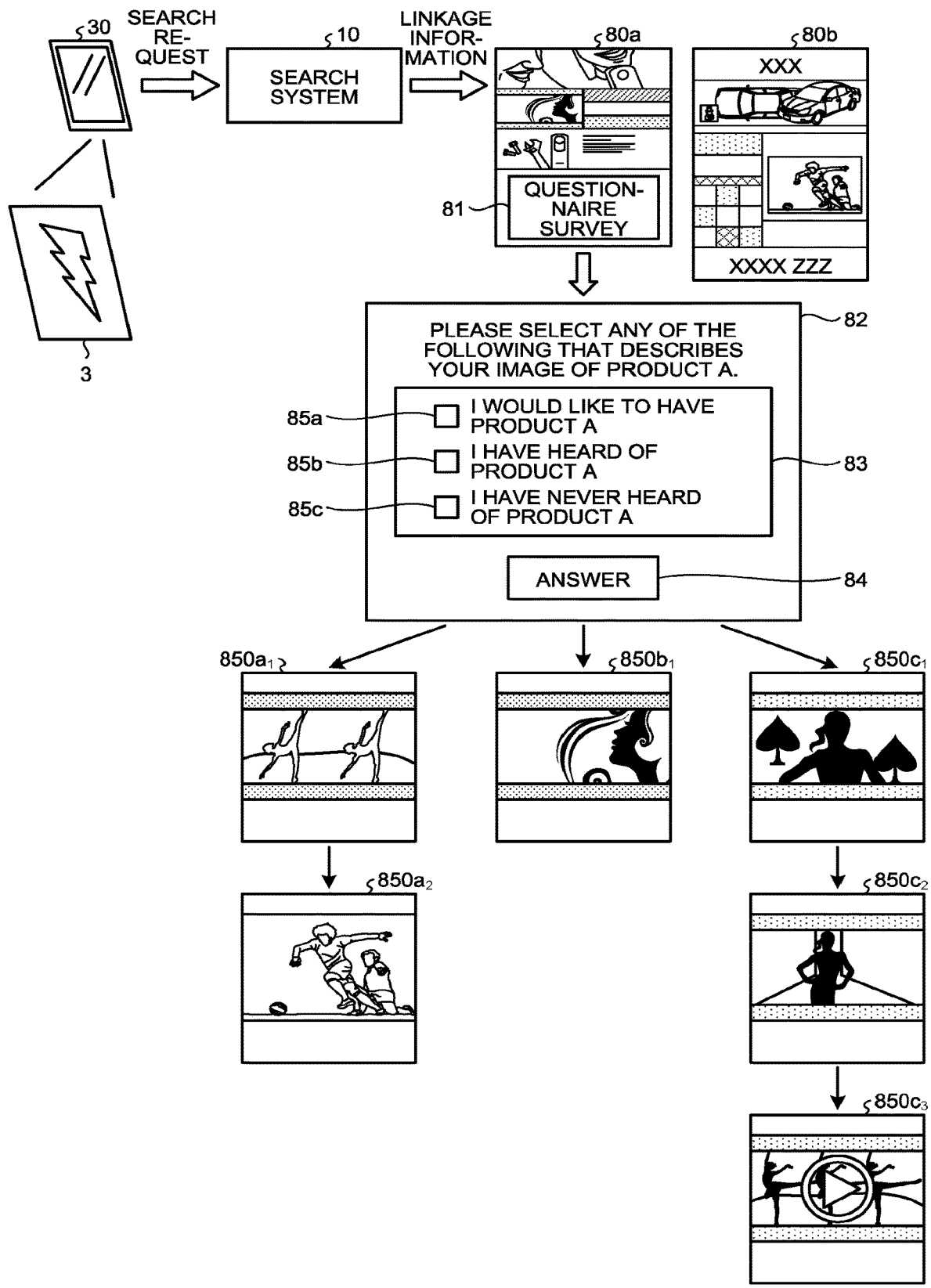
FIG. 31 is a diagram schematically illustrating the procedure of content provision according to the first embodiment.

The following describes content provision method according to the first embodiment. FIG. 31 schematically illustrates the procedure of content provision according to the first embodiment. In FIG. 31, the same reference numerals are assigned to the same components as those in FIG. 1 explained above, and detailed description thereof is omitted. The example of FIG. 31 is an example in which a business operator A carries out a questionnaire survey on a product A via the search terminal 30 and notifies the search terminal 30, via a push notification, that a content according to the questionnaire result is to be provided, for example.

A general user uses the search terminal 30 to capture an image of the photographic subject 3 that contains a picture of a catalogue of the product A and transmit the captured image together with a search request to the search system 10. The search system 10 performs an image search based on the captured image in accordance with the search request transmitted from the search terminal 30 and transmits the linkage information associated with the found image to the search terminal 30.

Here, an image to be found is basically an image specified by the business operator A and registered in the search system 10. For example, the business operator A causes an exclusive DB for the business operator A to be searched via a customized application, so that a search is performed for the image specified by the business operator A. For example, the business operator A registers the image specified by the business operator A after ensuring that the other images stored in the ordinary DB cannot be found in the search.

The search terminal 30 receives the linkage information and displays thereon a browse screen based on the received linkage information. It is assumed that this browse screen contains the URL of a web page that is, as the linkage information, provided by the business operator or provided by a service provider in accordance with a request made by the business operator A. This web page is stored in the business operator server 400*a* managed and operated by the business operator A, for example.

In response to an operation performed by the general user to specify the linkage information displayed on the browse screen, the search terminal 30 accesses the above-described web page provided by the business operator and displays thereon a screen 80*a* in accordance with a description appearing on the web page. The screen 80*a* is a specially set-up screen including a button 81 associated with the link information for carrying out a questionnaire survey on the product A.

The browse screen can include a plurality of pieces of the linkage information for one target area as illustrated in FIG. 27. For example, the browse screen can include a piece of the linkage information that indicates a web page to be provided through an ordinary screen different from the above-described specially set-up screen. This web page to be provided through an ordinary screen is accessible from, for example, a general-purpose information processing apparatus such as a general personal computer. When the general user specifies the piece of the linkage information that indicates the web page to be provided through an ordinary screen, the search terminal 30 displays thereon the web page to be provided on an ordinary screen as is exemplified as a screen 80*b*. In this case, the button 81 for instructing the questionnaire survey to be carried out is not to be displayed on the web page to be provided on an ordinary screen.

Here, in response to an operation on the browse screen, the search terminal 30 can transmit the application ID 310 or the module ID 312 to the business operator server 400*a* storing therein a web page that is the destination of the access. Based on whether equipment accessing the web page has transmitted any one of the application ID 310 and the module ID 312, the business operator server 400*a* can switch web pages to be displayed.

For example, when the equipment accessing the web page has transmitted any one of the application ID 310 or the module ID 312, the business operator server 400*a* guides the equipment toward, as the destination of the access, a website for displaying the above-described specially set-up screen. When the equipment accessing the web page has transmitted neither the application ID 310 nor the module ID 312, the business operator server 400*a* guides the equipment toward, as the destination of the access, a website for displaying the above-described ordinary screen.

In response to an operation performed by the general user on the button 81 on the screen 80*a*, the search terminal 30 accesses a website (hereinafter referred to as questionnaire survey site) for carrying out the questionnaire survey, in accordance with link information associated with this button 81. The search terminal 30 displays thereon a questionnaire survey screen 82 according to the questionnaire survey site by thus accessing it.

In the example of FIG. 31, the questionnaire survey screen 82 includes a selection input section 83 and a button 84. The selection input section 83 includes a plurality of items and checkboxes 85*a*, 85*b*, and 85*c* for selecting one of these items. Here, it is assumed that any one of the checkboxes 85*a*, 85*b*, and 85*c* can be exclusively selected. The button 84 is a button for transmitting the result of the selection using the selection input section 83 to the business operator server 400*a*.

In response to an operation performed on the button 84 with any one of the checkboxes 85*a* to 85*c* being specified, the business operator server 400*a* makes a push notification according to an item specified using the checkboxes 85*a* to 85*c* to the search terminal 30. The business operator server 400*a* also stores therein a piece of information indicating the specified item and another piece of information (a notification ID) with which the search terminal 30 having transmitted this selection result can be identified while associating these pieces of information with each other.

In one example, when the button 84 is operated with the checkbox 85*a* being selected, the business operator server 400*a* requests the notification server 410 to transmit a notification corresponding to the checkbox 85*a*, via a push notification, to the search terminal 30. It is assumed that this notification contains, for example, link information indicating a link to a particular content. In response to the request, the notification server 410 transmits the notification via the push notification to the search terminal 30. Upon receiving this notification, the search terminal 30 provides display indicating that a notification has been received, for example. When an operation responding to this notification is performed, the search terminal 30 accesses the particular content in accordance with the link information contained in the notification, acquires the particular content, and then displays the acquired particular content in a content screen 850*a*$_1$.

In the example of FIG. 31, the particular content displayed in the content screen 850*a*$_1$ is illustrated as a video content provided by a video-providing site outside the information processing system according to the first embodiment. The particular content is not limited to this example, and may be a still image or audio data. The particular content may alternatively be text information.

It is assumed, for example, that the business operator server 400*a* has prepared another particular content (the next particular content) to be provided next to the search terminal 30 on which the item corresponding to the checkbox 85*a* has been specified. Based on the information with which the search terminal 30 can be specified and the information indicating the item specified on the search terminal 30 that have been stored, the business operator server 400*a* requests the notification server 410 to transmit, to the search terminal 30 via a push notification, a notification indicating that the next particular content has been prepared. When an operation responding to this notification is performed, the search terminal 30 accesses the next particular content in accordance with the link information contained in the notification, acquires this particular content, and then displays the acquired next particular content in a content screen 850*a*$_2$.

The same applies to a case where the checkbox 85*b* or 85*c* is specified in the questionnaire survey screen 82. In the example of FIG. 31, when the checkbox 85*b* is specified, the search terminal 30 acquires, via a push notification according to this specification, a particular content corresponding to the item for the checkbox 85*b* and displays the particular content in a content screen 850*b*$_1$. In this example, no next particular content is prepared with respect to the item for the checkbox 85*b*, so that a series of content provision ends when this content screen 850*b*$_1$ is displayed.

When the checkbox 85*c* is specified, the business operator server 400*a* causes the notification server 410 to sequentially transmit at certain different timings, to the search terminal 30, push notifications related to particular contents to be used for displaying content screens 850*c*$_1$, 850*c*$_2$, and 850*c*$_3$.

Although the above description assumes that a setting can be entered exclusively in one of the checkboxes 85*a* to 85*c* provided in the questionnaire survey screen 82, this example is not limiting. This means that entering multiple settings in the checkboxes 85*a* to 85*c* may be allowed. Although the above description assumes that a setting is entered in the two or more checkboxes 85a to 85c, this example is not limiting. It is alternatively possible to provide only one item for which a setting is entered. This comes down to simply specifying whether a push notification is to be executed.

Although the above description also assumes that the questionnaire survey screen 82 for carrying out a questionnaire survey is displayed based on the linkage information, this example is not limiting. This means that the first embodiment is also applicable to any cases for other purposes in which a push notification is executed based on the linkage information.

For example, one possible application is to use the information processing system according to the first embodiment in a stamp rally in which a privilege is given to each participant who has visited all predetermined points. In this case, for example, a participant who has arrived at a certain point captures an image of a specified photographic subject 3 at the point using the search terminal 30 and transmits the captured image to the search system 10. The search terminal 30 accesses, for example, a website indicated by the linkage information transmitted as the result of a search based on the captured image. In response to this access, the business operator server 400a causes the notification server 410 to transmit information indicating a point at which the participant should arrive next, via a push notification, to the search terminal 30.

FIG. 32 illustrates an example of a push notification setting screen 90 for entering settings for a push notification according to the embodiment. The push notification setting screen 90 illustrated in FIG. 32 is displayed by the registration tool 21 started up on the registration terminal 20. For example, as described above, the push notification setting screen 90 is displayed in response to an operation performed on the button 4890 with the target area 4841a (refer to FIG. 23) being specified on the edit screen 480. In this case, the push notification setting screen 90 is used for entering settings related to a push notification corresponding to the target area 4841a. This example is not limiting. Settings for the push notification corresponding to the entire page made of the image 4840 subject to the edit can be entered with an operation performed on the button 4890 while the image 4840 subject to the edit is specified.

In FIG. 32, checkboxes 91 and 92, input regions 93 and 94, an "OK" button 95, and a "Cancel" button 96 are arranged on the push notification setting screen 90. The checkbox 91 is used for entering a setting as to whether to execute a push notification. For example, when a setting indicating that a push notification is not to be executed is entered in the checkbox 91 (the checkbox 91 is left unchecked), processing that keeps the search terminal 30 from transmitting the notification ID 321 is performed (to be described later).

Entering a setting in the checkbox 92 is permitted only after a setting is entered in the checkbox 91 (the checkbox 91 is checked). The checkbox 92 is checked to enable narrowing down receivers of the push notification based on search history information stored in the history DB 107.

The title of the push notification is entered in the input region 93. When the push notification is aimed at prompting linkage to a certain link destination, the URL of the link destination is entered in the input region 94.

The "OK" button 95 reflects settings entered in the checkboxes 91 and 92 and information entered in the input regions 93 and 94 in information about a campaign currently edited on the edit screen 480. For example, in response to an operation performed on the "OK" button 95, values set on the push notification setting screen 90 are reflected for the target area 4841a that is currently being specified. For example, the "OK" button 95 is operated and the button 4889 for indicating that the campaign currently edited should be stored is then operated on the edit screen 480, so that the values set on the push notification setting screen 90 is transmitted to the search system 10. The search system 10 uses the search server 100a to store, in the linkage information DB15, the values set on the push notification setting screen 90 that have been transmitted from the registration terminal 20 while associating these values with information on an image. At this time, the search server 100a stores these values in the linkage information DB 15 with these values added as parameters to a URL contained in the linkage information that corresponds to the image 4840 or the target area 4841a.

Figure 34:
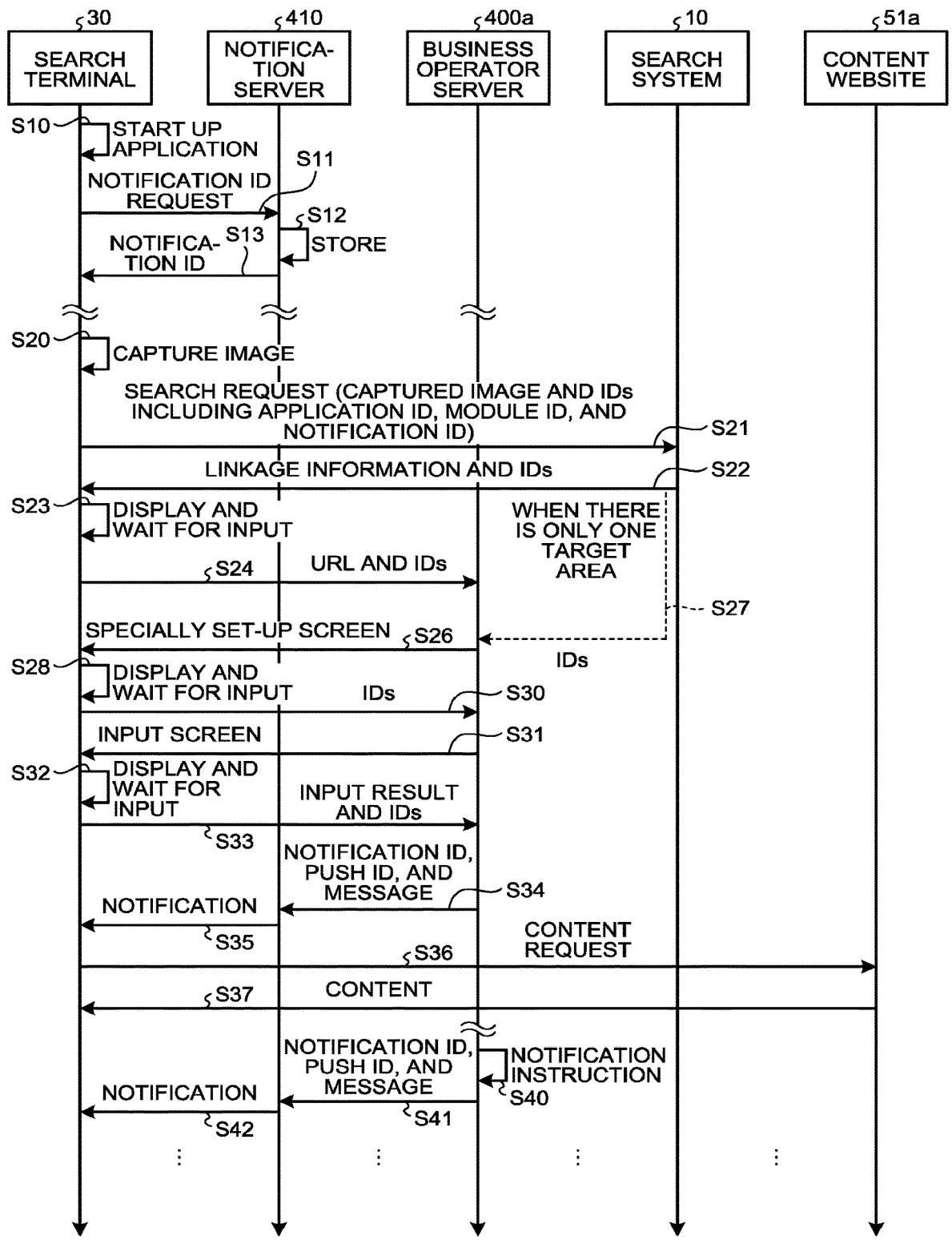
FIG. 34 is an exemplary sequence diagram illustrating content provision processing according to the first embodiment.

Content provision processing according to the first embodiment is described with reference to FIG. 33 and FIG. 34. FIG. 33 illustrates an example of how the parameters are transferred. FIG. 34 is an exemplary sequence diagram illustrating content provision processing according to the first embodiment. In FIG. 34, the same reference numerals are assigned to the same components as those in FIG. 1 explained above, and detailed description thereof is omitted.

Prior to the processing according to the sequence diagram of FIG. 34, by request from the business operator server 400a, the notification server 410 issues a push ID, which is identification information for identifying the push notification, and transmits the push ID to the business operator server 400a. The business operator server 400a uses the notification management unit 4102 to manage push IDs issued by the notification server 410.

The business operator server 400a transmits information, such as a message to be delivered via the push notification, to the notification server 410 while associating the information with the push ID. The notification server 410 stores the message transmitted from the business operator server 400a while associating the message with the push ID. Transmission of the push ID and the notification ID 321 from the business operator server 400a to the notification server 410 thus enables the notification server 410 to deliver, via a push notification, the message associated with the push ID to an address indicated by the notification ID 321.

In FIG. 34, Step S10 to Step S15 are processing for acquiring the notification ID 321. At Step S10, the image search application 301a is started up on the search terminal 30, so that the search terminal 30 uses the image search application 301a to transmit the module ID 312 to the notification server 410, thereby requesting the notification ID 321 (Step S11). This example is not limiting, and the image search application 301a may transmit the application ID 310 instead of the module ID 312.

The notification server 410 issues the notification ID 321, which is unique, in response to the request transmitted from the search terminal 30 and stores the issued notification ID 321 and the module ID 312 transmitted from the search terminal 30 while associating them with each other (Step S12). The notification server 410 transmits the issued notification ID 321 to the search terminal 30 (Step S13). The search terminal 30 uses the image search application 301a to store the notification ID 321 transmitted from the notification server 410, for example, in the storage 3005.

In response to an image-capturing operation by the general user, the search terminal 30 uses the image search application 301a to capture an image of the photographic subject 3 (Step S20). The image search application 301a transmits, to the search system 10, a search request requesting an image search based on the captured image of the photographic subject 3 (Step S21). The search request transmitted here includes the captured image, the application ID 310, the module ID 312, and the notification ID 321. Hereinafter, unless otherwise stated, the application ID 310, the module ID 312, and the notification ID 321 are collectively referred to as "the IDs".

In accordance with the search request transmitted from the search terminal 30, the search system 10 performs an image search based on the captured image included in the search request. The search system 10 stores, in the history DB 107, history information acquired as a result of the image search. The history information includes pieces of information (such as the application ID, the module ID, the user ID, and the notification ID), image identification information indicating a found image, and linkage information associated with the image identification information and including information that indicates a selected target area. The search system 10 returns the linkage information acquired as a result of the image search, together with the IDs transmitted from the search terminal 30 to the search terminal 30 (Step S22).

The IDs can be transferred to the search terminal 30 by being added as parameters to a URI included in the linkage information. FIG. 33 illustrates an example of adding information uid as a parameter to a URI. As illustrated in FIG. 33, a parameter "?<uid>" indicating the user ID is written after a file name ("idresist.html" in this example) in a URL (URI). When there are a plurality of parameters, the parameters are written while being combined with one another by use of a sign "&". The search terminal 30 can access the business operator server 400a in accordance with this URI to transmit the URI, together with the parameters included therein, to the business operator server 400a.

Here, based on information set on the above-described push notification setting screen 90 and registered in the linkage information DB 15, the search system 10 can transmit the notification ID, the push ID, the message, and the like to the notification server 410 when a setting for the selected target area indicates that a push notification is to be executed.

Upon receiving the linkage information and the IDs from the search system 10, the search terminal 30 uses the image search application 301a to display thereon a browse screen for specifying link information based on the linkage information and waits for entries to be input through user operations according to the browser screen (Step S23). Here, the link information is assumed to indicate a URL in the business operator server 400a. When the link information is specified through the user operations according to the browse screen, the image search application 301a accesses a link destination in the business operator server 400a based on the specified link information (Step S24). Here, the specified link information is a URL having the IDs added thereto. It is assumed herein that the specified link information corresponds to a specially set-up screen such as the screen 80a described above.

The business operator server 400a uses the presentation unit 4101 to transmit display information to the search terminal 30 (Step S26). The display information is used for displaying the specially set-up screen. The search terminal 30 uses the image search application 301a to display thereon the specially set-up screen in accordance with the display information transmitted from the business operator server 400a and waits for entries according to the specially set-up screen displayed (Step S28).

When a single target area is to be found based on the captured image at Step S21 (there is only one piece of link information based on the linkage information), the search system 10 can transmit the linkage information to the search terminal 30 via the business operator server 400a directly as indicated by Step S27 in FIG. 34. That is, the specially set-up screen becomes accessible based on the link information without a specification operation performed as the user operation. In this case, it is assumed that a URL for displaying the specially set-up screen is previously set in the linkage information. The search device 30 uses the image search application 301a to display thereon the specially set-up screen based on the received linkage information.

In the search terminal 30, when link information is specified through user operations according to the specially set-up screen, the image search application 301a transmits the specified link information (URL) and the IDs to the business operator server 400a (Step S30). Here, the link information is assumed to be the URL of a website in the business operator server 400a that enables an input screen like the above-described questionnaire survey screen 82 to be displayed. The input screen includes a selection input section in which one item is selected from a plurality of items.

In the business operator server 400a, the presentation unit 4101 transmits display information for the input screen that the website enables to be displayed, together with the IDs transmitted from the search terminal 30, to the search terminal 30 (Step S31). The search terminal 30 uses the image search application 301a to display thereon the input screen in accordance with the display information transmitted from the business operator server 400a and waits for entries according to the input screen displayed (Step S32).

Processing from Step S30 to Step S32 can be skipped depending on settings entered on the specially set-up screen by the business operator.

In the search terminal 30, the image search application 301a transmits an input result and the IDs to the business operator server 400a in response to input operations on the input screen (Step S33). For example, when the input screen displayed at Step S32 includes the above-described selection input section 83, the input result includes information indicating an item selected through an operation responding to the selection input section 83.

The business operator server 400a uses the notification management unit 4102 requests the notification server 410 to provide a notification via the push notification by transmitting the following to the notification server 410 (Step S34): the push ID associated with the module ID 312 included among the IDs transmitted from the search terminal 30; the notification ID 321 included among the IDs; and a message to be delivered via the push notification. Alternatively, the business operator server 400a may transmit, before the processing at Step S34, the message to the notification server 410 while associating the message with the push ID.

In response to the request from the business operator server 400a, the notification server 410 transmits a notification via the push notification to the search terminal 30 (Step S35). This notification is assumed to include, for example, the URL of a content website 51a and a message that prompts access to the content website 51a. The search terminal 30 uses the image search application 301a to request a content from the content website 51a in accordance with the notification transmitted via the push notification (Step S36). The content website 51a transmits the content to the search terminal 30 in accordance with this request (Step S37). The search terminal 30 receives the content transmitted from the content website 51a and, for example, provides display according to the received content.

For example, to the search terminal 30 to which the notification has been transmitted via the push notification at Step S34 and Step S35, the business operator server 400a can further transmit another notification via a push notification at any desired timing after the foregoing notification. For example, the business operator server 400a uses the notification management unit 4102 to generate a notification instruction containing the notification ID 321, the push ID, and a message (Step S40). The notification management unit 4102 transmits the generated notification instruction to the notification server 410, thereby requesting the notification server 410 to provide a notification via a push notification (Step S41).

In response to this request, the notification server 410 transmits a notification via a push notification to the search terminal 30 in accordance with the notification ID 321, the push ID, and the message contained in the notification instruction (Step S42).

According to the first embodiment, a notification can be thus transmitted via a push notification to the search terminal 30 that has requested for an image search based on a captured image of the particular photographic subject 3. This enables the business operator to, after the search terminal 30 has used the linkage information, additionally provide information to the search terminal 30 that has used linkage information based on the particular photographic subject 3.

Second Embodiment

Figure 35:
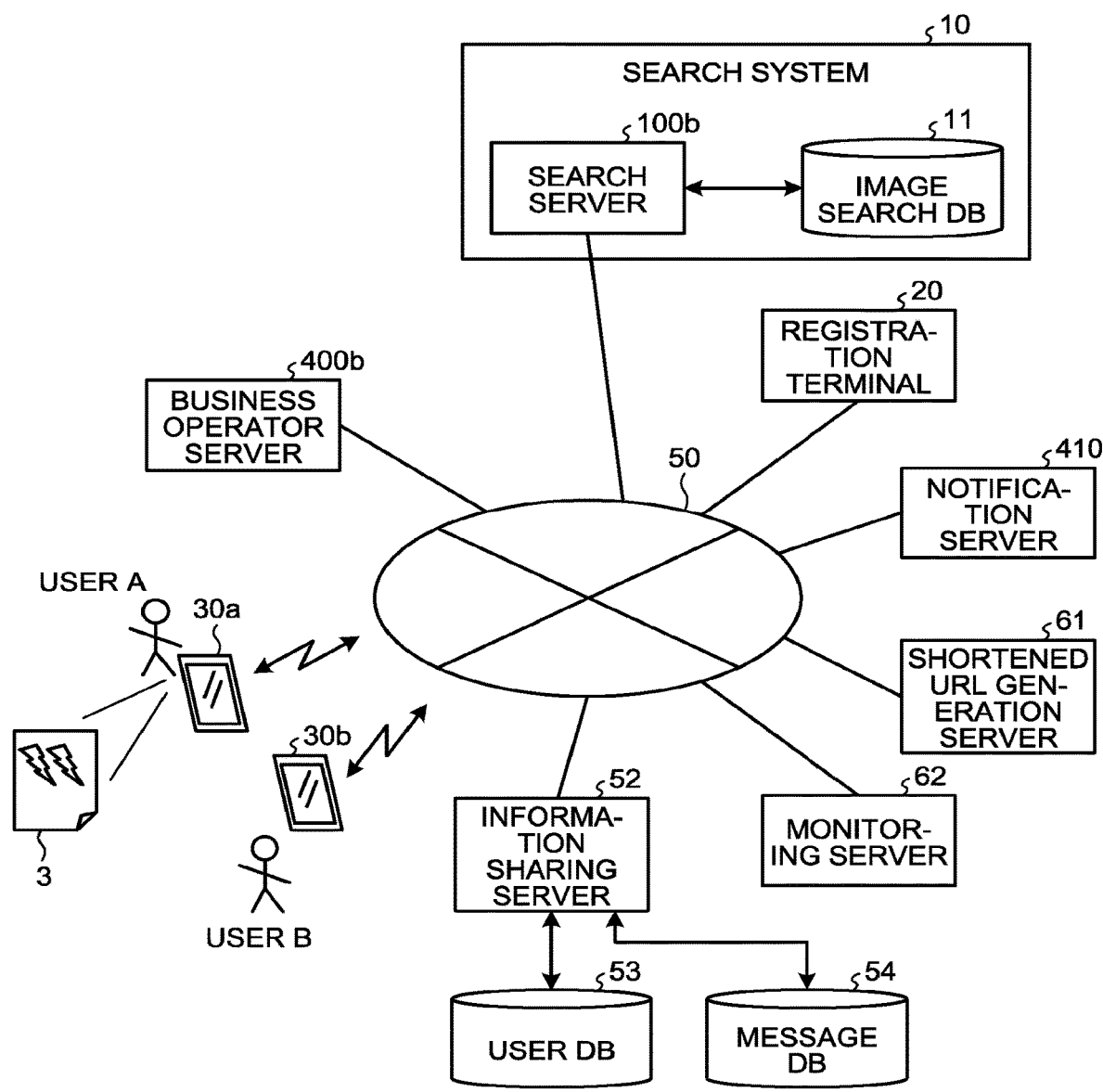
FIG. 35 is a block diagram schematically illustrating an exemplary configuration of an information processing system applicable to a second embodiment.

The following describes a second embodiment. FIG. 35 schematically illustrates an exemplary configuration of an information processing system applicable to the second embodiment. In FIG. 35, the same reference numerals are assigned to the same components as those in FIG. 1 explained above, and detailed description thereof is omitted.

In FIG. 35, the information processing system includes the search system 10, a business operator server 400b, and the notification server 410 that are individually connected to the network 50. An information sharing server 52, a shortened URL generation server 61, and a monitoring server 62 are also connected to the network 50. A search terminal 30a owned by a user A who is a general user, and a terminal device 30b owned by a user B who also is a general user are further connected to the network 50 via wireless communication. The registration terminal 20 is further connected to the network 50. The search system 10 includes a search server 100b and an image search DB 11 connected to the search server 100b.

The business operator server 400b has functions that are different from those of the business operator server 400a described using FIG. 1, the details of which are to be described later. The search server 100b included in the search system 10 has functions obtained by excluding some functions from those of the search server 100a described using FIG. 1.

The same hardware configuration as that of the business operator server 400a described using FIG. 12 can be applied to the business operator server 400b. Description of the hardware configuration is therefore omitted here. Likewise, the same hardware configurations as that of the search terminal 30 described using FIG. 8 can be applied to the search terminal 30a and the terminal device 30b. Description of the hardware configurations are therefore omitted here. The terminal device 30b can be obtained by omitting the imaging unit 3009 and the GNSS unit 3010 from the configuration of the search terminal 30 illustrated in FIG. 8.

As in the case of the search server 100a, using a captured image of the photographic subject 3 transmitted from the search terminal 30a as a search key image, the search server 100b searches the image search DB 11 for an image and acquires, as an image to be found to serve as a search result, an image having high similarity to the search key image. The search server 100b acquires, from the image search DB 11, linkage information associated with the image to be found and transmits the acquired linkage information to the search terminal 30a.

The search terminal 30a is assumed to have an image search application to be described later installed thereon that includes an image search module according to the second embodiment. The above-described image search is executed using functions of this image search application. That is, the search terminal 30a functions as a search terminal that performs an image search using the search server 100b. In contrast, the terminal device 30b does not have the image search application installed thereon. The terminal device 30b therefore cannot perform the above-described image search using the search server 100b.

A service provider that provides an image search service using the search server 100b permits a person or an organization having a particular contract with the service provider to register an image and linkage information in the search server 100b.

The business operator server 400b can include a specially set-up website and an announcement website that are websites on the network 50. The specially set-up website and the announcement website are those that a business operator makes public, for example, when organizing some event or campaign. This example is not limiting, and the specially set-up website and the announcement website may be those that a business operator constantly makes public. The specially set-up website and the announcement website may be websites on the network 50 that are on a server other than the business operator server 400b.

To the information sharing server 52, the user DB 53 and the message DB 54 are connected. In the user DB 53, information on users who use information sharing service that the information sharing server 52 provides is registered. Hereinafter, users on which the user information has been registered in the user DB 53 are referred to as registered users. In the user DB 53, with respect to each piece of the user information to be registered, one or more pieces of the user information can be registered in association therewith.

Examples of the association between user information in the user DB 53 that are applicable to the second embodiment are schematically described using Table 1 and Table 2. Table 1 and Table 2 illustrate an example of pieces of the user information (account names) different from and associated with a piece of the user information for a user under an account name "User A" and an example of pieces of the user information (account names) different from and associated with a piece of the user information for a user under an account name "User B", respectively. In the example of Table 1, account names "User B", "User C", "User D", and so on are associated with the account name "User A". Likewise, in the example of Table 2, account names "User A", "User C", "User E", "User F", and so on are associated with the account name "User B".

TABLE 1

| Account | Associated user |
|---------|-----------------|
| User A  | User B          |
|         | User C          |
|         | User D          |
|         | .               |
|         | .               |
|         | .               |

TABLE 2

| Account | Associated user |
|---------|-----------------|
| User B  | User A          |
|         | User C          |
|         | User E          |
|         | User F          |
|         | .               |
|         | .               |
|         | .               |

The examples of Table 1 and Table 2 indicate that the account names "User A" and "User B" are associated with each other. It is also indicated that the account names "User A" and "User B" have the account name "User C" associated therewith in common.

The information sharing service that the information sharing server 52 according to the second embodiment provides is schematically described here. The information sharing server 52 receives a message transmitted from a terminal device by the registered user. The information sharing server 52 stores, in a message DB 54, the received message while associating it with the user information for the registered user who has transmitted the message and temporal information indicating a clock time at which the message has been received. Each of the registered users can transmit a message to the information sharing server 52 while including therein not only text but also an image (still image), a video, audio information, and the like.

Hereinafter, an act of transmitting a message to the information sharing server 52 is referred to as "posting" a message. Each of the registered users installs a dedicated application program (hereinafter referred to as information sharing application) on a terminal device and posts a message on the information sharing server 52 by using this information sharing application. This example is not limiting, and each of the registered users can post a message by accessing a dedicated website (hereinafter referred to as information sharing site) made public on the network 50 by the information sharing server 52.

The information sharing server 52 enables each message stored in the message DB 54 to be browsed by the registered user who has posted the message and the registered users corresponding to pieces of the user information in the user DB 53 that are different from and associated with a piece of the user information for the foregoing registered user. In the example of Table 1, a message posted by the registered user under the account name "User A" can be browsed by the registered user under the account name "User A" and the registered users under the account names "User B", "User C", "User D", and so on that are associated with the account name "User A". The information sharing server 52 is capable of thus diffusing a message posted by the registered user under a certain account name among the registered users under account names different from and associated with the certain account name.

Each of the registered users can also repost, on the information sharing server 52, a message that this registered user can browse. The information sharing server 52 enables a reposted message to be browsed by the registered user who has reposted the message and the registered users corresponding to pieces of the user information that are different from and associated with a piece of the user information for the foregoing registered user.

When the registered user under the account name "User B" reposts a message posted by the registered user under the account name "User A", the reposted message can be browsed by the registered user under the account name "User B" and the registered users under the account names "user A", "User C", "User E", "User F", and so on that are associated with the account name "User B" in the example of Table 2.

Consequently, the message posted by the registered user under the account name "User A" can be browsed by: the registered users under the account name "User B", "User C" "User D", and so on that are associated with the account name "User A"; and the registered users under the account names "User E", "User F", and so on that are not associated with the account name "User A" but are associated with the account name "User B".

The information sharing server 52 is capable of thus diffusing a message posted by the registered user under a certain account name also among the registered users under account names different from and associated with an account name different from and associated with the certain account name.

The information sharing server 52 is further capable of, based on a search phrase included in a certain format in a posted message, searching the message DB 54 for each message stored therein. Each of the registered users includes, into a message to be posted, a search phrase written in the certain format. For example, a search phrase is set up in a manner such that a phrase to serve as a key is written after a sign "#". A search phrase written in such a format while being added in a message is called a "hashtag" in general. Hereinafter, such a search phrase is referred to as a hashtag unless otherwise stated.

Examples of the information sharing service that the information sharing server 52 provides as above include Twitter (registered trademark) operated by a US-based company called Twitter (registered trademark), Inc.

The monitoring server 62 illustrated in FIG. 35 monitors data transferred onto the network 50 and detects, collects, and aggregates messages that are transmitted to the information sharing server 52 and that each include a hashtag. The monitoring server 62 notifies the information sharing server 52 of hashtags detected thereby. This enables the information sharing server 52 to efficiently execute a search for each message using a hashtag. This also enables the information sharing server 52 to use the result of the counting of hashtags by the monitoring server 62 to extract hashtags that currently tend to appear at high frequencies.

The shortened URL generation server 61 generates, from a URL (referred to as original URL) that has been entered, a shortened URL having a smaller number of characters than the original URL. The shortened URL generation server 61 stores therein the original URL and the generated shortened URL while associating these URLs with each other. Here, the shortened URL generation server 61 uses the domain name of the shortened URL generation server 61 itself on the network 50 as the domain name of the shortened URL and forms an association such that access to the shortened URL is redirected (forwarded) to the original URL.

Figure 36A:
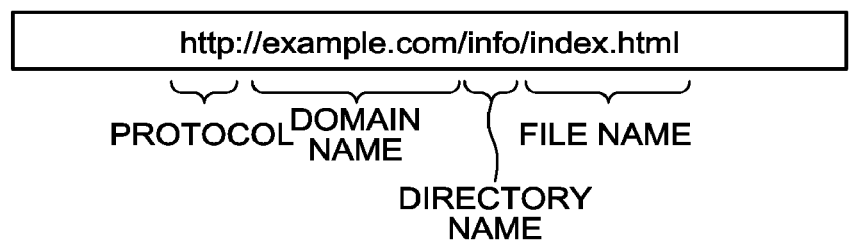
FIG. 36A is a diagram for explaining processing for generating a shortened uniform resource locator (URL), the processing being applicable to the second embodiment.
Figure 36B:
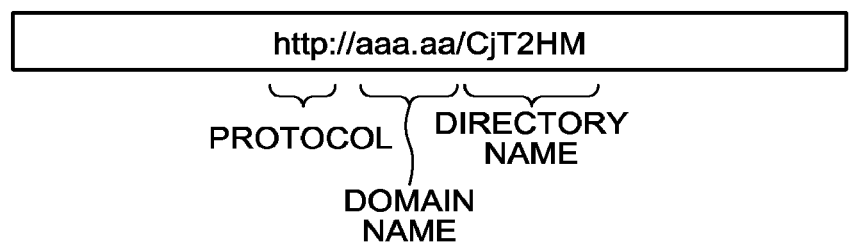
FIG. 36B is a diagram for explaining the processing for generating a shortened URL applicable to the second embodiment.

The following schematically describes, using FIG. 36A and FIG. 36B, processing for generating a shortened URL applicable to the second embodiment to be executed by the shortened URL generation server 61. FIG. 36A illustrates an example of the original URL. As illustrated in FIG. 36A, the URL is composed of a protocol representation, a domain name, a directory name, and a file name that are delimited with slashes "/" and a colon ":" used as delimiting characters. In the example of FIG. 36A, "example.com" is included as the domain name. The directory name can be a hierarchical structure with layers delimited by slashes. A combination of a directory name and a file name is referred to as a path name.

FIG. 36B illustrates an example of the shortened URL. In FIG. 36B, a domain name is one that can be managed by the shortened URL generation server 61, which is the domain name of the shortened URL generation server 61 itself on the network 50, for example. The shortened URL generation server 61 uses a uniquely generated character string as a directory name (path name) for the original URL. In this example, the shortened URL generation server 61 randomly selects, for example, six characters from all the lowercase and uppercase alphabets and the digits from 0 to 9 and uses the six characters for the directory name. This example is not limiting, and the directory name may be composed of characters the number of which is not six or may be of variable length. Not only characters and digits but also signs may be used for the directory name. The shortened URL generation server 61 can generate different shortened URL from the same original URL in response to different requests.

With respect to access to the shortened URL, the shortened URL generation server 61 records, as history, information indicating access origins and information on times when it is accessed. The shortened URL generation server 61 aggregates the history with respect to each shortened URL, thereby making it possible to, for example, manage shortened URLs generated thereby.

Functional Configuration According to Second Embodiment

Figure 37:
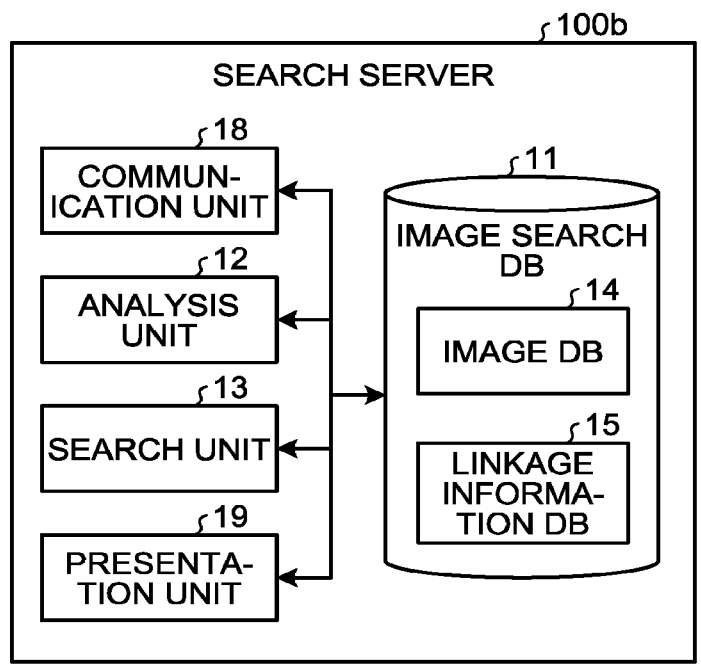
FIG. 37 is an exemplary functional block diagram for explaining functions of a search server according to the second embodiment.

FIG. 37 is an exemplary functional block diagram for explaining functions of the search server 100b according to the second embodiment. In FIG. 37, the same reference numerals are assigned to the same components as those in FIG. 2 explained above, and detailed description thereof is omitted.

As illustrated in FIG. 37, the search server 100b according to the second embodiment includes the communication unit 18 and the presentation unit 19 that are connected to the search server 100a in the search system 10 illustrated in FIG. 2. The search server 100b includes the analysis unit 12, the search unit 13, and the image search DB 11 that includes the image DB 14 and the linkage information DB 15; and the history DB 107 included in the search server 100a in FIG. 2 is left out. The functions of the respective units included in the search server 100b are equivalent to those included in the search system 10 and corresponding thereto that are described using FIG. 2.

Figure 38:
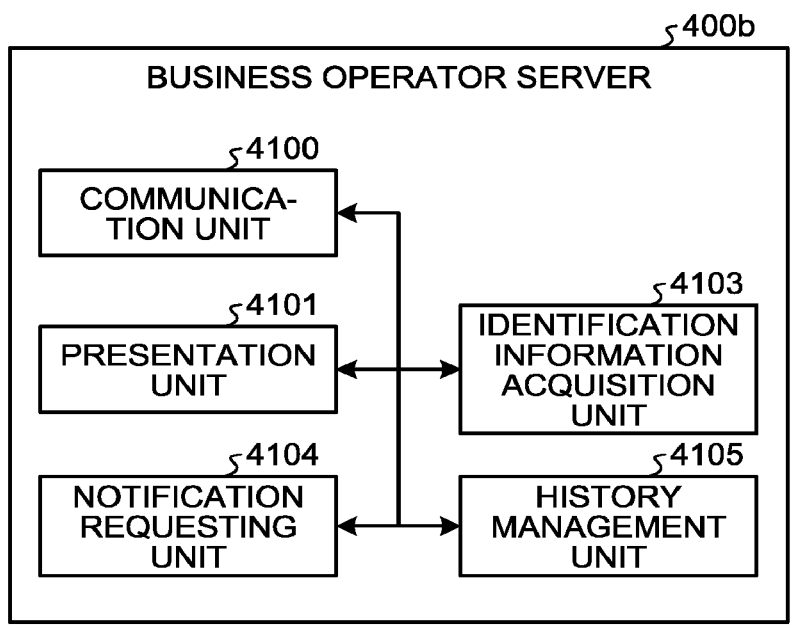
FIG. 38 is an exemplary functional block diagram for explaining functions of a business operator server according to the second embodiment.

FIG. 38 is an exemplary functional block diagram for explaining functions of the business operator server 400b according to the second embodiment. In FIG. 38, the business operator server 400b includes the communication unit 4100, the presentation unit 4101, an identification information acquisition unit 4103, a notification requesting unit 4104, and a history management unit 4105. The communication unit 4100, the presentation unit 4101, the identification information acquisition unit 4103, the notification requesting unit 4104, and the history management unit 4105 are implemented in the form of a computer program that runs on the CPU 4000 (refer to FIG. 12). This example is not limiting, and some or all of the communication unit 4100, the presentation unit 4101, the identification information acquisition unit 4103, the notification requesting unit 4104, and the history management unit 4105 may be built using hardware circuits that operate in cooperation with one another.

The communication unit 4100 and the presentation unit 4101 have the same functions as the communication unit 4100 and the presentation unit 4101 that are described using FIG. 13. Detailed description thereof is therefore omitted here. The presentation unit 4101 in FIG. 38 generates, as information to be presented on the search terminal 30a, a screen for being displayed on the search terminal 30a in particular and transmits the generated screen to the search terminal 30a. In the business operator server 400b in FIG. 38, the notification management unit 4102 in the business operator server 400a in FIG. 13 is left out.

The identification information acquisition unit 4103 acquires identification information for identifying the search terminal 30a that has accessed the business operator server 400b. The notification requesting unit 4104 requests a notification server 410 to execute a push notification. The history management unit 4105 acquires and stores therein, for example, postings to be described later and history of access to a specially set-up website.

An information processing program for implementing the functions that the business operator server 400b performs is provided by being recorded as a file in an installable format or an executable format on a computer-readable recording medium, such as a compact disc (CD), a flexible disk (FD), or a digital versatile disc (DVD). This example is not limiting, and the information processing program may be stored on a computer connected to the network 50 and provided by being downloaded through the network. The information processing program may alternatively be provided or distributed through the network 50.

The information processing program has a modular structure including the above-described units (the communication unit 4100, the presentation unit 4101, the identification information acquisition unit 4103, the notification requesting unit 4104, and the history management unit 4105). With reference to FIG. 12, the actual hardware is configured so that the above-described units can be loaded onto the main memory such as the RAM 4002 by having the information processing program read from a storage medium such as the storage 4003 and executed by the CPU 4000, whereby the communication unit 4100, the presentation unit 4101, the identification information acquisition unit 4103, the notification requesting unit 4104, and the history management unit 4105 are generated on the main memory.

Figure 39:
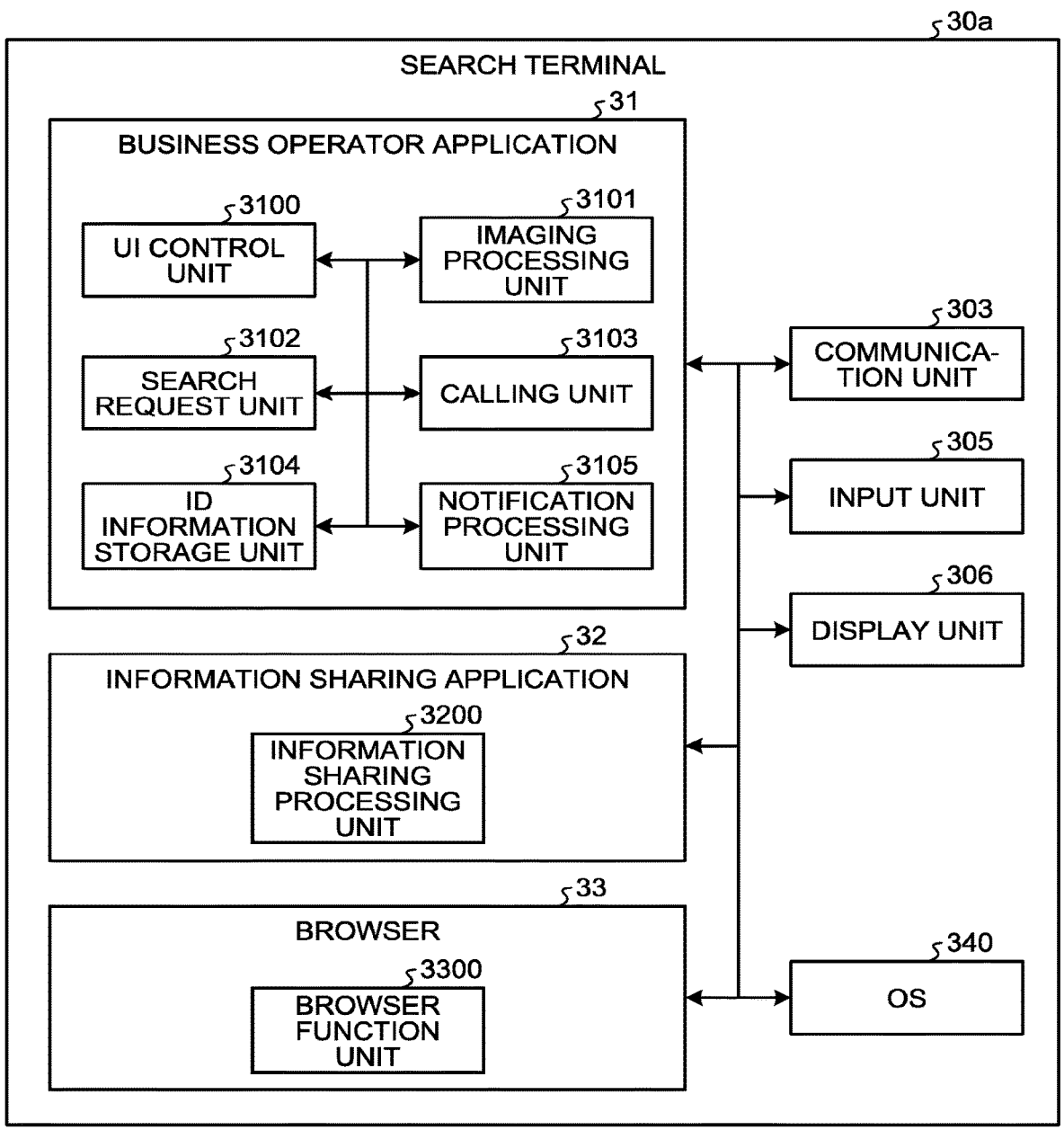
FIG. 39 is an exemplary functional block diagram for explaining functions of a search terminal according to the second embodiment.

FIG. 39 is an exemplary functional block diagram for explaining functions of the search terminal 30a according to the second embodiment. The search terminal 30a includes the communication unit 303, the input unit 305, the display unit 306, and an OS 340 and has a business operator application 31 and an information sharing application 32 installed thereon.

In the example of FIG. 39, the search terminal 30a further has a browser application program 33 (hereinafter referred to as browser 33) installed thereon. The browser 33 is, for example, installed as a standard feature on the search terminal 30a. The communication unit 303, the input unit 305, and the display unit 306 are used from the business operator application 31, the information sharing application 32, and the browser 33 in a shared manner.

The communication unit 303 performs communication via wireless communication through the network 50. The input unit 305 accepts an input operation performed on an input device 3007 and acquires data corresponding to the operation. The display unit 306 controls display of information on a display device 3004. The user interface of the search terminal 30a is composed of the input unit 305 and the display unit 306. The OS 340 controls the overall operation of the search terminal 30a.

The business operator application 31 is schematically described. The business operator application 31 is a customized application obtained by, for example, customization of the above-described image search application 301a by a business operator. The business operator application 31 includes a UI control unit 3100, an imaging processing unit 3101, a search request unit 3102, a calling unit 3103, an ID information storage unit 3104, and a notification processing unit 3105.

The UI control unit 3100 controls the units (the imaging processing unit 3101, the search request unit 3102, the calling unit 3103, the ID information storage unit 3104, and the notification processing unit 3105) in the business operator application 31 and controls a user interface based on the business operator application 31. That is, the UI control unit 3100 generates display information for being displayed on the display device 3004 (refer to FIG. 8) and passes the display information to the display unit 306. The UI control unit 3100 performs processing corresponding to an input operation accepted by the input unit 305 in accordance with display by the display unit 306.

Under the control of the UI control unit 3100, the imaging processing unit 3101 starts up a camera function in the search terminal 30a and controls the imaging unit 3009 (refer to FIG. 8) to output a captured image. Under the control of the UI control unit 3100, the search request unit 3102 generates a search request requesting for a search based on the captured image acquired by the imaging processing unit 3101, and transmits the generated search request and the captured image from the communication unit 303 to the search server 100b. Under the control of the UI control unit 3100, the calling unit 3103 calls the information sharing application 32 and the browser 33 to cause the functions thereof to be executed.

The ID information storage unit 3104 stores and reads out an application ID, which is identification information for identifying the search terminal 30a. The ID information storage unit 3104 acquires the application ID from the business operator server 400b by performing communication with the business operator server 400b, for example, when the business operator application 31 is started up for the first time after being installed on the search terminal 30a. The ID information storage unit 3104 stores the acquired application ID, for example, in a management area for the business operator application 31 in the storage 3005 (refer to FIG. 8). The ID information storage unit 3104 reads out the stored application ID by request.

The application ID corresponds to the application ID 310 (refer to FIG. 10) described in the first embodiment, and is generated as, for example, a unique value by the business operator server 400b in response to installation of the business operator application 31. That is, when the business operator application 31 is reinstalled on the search terminal 30a after being deleted therefrom, an application ID is generated that is different from the application ID generated for the business operator application 31 before the deletion. This example is not limiting, and the application IDs may be values unique to the respective pieces of hardware of the search terminals 30a.

The notification processing unit 3105 executes processing related to push notifications with the notification server 410 as a counterpart. For example, the notification processing unit 3105 requests the notification server 410 to issue a notification ID. The notification processing unit 3105 stores the notification ID issued by the notification server 410, for example, in the management area for the business operator application 31 in the storage 3005.

The information sharing application 32 includes an information sharing processing unit 3200. The information sharing processing unit 3200 uses the communication unit 303 to communicate with the information sharing server 52 and executes processing related to the information sharing service provided by the information sharing server 52.

For example, the information sharing processing unit 3200 executes processing for login to the information sharing server 52. Account information to be used for the login processing may be previously stored in the storage 3005 by the information sharing processing unit 3200 or may be entered through a user operation each time at the login.

The information sharing processing unit 3200 transmits, to the information sharing server 52, a message entered through a user operation and transferred thereto from the input unit 305. At this time, the information sharing processing unit 3200 can add a hashtag entered through a user operation or specified by the business operator server 400b to the message using a certain format and transmit the hashtag to the information sharing server 52. The information sharing processing unit 3200 can append a captured image captured by controlling the imaging unit 3009 (refer to FIG. 8) or an image stored in the storage 3005 to the message and transmit the appended image to the information sharing server 52.

The information sharing processing unit 3200 can acquire, from the information sharing server 52, messages corresponding to individual pieces of account information that are associated with a piece of account information of its own and use the display unit 306 to display the messages. The information sharing processing unit 3200 can execute reposting of a message selected through a user operation from the displayed messages.

The browser 33 includes a browser function unit 3300. The browser function unit 3300 is a browser application equivalent to one that is installed in a general computer. The browser function unit 3300, for example, loads a file written in the HTML format and performs processing such as display in a certain manner.

The search terminal 30a can include various functions in addition to the above-described business operator application 31, information sharing application 32, and browser 33. For example, the search terminal 30a can include a telephone function and an electronic mail function. The search terminal 30a can further include a video replay function exclusively corresponding to a video delivery service provided on a certain website on the network 50.

The above-described business operator application 31, information sharing application 32, and browser 33 included in the search terminal 30a are computer programs that run on the CPU 3000. The communication unit 303, the input unit 305, and the display unit 306 are implemented in the form of computer programs that run on the CPU 3000. Of these computer programs, the information sharing application 32, the browser 33, the communication unit 303, the input unit 305 and the display unit 306 are provided by, for example, being previously stored in the storage 3005.

Of these computer programs, the business operator application 31 can be configured so as to be provided by being downloaded through the network 50 via the wireless communication I/F 3008 while being stored on a computer (for example, the business operator server 400b) connected to a network. This business operator application 31 may be configured so as to be provided or distributed through the network 50.

This example is not limiting, and the business operator application 31 may be provided by being recorded as a file in an installable format or an executable format on a computer-readable recording medium such as a CD or a DVD. In this case, the business operator application 31 stored on the recording medium is supplied to the search terminal 30a, for example, via an external drive device connected to the data I/F 3006. This example is not limiting, and the business operator application 31 stored on the recording medium is supplied to the search terminal 30a through communication via the wireless communication I/F 3008 or the data I/F 3006 from another information processing apparatus after being temporarily recorded on this information processing apparatus.

The business operator application 31, for example, has a modular structure including the above-described units (the UI control unit 3100, the imaging processing unit 3101, the search request unit 3102, the calling unit 3103, the ID information storage unit 3104, and the notification processing unit 3105) and is enabled to run by being installed on the search terminal 30a.

The actual hardware of the business operator application 31 is configured so that the above-described units can be loaded onto the main memory (for example, the RAM 3002) by having the business operator application 31 read from the storage 3005 and executed by the CPU 3000, whereby those units are generated on the main memory.

As already described, the business operator application 31 is supplied, provided, or distributed as described above, and an application ID is assigned thereto when being installed onto the search terminal 30a. The application ID is identification information assigned uniquely each time when the business operator application 31 is installed. For example, the business operator application 31 accesses a particular server (for example, the business operator server 400b) through the network 50 upon completion of installation thereof on the search terminal 30a, and notifies the particular server that the installation is completed.

In response to the notification from the search terminal 30a that the installation is completed, the particular server generates the unique application ID. The application ID may be generated using random numbers, or may be generated using managed information such as serial numbers. The particular server transmits the generated application ID to the search terminal 30a that has transmitted the notification that the installation is completed. The search terminal 30a receives the application ID transmitted from the particular server, and the ID information storage unit 3104 stores the received application ID invisibly, for example, in the storage 3005.

Figure 40:
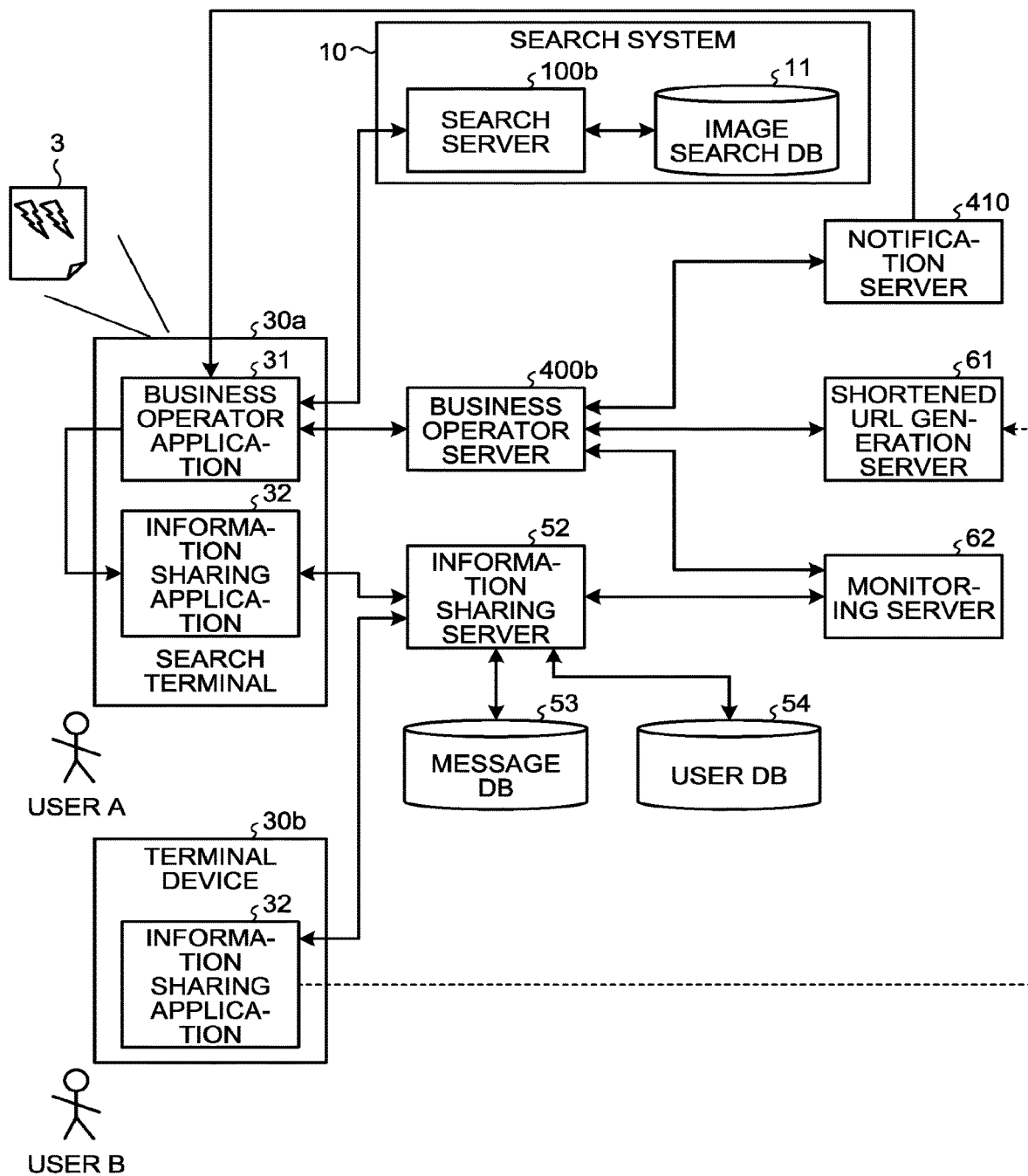
FIG. 40 is a diagram for explaining relations among individual components of the information processing system according to the second embodiment.

Relations Among Individual Components of Information Processing System According to Second Embodiment Relations among individual components of the information processing system according to the second embodiment are schematically described with reference to FIG. 40. In FIG. 40, the same reference numerals are assigned to the same components as those in FIG. 1 explained above, and detailed description thereof is omitted.

In FIG. 40, the search terminal 30a includes the business operator application 31 and the information sharing application 32 as described above. In contrast, the terminal device 30b includes the information sharing application 32 but does not include the business operator application 31. The search terminal 30a and the terminal device 30b each include the browser 33, the communication unit 303, the input unit 305, and the display unit 306 as components common thereto.

In the search terminal 30a, the business operator application 31 transmits the application ID to the notification server 410 and acquires a notification ID. The notification server 410 stores the application ID and the notification ID while associating these IDs with each other. The business operator application 31 performs, with the search server 100b, communication related to an image search based on a captured image of the photographic subject 3 and receives linkage information as the image search result. The business operator application 31 accesses the business operator server 400b in accordance with the linkage information returned from the search server 100b, and performs transmission and reception of identification information such as the application ID and screen information with the business operator server 400b.

The business operator server 400b transmits a previously set hashtag to the monitoring server 62, thereby requesting the monitoring server 62 to monitor messages that includes the transmitted hashtag. In response to this request, the monitoring server 62 monitors messages transmitted and received by the information sharing server 52 and transmits the result of the monitoring to the information sharing server 52.

The business operator server 400b requests a shortened URL for the URL of a specially set-up website from the shortened URL generation server 61 and acquires the shortened URL. The business operator server 400b stores the shortened URL while associating it with the application ID for the search terminal 30a and transmits the shortened URL and the above-described previously set hashtag to the search terminal 30a.

In the search terminal 30a, upon receiving the shortened URL and the hashtag transmitted from the business operator server 400b, the business operator application 31 calls and starts up the information sharing application 32 and pass the shortened URL and the hashtag to the information sharing application 32. The information sharing application 32 transmits a message having the shortened URL added therein by being contained in the hashtag to the information sharing server 52. The information sharing server 52 makes the received message public.

When the hashtag that the monitoring server 62 has been requested to monitor is detected from a message made public by the information sharing server 52, the monitoring server 62 transmits the message to the business operator server 400b. The business operator server 400b transmits, to the notification server 410, the application ID associated with the shortened URL contained in the received message. The notification server 410 executes a push notification to the search terminal 30a in accordance with the notification ID associated with this application ID. In the search terminal 30a, the business operator application 31 can access, for example, the specially set-up website in response to this push notification.

In contrast, in the terminal device 30b, the information sharing application 32 accesses the information sharing server 52 and browses messages made public by the information sharing server 52. At this time, if the user DB 53 in the information sharing server 52 has a user B of the terminal device 30b associated with a user A of the search terminal 30a, a message posted from the search terminal 30a is displayed on the terminal device 30b, and a shortened URL contained in a hashtag added in the message is diffused to the user B.

In the second embodiment, the configuration according to the first embodiment described with reference to, for example, FIG. 4 can be applied as a configuration used for the search system 10 to perform a search based on, for example, an image captured of the photographic subject 3 by the search terminal 30a. In the second embodiment, the method according to the first embodiment described with reference to, for example, FIG. 14 to FIG. 24 can be applied as processing for registering, in the search server 100b, an images to be found.

Details of Processing According to Second Embodiment

Figure 41:
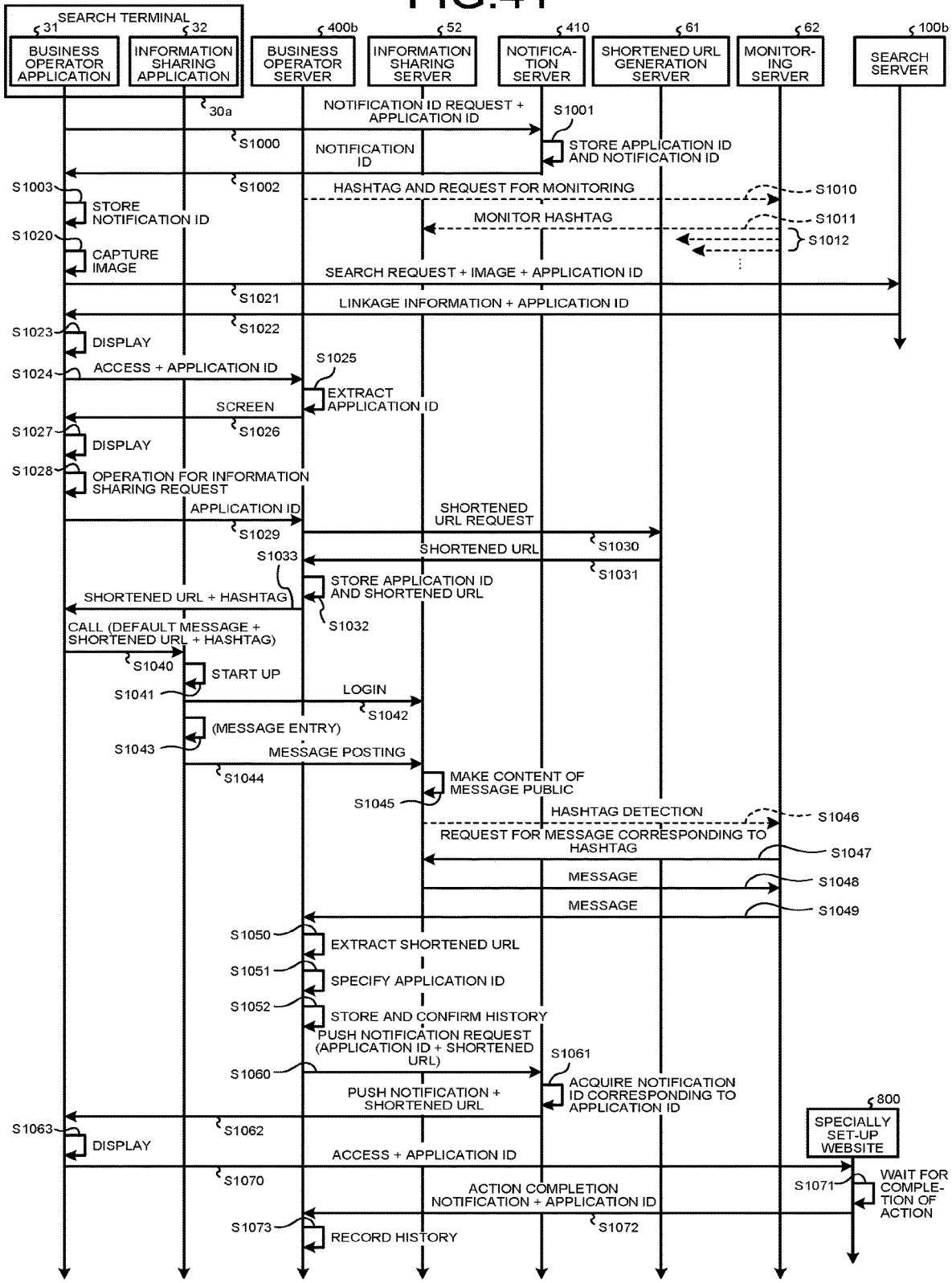
FIG. 41 is an exemplary sequence diagram illustrating the entirety of processing according to the second embodiment.

More detailed description of processing according to the second embodiment is given next with reference to FIG. 41 to FIG. 48. FIG. 41 is an exemplary sequence diagram illustrating the entirety of processing according to the second embodiment. In FIG. 41, the same reference numerals are assigned to the same components as those in FIG. 35 explained above, and detailed description thereof is omitted.

The following describes a case in which, in a campaign (event) held by a business operator, the business operator aims at guiding a user to a specially set-up website 800 that is a website operated by a business operator for the campaign and then distributing information on the campaign.

The specially set-up website 800 can be set up as a website provided within the business operator server 400b or may be a website provided on a server different from the business operator server 400b.

Prior to the processing according to the sequence diagram of FIG. 41, the business operator application 31 is installed onto the search terminal 30a and the unique application ID is assigned thereto by the business operator server 400b.

In the search terminal 30a, the business operator application 31 uses the notification processing unit 3105 to transmit the application ID to the notification server 410, thereby requesting issuance of a notification ID (Step S1000). The notification server 410 issues a notification ID in response to this request, and stores the issued notification ID while associating it with the application ID received from the search terminal 30a (Step S1001). The notification server 410 transmits the issued notification ID to the search terminal 30a (Step S1002). In the search terminal 30a, the business operator application 31 uses the notification processing unit 3105 to store the notification ID transmitted from the notification server 410 (Step S1003).

The processing from Step S1000 to Step S1003 described above is executed at certain proper time points such as the time when the business operator application 31 is started up.

The business operator server 400b transmits a previously determined hashtag to the monitoring server 62, thereby requesting the monitoring server 62 to monitor this hashtag (Step S1010). In one example, the hashtag is formed as a character string that contains a phrase indicating the campaign name. The monitoring server 62 monitors the hashtag in response to this request (Step S1011). For example, the monitoring server 62 monitors pieces of information (messages) transmitted to the information sharing server 52 and determines whether the hashtag that the monitoring server 62 has been requested to monitor is contained in each of the pieces of information. Upon detecting a piece of information that contains the hashtag that the monitoring server 62 has been requested to monitor, the monitoring server 62 acquire the detected piece of information.

Upon being requested to monitor the hashtag at Step S1010, the monitoring server 62 continues, from Step S1011 onward, monitoring the hashtag that the monitoring server 62 has been requested to monitor (Step S1012).

In the search terminal 30a, the photographic subject 3 is captured in response to a user operation (Step S1020). Here, it is assumed that, while the photographic subject 3 has been specified by the business operator, an image thereof has been already registered in the search server 100b. As in the case of the first embodiment, the business operator can set any one of various items, such as a leaflet, a poster, a signboard, a signage, a promotional photograph, a certain scenery, and a product, as the photographic subject 3. The business operator application 31 uses the search request unit 3102 to transmit a captured image of the photographic subject 3, a search request requesting an image search based on the captured image, and the application ID to the search server 100b (Step S1021). The business operator application 31 may also transmit the notification ID in addition to the captured image, the search request, and the application ID to the search server 100b.

The search server 100b receives the captured image, the search request, and the application ID transmitted from the search terminal 30a. In response to the received search request, the search server 100b performs the image search using the received captured image as a search key image. The search server 100b uses the presentation unit 19 to transmit linkage information obtained as a result of the image search, together with the application ID, to the search terminal 30a (Step S1022).

In the search terminal 30a, under the control of the UI control unit 3100, the business operator application 31 uses the display unit 306 to display, on the display device 3004 of the search terminal 30a, a screen for specifying link information included in the linkage information (Step S1023). In this example, the link information includes, for example, the URL of a certain file within the business operator server 400b. This certain file includes display control information for displaying a certain screen on the search terminal 30a.

Hereinafter, simple expressions such as "the business operator application 31 displays a screen" are used to mean "the business operator application 31 uses the display unit 306 to display a screen on the display device 3004 of the search terminal 30a under the control of the UI control unit 3100."

Upon specification of link information in response to the display at Step S1023, the business operator application 31 accesses, in accordance with a URL included in the link information, a file indicated by the URL (Step S1024). At this time, the business operator application 31 accesses the file with the URL having the application ID added thereto.

Figures 42, 43:
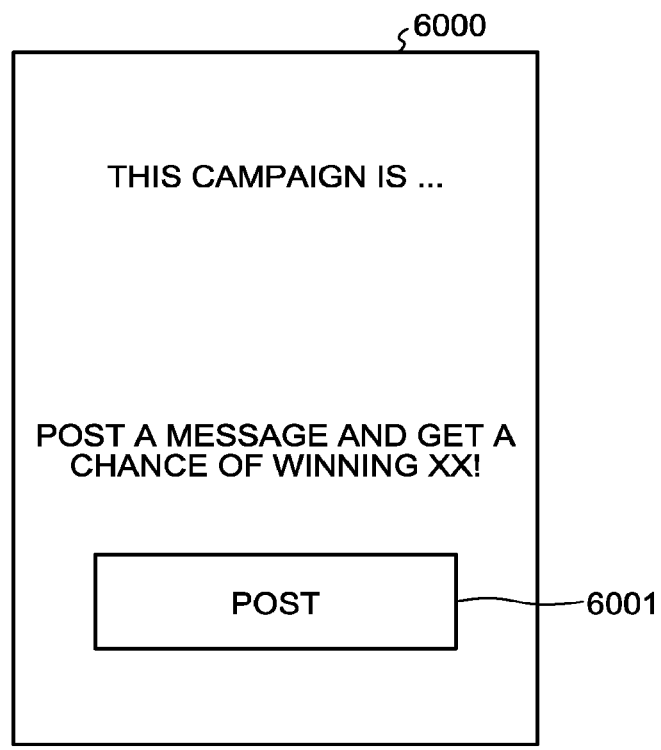
FIG. 42 is a diagram illustrating an example of link information applicable to the second embodiment, the link information including a user ID acquisition instruction.
FIG. 43 is a diagram illustrating an example of an information sharing operation screen according to the second embodiment.

For example, the link information included in the linkage information is set up so as to include an application ID acquisition instruction for requesting acquisition of an application ID. FIG. 42 is a diagram illustrating an example of link information (URL), applicable to the second embodiment, that includes the application ID acquisition instruction. As illustrated in FIG. 42, the application ID acquisition instruction can be set up in a manner such that a file name ("jigyosha.html" in this example) in the URL is written and followed by a parameter "?<uid>". When the link information included in the linkage information has the parameter "?<uid>" added therein, the business operator application 31 uses the ID information storage unit 3104 to read out the application ID and replaces a part written as "<uid>" in the parameter "?<uid>" with the application ID thus read out, for example.

In response to the access from the search terminal 30*a* at Step S1024, the business operator server 400*b* uses the identification information acquisition unit 4103 to extract the application ID added to the URL (Step S1025). The extracted application ID is stored in the business operator server 400*b*.

The processing at Step S1023 described above can be skipped. In this case, upon receiving the linkage information from the search server 100*b*, the business operator application 31 extracts the link information from the received linkage information. In accordance with the URL included in the extracted link information, the business operator application 31 transmits the application ID to the business operator server 400*b* and accesses the certain file within the business operator server 400*b* (Step S1024).

After extracting the application ID at Step S1025, the business operator server 400*b* uses the presentation unit 4101 to transmit a file for displaying a screen to the search terminal 30*a* (Step S1026). The search terminal 30*a* receives the file for displaying a screen to the search terminal 30*a* transmitted from the business operator server 400*b* and passes on the received file to the business operator application 31. The business operator application 31 provides display according to the acquired file (Step S1027).

FIG. 43 illustrates an example of an information sharing operation screen, according to the second embodiment, that is displayed at Step S1027. In FIG. 43, the information sharing operation screen 6000 has a post button 6001 provided therein. The post button 6001 is a button for requesting the information sharing server 52 to execute information sharing processing. More specifically, the post button 6001 starts up the information sharing application 32 installed on the search terminal 30*a* and causes the information sharing application 32 to execute posting a message to the information sharing server 52. A message prompting the user to operate the post button 6001 is displayed on the information sharing operation screen 6000.

If the post button 6001 is operated on the information sharing operation screen 6000 (Step S1028), the business operator application 31 transmits the application ID to the business operator server 400*b* (Step S1029). The application ID is transmitted, for example, by being added to a URL that is the destination of the application ID in the business operator server 400*b*. Upon receiving the application ID, the business operator server 400*b* uses the identification information acquisition unit 4103 to transmit, to the shortened URL generation server 61, a URL of an announcement website used for announcing and distributing information, thereby requesting generation of a shortened URL corresponding to that URL (Step S1030). In response to this request, the shortened URL generation server 61 generates a shortened URL corresponding to the URL of the announcement website and transmits the generated shortened URL to the business operator server 400*b* (Step S1031).

Upon receiving the shortened URL transmitted from the shortened URL generation server 61, the business operator server 400*b* uses the identification information acquisition unit 4103 and stores the received shortened URL and the application ID transmitted from the search terminal 30*a* while associating them with each other (Step S1032). The business operator server 400*b* then transmits the shortened URL and a hashtag to the search terminal 30*a* (Step S1033). Here, the hashtag transmitted to the search terminal 30*a* is the hashtag that the monitoring server 62 has been requested to monitor at Step S1010 described above.

In the search terminal 30*a*, the business operator application 31 calls and starts up the information sharing application 32 upon receiving the shortened URL and the hashtag from the business operator server 400*b* (Step S1040). At this time, the business operator application 31 calls the information sharing application 32 using the shortened URL and hashtag that have been received from the business operator server 400*b* and a default message as parameters. The default message may be previously stored in the business operator application 31 or may be prepared on the part of the business operator server 400*b* and transmitted together with the shortened URL and the hashtag to the search terminal 30*a* by the business operator server 400*b* at Step S1033 described above.

The information sharing application 32 is started up in response to calling thereof by the business operator application 31 at Step S1040 (Step S1041). Upon being started up, the information sharing application 32 requests login to the information sharing server 52 (Step S1042). For example, the information sharing application 32 transmits login information (a login ID and a password) previously registered in the search terminal 30*a* to the information sharing server 52, thereby requesting the information sharing server 52 to execute login processing. This example is not limiting, and the information sharing application 32 may display an input screen in which to enter the login ID and the password and transmit the login information entered in the input screen through user operations to the information sharing server 52.

Figure 44:
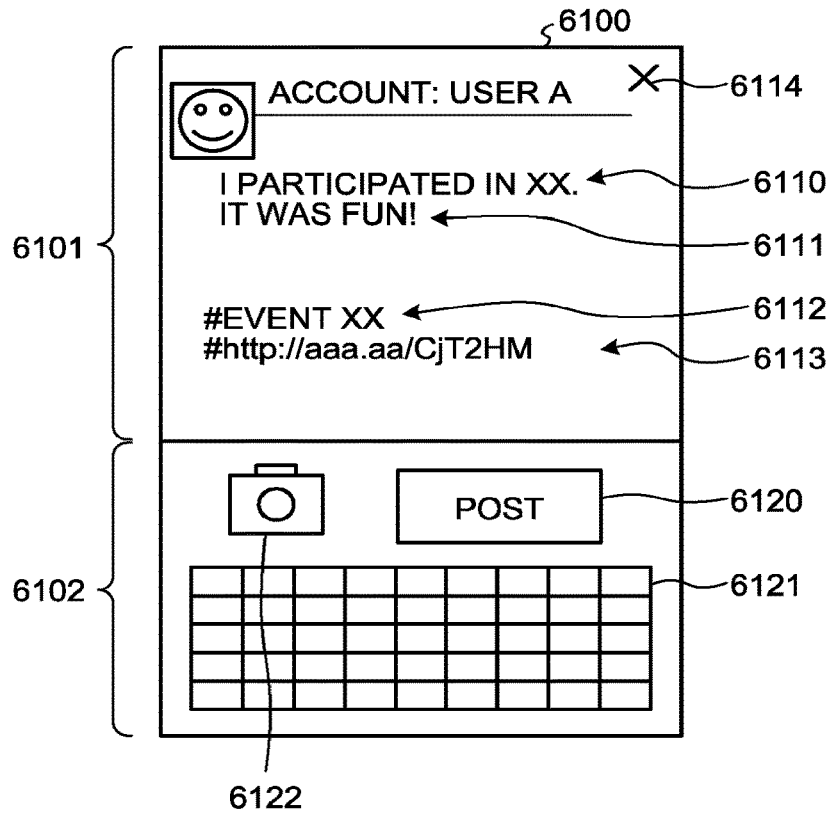
FIG. 44 is a diagram illustrating an example of a message input screen applicable to the second embodiment.

If the login information is authenticated by the information sharing server 52, the information sharing application 32 displays a message input screen in which to enter a message (Step S1043). FIG. 44 illustrates an example of the message input screen applicable to the embodiment that is displayed by the information sharing application 32. In FIG. 44, the message input screen 6100 includes a message input section 6101 and an operation section 6102.

The operation section 6102 includes a post button 6120, a software keyboard section 6121, and an image capture button 6122. The post button 6120 is a button for posting a message by transmitting a message entered in the message input section 6101 to the information sharing server 52. The software keyboard section 6121 is a function provided by, for example, the OS 340 of the search terminal 30*a* and is an interface via which to enter textual information or the like. The image capture button 6122 is a button for capturing an image by controlling the imaging unit 3009 (refer to FIG. 8) from the information sharing application 32.

The message input section 6101 is a region in which to enter a message for being transmitted to the information sharing server 52. In the embodiment, if the information sharing application 32 is called and started up by the business operator application 31 at Step S1040, the information sharing application 32 puts beforehand the message input section 6101 into a state having a default message 6110 and hashtags 6112 and 6113 entered.

In the example of FIG. 44, the hashtag transferred from the business operator application 31 at Step S1040 is entered beforehand as the hashtag 6112. This hashtag 6112 is the hashtag that the business operator server 400*b* has requested the monitoring server 62 to monitor at Step S1010. In addition, the shortened URL transferred from the business operator application 31 at Step S1040 is entered beforehand as the hashtag 6113 with the sign "#" indicative of a hashtag added at the front thereof. The default message 6110 is the default message transferred by the business operator application 31 at Step S1040.

In the message input section 6101, a message 6111 can be additionally entered, for example, through user operations performed on the software keyboard section 6121. Entry of the message 6111 may be skipped. The captured image captured by controlling the imaging unit 3009 with an operation performed on the image capture button 6122 can be entered as a message in the message input section 6101. An image stored in the storage 3005 (refer to FIG. 8) of the search terminal 30a can be specified to be entered also as a message in the message input section 6101.

In FIG. 44, the button 6114 is a button with which to discard all messages entered in the message input section 6101. In the example of FIG. 44, the account name and the icon image of a user (assumed to be the user A) who has logged in to the information sharing server 52 using this search terminal 30a are displayed to the left of the button 6114.

If the post button 6120 is operated through a user operation, the information sharing application 32 transmits a message (the default message 6110, the message 6111, the hashtag 6112, and the hashtag 6113) entered in the message input section 6101 to the information sharing server 52, thereby posting the message (Step S1044). Upon receiving the message transmitted from the search terminal 30a, the information sharing server 52 makes the received message public.

The message made public is acquired from the information sharing server 52 by the information sharing application 32 and displayed on the search terminal 30a. It is assumed that: the user B who, in the user DB 53, is associated with the user A who has logged in to the information sharing server 52 using the information sharing application 32 has posted another message on the information sharing server 52 using the information sharing application 32 installed on the terminal device 30b; and the message has been made public. In this case, the message from the user B and the message from the user A are displayed on the search terminal 30a and the terminal device 30b, respectively.

Figure 45:
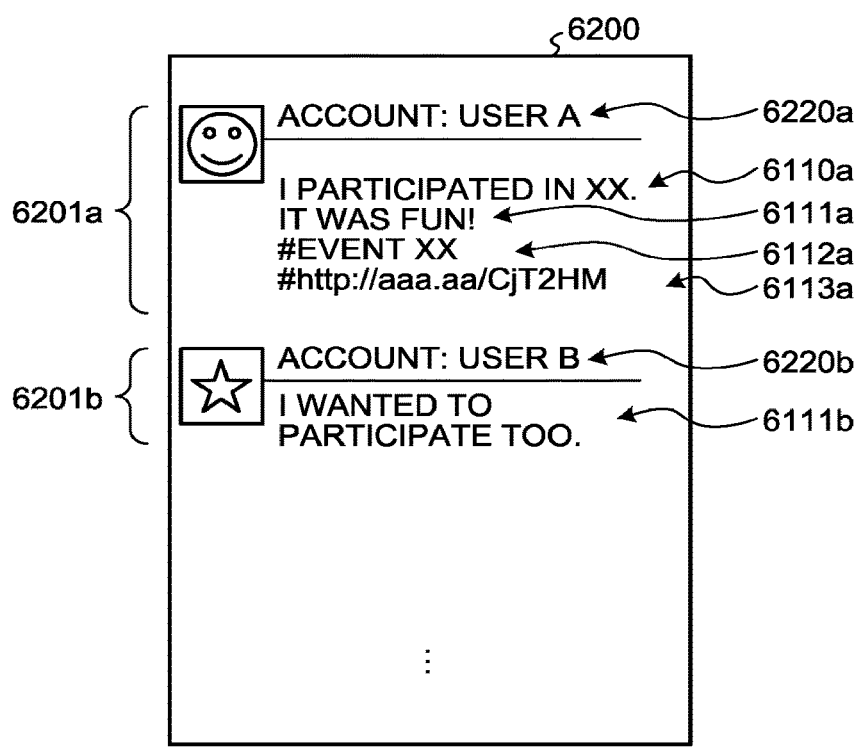
FIG. 45 is a diagram illustrating an example of a message browse screen according to the second embodiment.

FIG. 45 illustrates an example of a message browse screen according to the second embodiment in which the messages made public by the information sharing server 52. In FIG. 45, in the message browse screen 6200, the message from the user A is displayed in an area 6201a, and the message from the user B associated with the user A in the user DB 53 is displayed in an area 6201b. In this example, pieces of account information 6220a and 6220b of the respective users A and B are displayed in the tops of the respective areas 6201a and 6201b by use of account names and icon images.

This example assumes that the user B posts a message on the information sharing server 52 using the terminal device 30b that does not have the business operator application 31 installed thereon.

The area 6201a has messages 6110a and 6111a and hashtags 6112a and 6113a displayed therein that correspond to the default message 6110, the message 6111, and the hashtags 6112 and 6113 in FIG. 44, respectively. The area 6201b has a message 6111b displayed therein that has been entered by the user B. The terminal device 30b does not have the business operator application 31 installed thereon. Therefore, the processing from Step S1000 to Step S1040 in the sequence diagram of FIG. 41 is not executed, so that a message posted therefrom does not contain the default message 6110 and the hashtags 6112 and 6113.

The user A and the user B are associated with each other on the user DB 53, and this association enables this message browse screen 6200 to be displayed on the search terminal 30a operated by the user A and on the terminal device 30b operated by the user B. Consequently, the URL (the hashtag 6113) of the announcement website contained in the message posted from the search terminal 30a that has the business operator application 31 installed thereon can be displayed on the terminal device 30b that does not have the business operator application 31 installed thereon. Diffusion of the URL of the announcement website can be thus implemented.

In this manner, diffusion of the URL (the hashtag 6113) of the announcement website can be implemented as a result of posting from the search terminal 30a of a message containing the default message 6110, the message 6111, and the hashtags 6112 and 6113. For this reason, the message posting processing at Step S1044 can be considered as diffusing requesting processing with which to request the information sharing server 52 to diffuse information.

A diffusion requesting unit that includes the units (the identification information acquisition unit 4103, the presentation unit 4101, and the calling unit 3103) related to the message posting and performs the diffusion requesting processing is set up. The calling unit 3103 has a function of a transmission unit that calls the information sharing application 32 from the business operator application 31 and transmits a message including the default message 6110, the message 6111, and the hashtags 6112 and 6113 to the business operator server 400b.

Referring back to FIG. 41, when the message posted at Step S1045 is made public, the hashtag 6112 included in the posted message is detected by the monitoring server 62 in response to the request from the business operator server 400b at Step S1010 (Step S1046). The monitoring server 62 requests the message from which the hashtag 6112 has been detected (the message displayed in the area 6201a in FIG. 45) from the information sharing server 52 (Step S1047). The information sharing server 52 transmits that message to the monitoring server 62 in response to this request (Step S1048). The monitoring server 62 receives the message transmitted from the information sharing server 52 and transmits the received message to the business operator server 400b that has requested to monitor the hashtag 6112 (Step S1049).

The business operator server 400b receives a message transmitted from the monitoring server 62 and uses the identification information acquisition unit 4103 to extract the shortened URL included as the hashtag 6113 in the received message (Step S1050). Subsequently, the business operator server 400b uses the identification information acquisition unit 4103 to identify the application ID associated with the extracted shortened URL (Step S1051). Subsequently, the business operator server 400b uses the history management unit 4105 to store and confirm history (Step S1052).

An example of history information according to the second embodiment that is managed by the history management unit 4105 is illustrated in Table 3.

TABLE 3

| Application ID | Account | Posting completed | Action completed |
|---|---|---|---|
| abc22 | User A | ○ | ○ |
| Cde01 | User G | ○ | × |
| . | . | . | . |
| . | . | . | . |
| . | . | . | . |

In Table 3, the history information includes items of "Application ID", "Account", "Posting completed", and "Action completed". The application ID specified at Step S1051 is stored in the item "Application ID". The account name included in the message transmitted from the monitoring server 62 at Step S1049 is stored in the item "Account". At least either of the item "Application ID" and the item "Account" needs to have a value stored therein.

The item "Posting completed" indicates whether the posting performed at Step S1044 by a user corresponding to the application ID or account name that is indicated by the item "Application ID" or item "Account" is completed. For example, when the business operator server 400b has received the message from the monitoring server 62 at Step S1049, the posting can be determined to be completed. In the example of FIG. 45, a hollow circle in the item "Posting completed" indicates that the posting is completed, and a cross mark therein indicates that the posting is uncompleted.

The item "Action completed" indicates whether an action to be described later is completed in the specially set-up website 800. In the example of FIG. 15, a hollow circle in the item "Action completed" indicates that the action is completed, and a cross mark therein indicates that the action is uncompleted.

At Step S1052, the business operator server 400b uses the history management unit 4105 to confirm the contents of the history information. More specifically, the history management unit 4105 determines whether a value in the item "Posting completed" in the history information indicates that the posting is completed. If determining that the value does not indicate that the posting is completed (posting uncompleted), the history management unit 4105 updates the value in the item "Posting completed" to a value indicating that the posing is uncompleted. If determining, instead, that the value in the item "Posting complete" indicates that the posting is completed, the history management unit 4105 performs nothing on "Posting completed".

The business operator server 400b uses the history management unit 4105 to determine whether a value in the item "Action completed" in the history information indicates that the action is completed. If determining that the value in the item "Action completed" does not indicate that the action is completed (action uncompleted), the business operator server 400b executes processing at the next step S1060 and the steps that follow it.

If determining, instead, that the value in the item "Action completed" indicates that the action is completed, the business operator server 400b ends the sequence of processing steps according to this sequence diagram of FIG. 41.

At Step S1052, if the business operator server 400b determines that the action is uncompleted, the business operator server 400b uses the notification requesting unit 4104 to transmit the application ID and the URL of the specially set-up website 800 to the notification server 410, thereby requesting a push notification (Step S1060).

The notification server 410 receives the application ID and the URL of the specially set-up website 800 that have been transmitted from the business operator server 400b and accepts the request for a push notification at the same time. The notification server 410 acquires the notification ID stored in association with the received application ID (Step S1061). The notification server 410 performs a push notification to the search terminal 30a using the acquired notification ID (Step S1062). At this time, the notification server 410 transmits, via the push notification, a message including the URL of the specially set-up website 800 and screen information to be used for displaying a certain screen.

The message delivered via the push notification is received by the search terminal 30a and transferred to the business operator application 31. The business operator application 31 displays a notification screen in accordance with the screen information included in the push notification transferred thereto (Step S1063).

Figure 46:
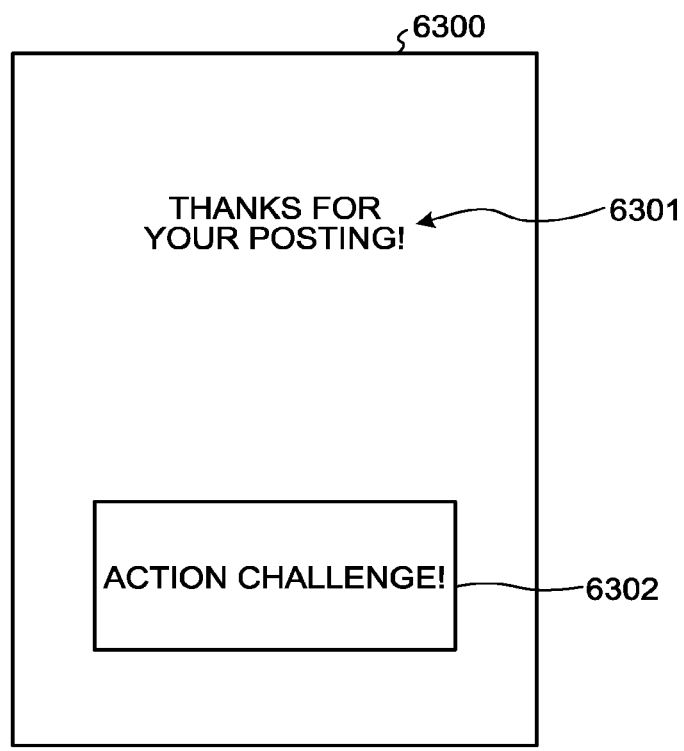
FIG. 46 is a diagram illustrating an example of a notification screen according to the second embodiment.

FIG. 46 illustrates an example of a notification screen according to the second embodiment to be displayed by the business operator application 31 in response to the push notification. In FIG. 46, the notification screen 6300 includes a message display area 6301 and an action instruction button 6302. In the message display area 6301, a message specified by the business operator server 400b is displayed, for example. The action instruction button 6302 is a button for providing an instruction to obtain access to the specially set-up website 800 in accordance with the URL of the specially set-up website 800 received via the push notification.

Thus, in the second embodiment, the URL of the specially set-up website 800 can be hidden because the business operator application 31 customized by a business operator is used.

If the action instruction button 6302 is operated through a user operation, the business operator application 31 accesses the specially set-up website 800 in accordance with the URL of the specially set-up website 800 (Step S1070). At the time, the business operator application 31 accesses the specially set-up website 800 using the URL of the specially set-up website 800 with the application ID added thereto.

The specially set-up website 800 displays screens and/or outputs sound in response to certain operations performed on the search terminal 30a that has accessed the website, for example. In one example, the specially set-up website 800 is configured to execute a game and provides a service in which goods or coupons can be acquired depending on the result of the game. This example is not limiting, and the specially set-up website 800 may be configured to provide a service in which a content such as image data, audio data, or video data can be acquired as a result of the assessing the website and performing a certain operation (action) thereon.

Referring back to FIG. 41, the specially set-up website 800 waits until the action from the search terminal 30a is completed (Step S1071). Upon completion of the action, the specially set-up website 800 transmits the following to the business operator server 400b: a completion notification indicating completion of the action; and the application ID transmitted to the specially set-up website 800 at Step S1070 (Step S1072). Based on the application ID and the completion notification transmitted from the specially set-up website 800, the business operator server 400b changes, to a value indicating completion of the action, a value in the item "Action completed" that is associated with application ID in the item "Application ID" in the history information presented in Table 3 (Step S1073).

This processing at Step S1073 for recording, in the history information, the value indicating completion of the action and the above-described processing at Step S1052 for confirming the history information are performed in combination, which prevents the same user from performing the same action a plurality of times on the specially set-up website 800.

Information Diffusion According to Second Embodiment

Figure 47:
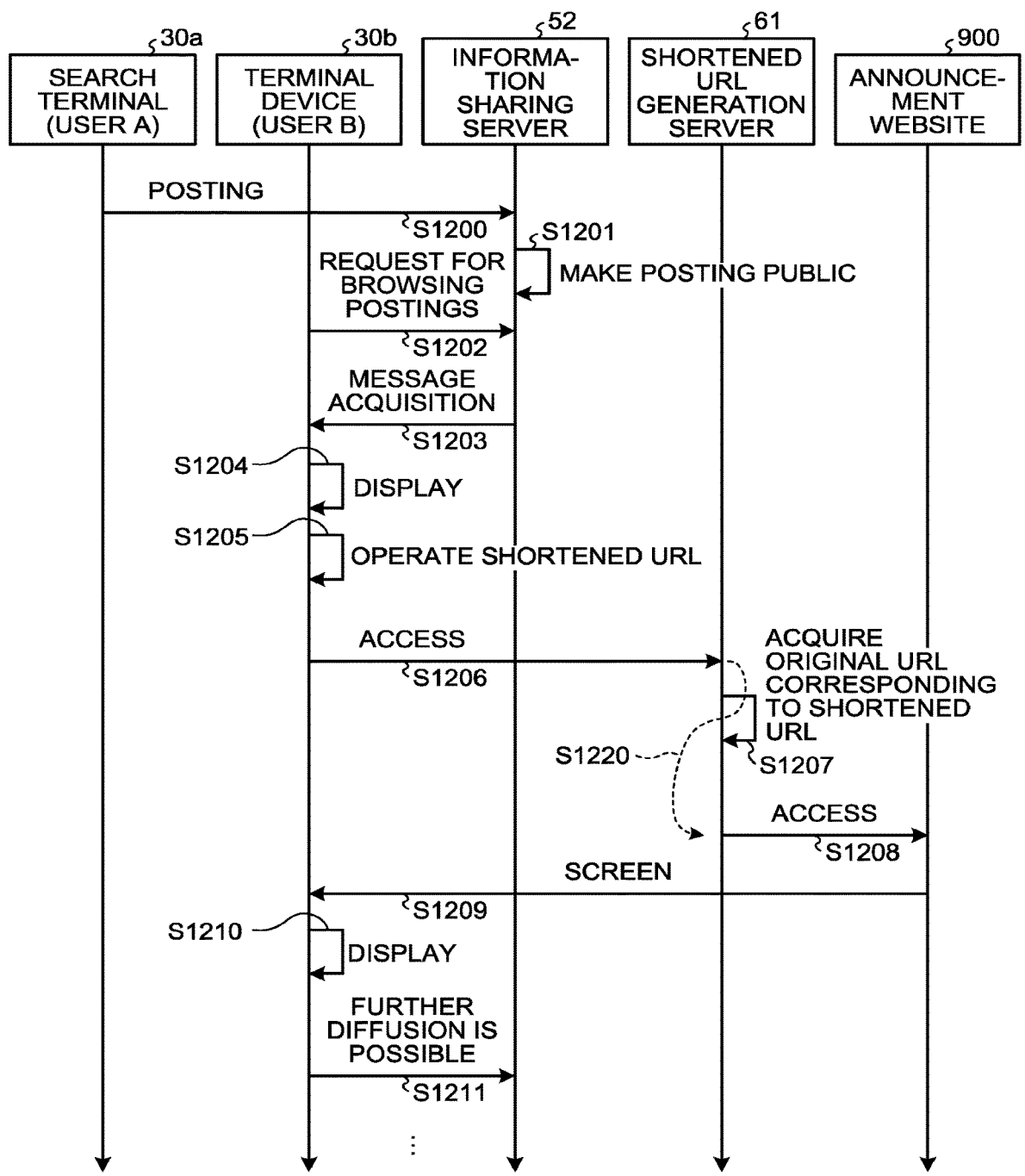
FIG. 47 is an exemplary sequence diagram illustrating information diffusion processing according to the second embodiment.

Information diffusion according to the second embodiment is described next. FIG. 47 is an exemplary sequence diagram illustrating information diffusion processing according to the second embodiment. In FIG. 47, the same reference numerals are assigned to the same components as those in FIG. 35 explained above, and detailed description thereof is omitted. Each step of the processing illustrated in FIG. 47 is executed on condition that the processing at Step S1043 and the earlier steps illustrated in FIG. 41 explained above is completed.

In FIG. 47, the search terminal 30a uses the information sharing application 32 to post a message on the information sharing server 52 at Step S1200. The processing at this step S1200 corresponds to the processing at Step S1044 in FIG. 41. The information sharing application 32 on the search terminal 30a posts a message that has been entered in the message input section 6101 and that includes the default message 6110, the message 6111, and the hashtags 6112 and 6113. Upon receiving the message transmitted from the search terminal 30a, the information sharing server 52 makes the received message public (Step S1201). This step S1201 corresponds to Step S1045 in FIG. 41.

As described above, a message posted from the information sharing application 32, installed on the search terminal 30a, that has logged in with the account information of the user A can be browsed from the information sharing application 32, installed on the terminal device 30b, that has logged in with the account information of the user B associated with the user A in the user DB 53.

The terminal device 30b uses the information sharing application 32 to request the information sharing server 52 to enable messages made public to be browsed (Step S1202). In response to this request, the information sharing server 52 transmits a message posted by the user B and a message posted by another user (for example, the user A) associated with the user B in the user DB 53 to the terminal device 30b (Step S1203). The terminal device 30b displays the individual messages transmitted from the information sharing server 52 (Step S1204). A screen to be displayed in this case is the same screen as the message browse screen 6200 described with reference to FIG. 45.

It is assumed, for example, that the hashtag 6113a containing the shortened URL is then operated in the message browse screen 6200 on the terminal device 30b (Step S1205). In response to the operation on the hashtag 6113a, the terminal device 30b uses the information sharing application 32 to access the shortened URL generation server 61 in accordance with the shortened URL contained in the hashtag 6113a (Step S1206). In response to the access to the shortened URL, the shortened URL generation server 61 acquires the original URL corresponding to the shortened URL (Step S1207) and redirects the access obtained from the terminal device 30b from the shortened URL to the original URL (Step S1208). Here, the original URL is assumed to be the URL of an announcement website 900 containing a content that the business operator desires to announce.

In actuality, the access obtained from the terminal device 30b is redirected to the original URL by the shortened URL generation server 61 in a manner indicated as Step S1220.

Upon being accessed from the terminal device 30b, the announcement website 900 transmits, to the terminal device 30b, screen information to be used for displaying a screen provided by the announcement website 900 (Step S1209). The terminal device 30b provides display based on the screen information transmitted from the announcement website 900 (Step S1210).

The terminal device 30b can, for example, repost a message transmitted from the information sharing server 52 at Step S1203 (Step S1211). The reposted message can be browsed from the information sharing application 32, installed on any other one of the terminal devices 30b, that has logged in with the account information of another user associated with the user B in the user DB 53. When users associated with the user A are different from users associated with the user B in the user DB 53, a message posted by the user A can be browsed from a user who is not associated with the user A but is associated with the user B. In this manner, information on the announcement website 900 contained in the message posted by the user A can be diffused to many more users.

Modification of Second Embodiment

A modification of the second embodiment is described next. The second embodiment described above is based on the premise that the search terminal 30a having the business operator application 31 installed thereon has the information sharing application 32 already installed thereon. In reality, there may be a case where the search terminal 30a does not have the information sharing application 32 installed thereon. In the modification of the second embodiment, processing to be performed in a case where the search terminal 30a does not have the information sharing application 32 installed thereon is described.

FIG. 48 is an exemplary sequence diagram illustrating processing according to the modification of the second embodiment. In FIG. 48, the same reference numerals are assigned to the same components as those in FIG. 35 or FIG. 39 explained above, and detailed description thereof is omitted. Each step of the processing illustrated in FIG. 48 is executed on condition that the processing at Step S1027 and the earlier steps illustrated in FIG. 41 explained above is completed.

At Step S1300, when the post button 6001 is operated on the information sharing operation screen 6000 (refer to FIG. 43), the business operator application 31 executes processing for requesting the information sharing server 52 to implement image sharing. More specifically, at Step S1300, the business operator application 31 executes processing from Step S1029 to Step S1040 in FIG. 41 in response to the operation on the post button 6001 (Step S1028 in FIG. 41).

That is, the processing at Step S1300 causes the shortened URL generation server 61 to generate a shortened URL for the announcement website 900 (Step S1029 to Step S1031 in FIG. 41), and this shortened URL and the user ID acquired from the search terminal 30a are stored in association with each other in the business operator server 400b (Step S1032 in FIG. 41). The business operator server 400b transmits the shortened URL and a hashtag to the search terminal 30a (Step S1033 in FIG. 41). In the search terminal 30a, the business operator application 31 calls the information sharing application 32 using, as parameters, a default message and the shortened URL and hashtag that have been received from the business operator server 400*b* (Step S1040 in FIG. 41).

Hereinafter, unless otherwise stated, the default message, the shortened URL, and the hashtag are collectively referred to as "the pieces of information".

The business operator application 31 calls the information sharing application 32 via the OS 340 (Step S1301). When the business operator application 31 calls the information sharing application 32, the OS 340 determines whether the search terminal 30*a* has the information sharing application 32 installed thereon (Step S1302). Hereinafter, Step S1310 and Step S1320 are individually described that denote processing to be performed if the search terminal 30*a* has the information sharing application 32 installed thereon and processing to be performed if the search terminal 30*a* does not have the information sharing application 32 installed thereon, respectively.

First, the processing to be performed at Step S1310 if the search terminal 30*a* has the information sharing application 32 installed thereon is described. The processing in this case is the same as the processing from Step S1041 to Step S1044 in FIG. 41. That is, if determining that the search terminal 30*a* has the information sharing application 32 installed thereon (Step S1311), the OS 340 starts up the information sharing application 32 using the pieces of information and a login request as parameters (Step S1312). When login information (a login name and a password) for logging in to the information sharing server 52 has already been registered in the search terminal 30*a*, the login request includes the already registered login information.

Upon being started up by the OS 340, the information sharing application 32 executes processing for logging in to the information sharing server 52 using the login information included in the login request (Step S1313). This example is not limiting, and the information sharing application 32 may display an input screen in which to enter the login ID and the password and transmits the login information entered in the input screen through user operations to the information sharing server 52.

If the login information is authenticated by the information sharing server 52 (Step S1314), the information sharing application 32 displays the message input screen 6100 (refer to FIG. 44) in which to enter a message (Step S1315). The information sharing application 32 displays the message input screen 6100 with the default message 6110 and the hashtags 6112 and 6113 entered beforehand. If user operations have been performed to further enter the message 6111 and operate the post button 6120 (Step S1316), the information sharing application 32 transmits a message containing the pieces of information that have been entered in the message input section 6101 in the message input screen 6100 to the information sharing server 52, thereby posting the message (Step S1317).

Processing to be performed thereafter is the same as the processing at Step S1045 and the steps that follow it in FIG. 41, and description thereof is therefore omitted here.

Next, the processing to be performed at Step S1320 if the search terminal 30*a* does not have the information sharing application 32 installed thereon is described. In this case, message posting and the like are performed with the information sharing server 52 accessed using the browser 33.

If determining that the search terminal 30*a* does not have the information sharing application 32 installed thereon (Step S1321), the OS 340 starts up the browser 33 and pass on the URL of the information sharing server 52 and the pieces of information to the browser 33 (Step S1322). The browser 33 stores the URL of the information sharing server 52 and the pieces of information that have been transferred from the OS 340 (Step S1323). For example, the browser 33 stores these URL and pieces of information in a management area for the browser 33 in the RAM 3002 in the search terminal 30*a*.

The browser 33 accesses the information sharing server 52 in accordance with the URL of the information sharing server 52 that has been transferred from the OS 340 (Step S1324). Upon being thus accessed, the information sharing server 52 presents, to the browser 33, a login screen on which to enter the login information (Step S1325). The browser 33 inputs the login information (the login name and the password) to the login screen, for example, in response to user operations (Step S1326). When the browser 33 has the login information stored beforehand using the Cookie function or the like, the browser 33 may input this stored login information to the login screen.

In response to a user operation, the browser 33 transmits the login information thus input to the information sharing server 52 (Step S1327). The information sharing server 52 receives the login information transmitted from the search terminal 30*a* and executes authentication processing on the received login information (Step S1328). If the authentication is successful, the information sharing server 52 transmits a notification that the authentication is successful to the search terminal 30*a* (Step S1329). Upon receiving the notification from the information sharing server 52, the search terminal 30*a* transfers the received notification to the browser 33.

Upon receiving the notification that the authentication is successful, the browser 33 redirects the pieces of information the pieces of information stored at Step S1323 to the information sharing server 52 (Step S1330). Upon receiving the pieces of information transmitted from the search terminal 30*a*, the information sharing server 52 generates, using the received pieces of information, a message for being posted from the browser 33 (Step S1331). This message is generated in such a manner as to include the default message and the hashtags (including the shortened URL) included among the pieces of information. The information sharing server 52 transmits a message input screen containing the generated message to the search terminal 30*a* (Step S1332).

Upon receiving the message input screen from the information sharing server 52, the search terminal 30*a* transfers the received message input screen to the browser 33. The browser 33 displays the message input screen thus transferred (Step S1333). This message input screen is provided with a message input section in which to enter a message and a post button with which to transmit the message entered in the message input section to the information sharing server 52 and thereby post the message, as in the case of the message input screen 6100 illustrated in FIG. 44. A software keyboard via which characters and the like are entered is provided by the OS 340.

If user operations are performed, for example, to additionally enter a message in the message input screen and operate the post button (Step S1334), the browser 33 transmits the message that has been entered in the message input screen and that contains the pieces of information to the information sharing server 52, thereby posting the message (Step S1335).

Processing to be performed thereafter is the same as the processing at Step S1045 and the steps that follow it in FIG. 41, and description thereof is therefore omitted here.

In the modification of the second embodiment, information diffusion is thus enabled by posting a message containing a shortened URL and hashtags to the information sharing server 52, even without the information sharing application 32 installed on the search terminal 30a.

Summarization of Second Embodiment

Based on the above description, the following summarizes the information processing system according to the second embodiment. The information processing system includes a diffusion requesting unit configured to transmit, in response to access from a search terminal based on linkage information acquired as a result of an image search, the following to an information sharing unit configured to diffuse information by making a message transmitted from a terminal device public on the network: a request to perform processing for diffusing information; diffusion information indicating details of the diffusion; and first identification information for identifying the search terminal.

For example, a business operator who registers images of photographs or printed materials in a database in association with linkage information may possibly desire to diffuse, among many more users, the linkage information provided as a result of an image search based on a captured image of each of these photographs or printed materials. In the information processing system to which the second embodiment is not applied, however, the linkage information acquired as the search result of an image search finishes at a user who has requested the image search and is not diffused unless this user has an intention to diffuse it.

In the information processing system to which the second embodiment is applied, information can be additionally diffused on a network after the linkage information obtained as a result of an image search by the search terminal is used. This is because, in response to access from the search terminal based on linkage information acquired as a result of the image search, the following is transmitted to an information sharing unit configured to diffuse information by making a message transmitted from a terminal device public on the network: a request to perform processing for diffusing information; diffusion information indicating details of the diffusion; and first identification information for identifying the search terminal.

The exemplary embodiments of the present invention has the effect of enabling additional provision of information, after linkage information has been used, to a terminal device that has used the linkage information.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system including a registration terminal, and an image search system that is configured to search a database having images and linkage information registered in association with each other, the information processing system comprising:

first processing circuitry of the image search system configured to receive a search request, the search request including a captured image and a notification identifier, the captured image having been obtained by causing a terminal device to capture an image of a medium, perform searching of the database based on the captured image as a search key image, in accordance with the received search request and transmit, to the terminal device, particular linkage information associated with a particular image found as a result of the searching, and transfer, to a notification server when a push notification is allowed as indicated by a push notification setting, the notification identifier, which provides permission for the push notification to be sent to the terminal device, the notification identifier identifying the terminal device that sent the search request and indicating that providing the push notification to the terminal device is permitted, the notification server being configured to provide the push notification to the terminal device identified by the notification identifier included in the search request; and second processing circuitry of the registration terminal configured to, prior to the searching performed by the first processing circuitry, set a first push notification setting only for the particular image, which is included in a specific area, and store, in a memory, the set first push notification in association with the particular image, when only the specific area is specified in an edit screen displaying the particular image, and set a second push notification setting for all images, including the particular image, that are included in and displayed on the edit screen, and store, in the memory, the second push notification in association with all the images included in the edit screen, when an entirety of the edit screen is specified;

wherein the linkage information includes an instruction for displaying, on the terminal device, a selection input section to which an entry for selecting one item from two or more items is input, and in response to the input to the selection input section, the first processing circuitry is further configured to transfer information indicating the item selected from the two or more items and the notification identifier.

2. The information processing system according to claim 1, wherein, upon receiving the notification identifier from the terminal device in response to the linkage information, the first processing circuitry is further configured to transmit the instruction to the terminal device.

3. The information processing system of claim 1, wherein the first processing circuitry is further configured to transmit the particular linkage information, together with the notification identifier, to the terminal device.

4. The information processing system according to claim 1, wherein the database stores one or more pieces of the linkage information and one or more target areas specified in the image in association with each other, and the first processing circuitry is further configured to transmit the particular linkage information to the terminal device directly when there is a single target area associated with the particular linkage information.

5. An information processing method in an information processing system including a registration terminal, and an image search system that is configured to search a database having images and linkage information registered in association with each other, the information processing method comprising:

setting a first push notification setting only for a particular image, which is included in a specific area, and storing, in a memory, the set first push notification in association with the particular image, when only the specific area is specified in an edit screen displaying the particular image;

setting a second push notification setting for all images, including the particular image, that are included in and displayed on the edit screen, and storing, in the memory, the second push notification in association with all the images included in the edit screen, when an entirety of the edit screen is specified;

receiving a search request, the search request including a captured image and a notification identifier, the captured image having been obtained by causing a terminal device to capture an image of a medium;

performing searching of the database based on the captured image as a search key image, in accordance with the received search request, and transmitting, to the terminal device, particular linkage information associated with the particular image found as a result of the searching; and transferring, to a notification server when a push notification is allowed as indicated by the push notification setting, the notification identifier, which provides permission for the push notification to be sent to the terminal device, the notification identifier identifying the terminal device that sent the search request and indicating that providing the push notification to the terminal device is permitted, the notification server being configured to provide the push notification to the terminal device identified by the notification identifier included in the search request;

wherein the linkage information includes an instruction for displaying, on the terminal device, a selection input section to which an entry for selecting one item from two or more items is input, and in response to the input to the selection input section, transferring first information and the notification identifier, the first information indicating the item selected from the two or more items.

6. The information processing method according to claim 5, wherein the transferring of notification identifier includes transmitting the instruction to the terminal device when the notification identifier is received from the terminal device in response to the linkage information.

7. The method of claim 5, wherein the transmitting step comprises transmitting the particular linkage information, together with the notification identifier, to the terminal device.

8. The information processing method of claim 5, wherein the database stores one or more pieces of the linkage information and one or more target areas specified in the image in association with each other, and the method further comprises transmitting the particular linkage information to the terminal device directly when there is a single target area associated with the particular linkage information.

* * * * *